Dec. 10, 1940.  G. TAUSCHEK  2,224,774
TABULATING MACHINE
Filed June 24, 1936   23 Sheets-Sheet 1

INVENTOR
Gustav Tauschek
BY
W. M. Wilson
ATTORNEY

Dec. 10, 1940.  G. TAUSCHEK  2,224,774
TABULATING MACHINE
Filed June 24, 1936  23 Sheets-Sheet 3

INVENTOR
Gustav Tauschek
BY
ATTORNEY

Dec. 10, 1940.     G. TAUSCHEK     2,224,774
TABULATING MACHINE
Filed June 24, 1936     23 Sheets-Sheet 4

Dec. 10, 1940.   G. TAUSCHEK   2,224,774
TABULATING MACHINE
Filed June 24, 1936   23 Sheets-Sheet 7

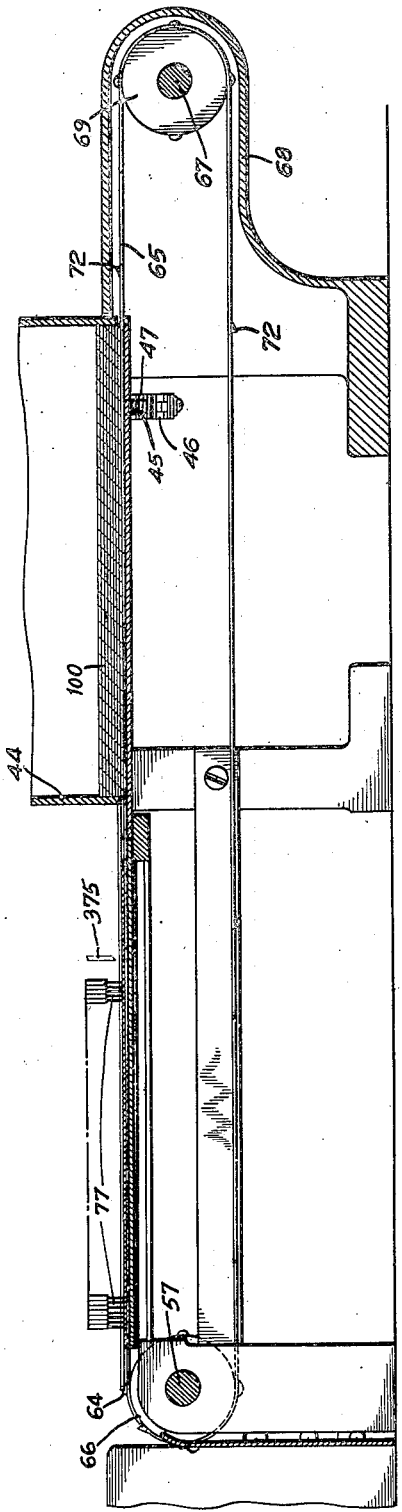
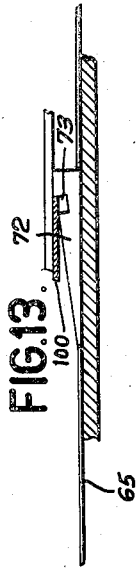
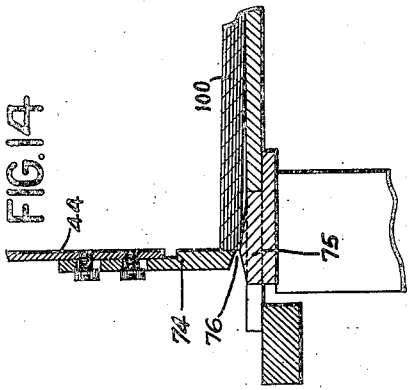
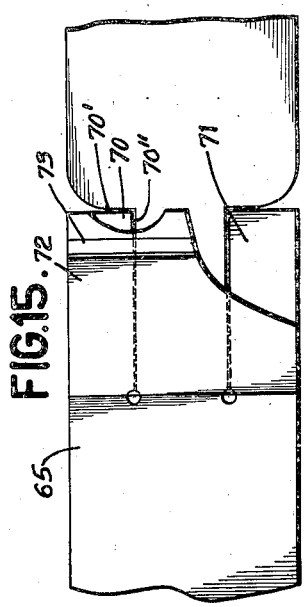

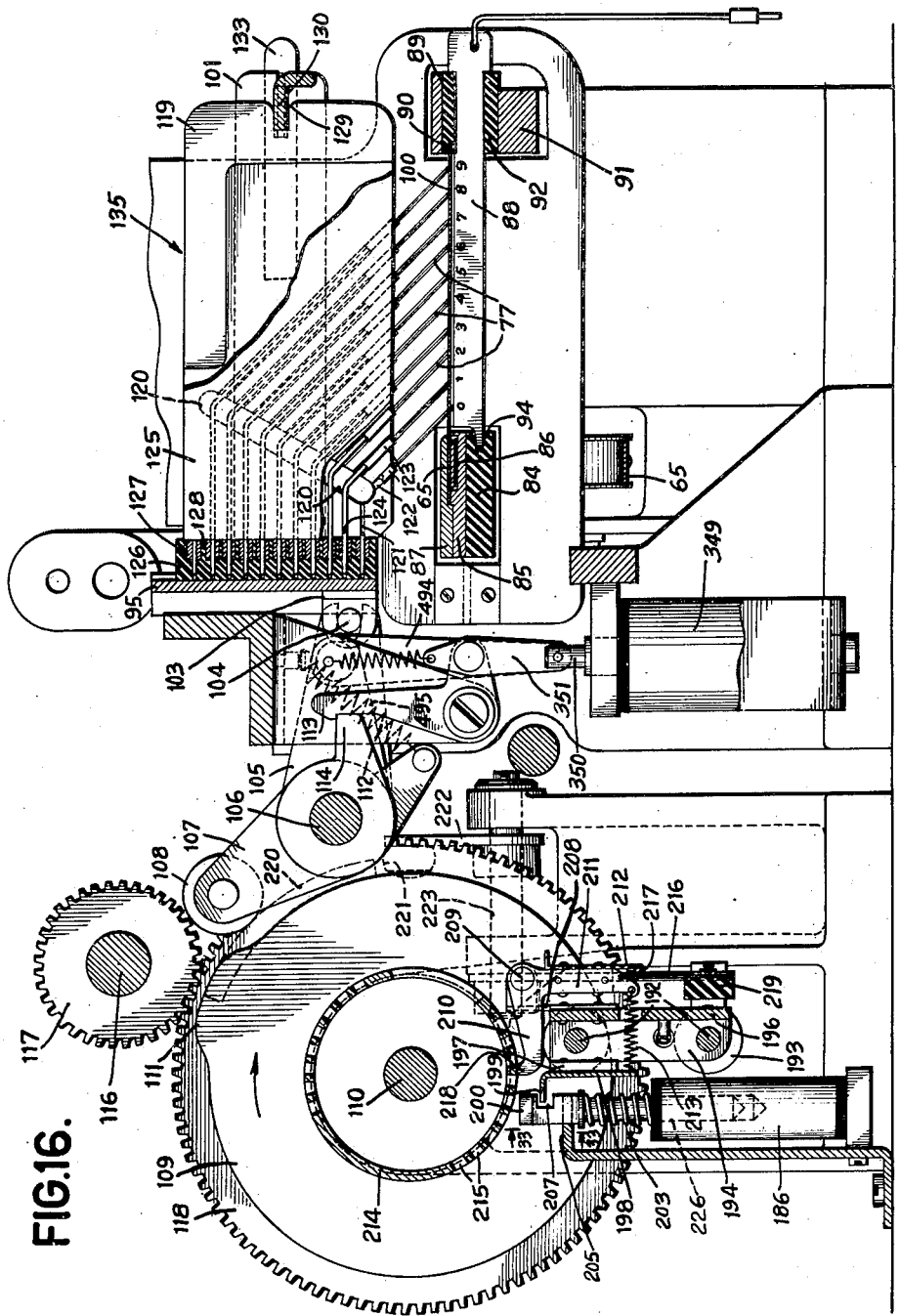

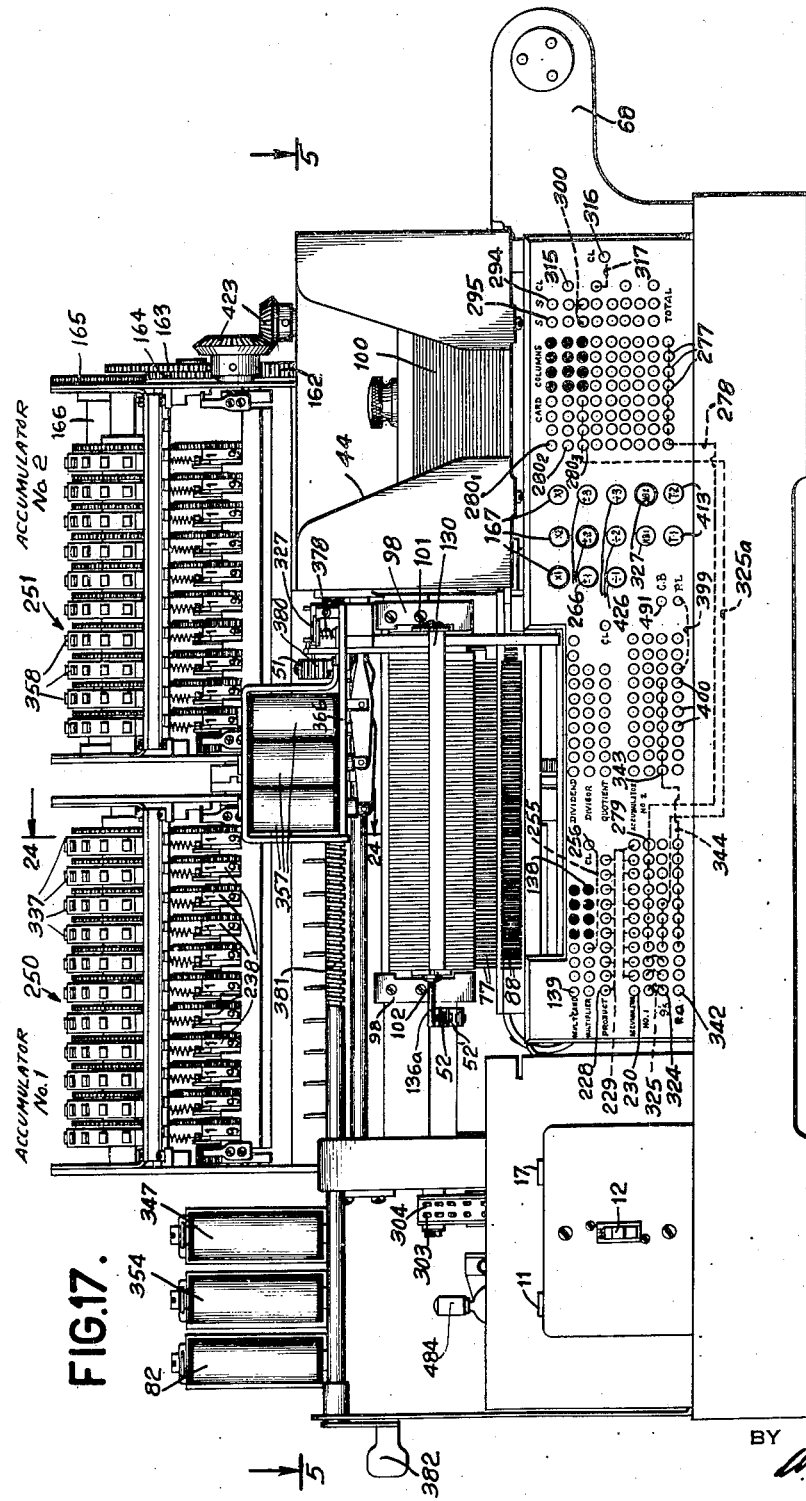

Dec. 10, 1940.  G. TAUSCHEK  2,224,774
TABULATING MACHINE
Filed June 24, 1936  23 Sheets-Sheet 13
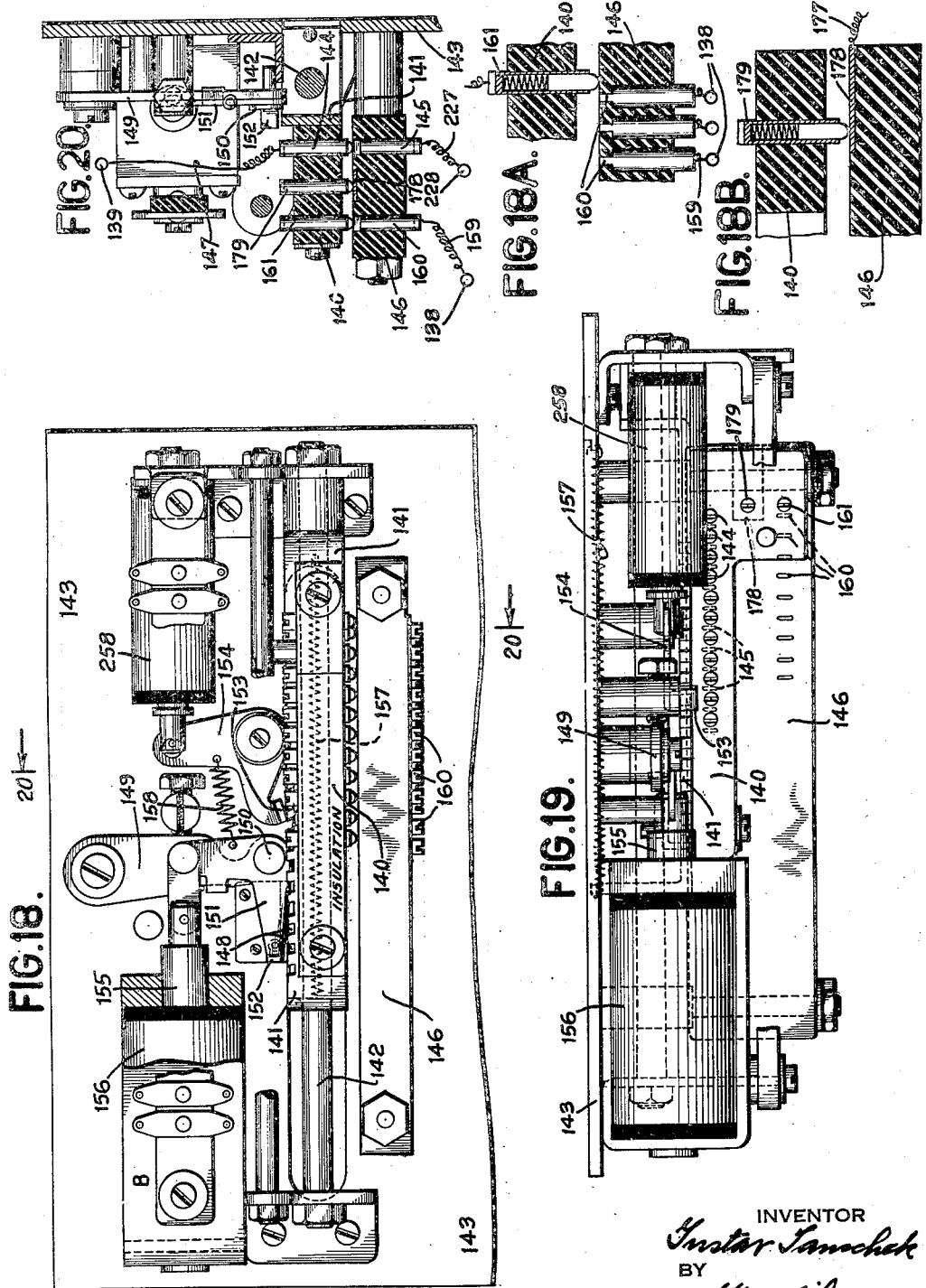
INVENTOR
Gustav Tauschek
BY
ATTORNEY Dec. 10, 1940. G. TAUSCHEK 2,224,774
TABULATING MACHINE
Filed June 24, 1936 23 Sheets-Sheet 14
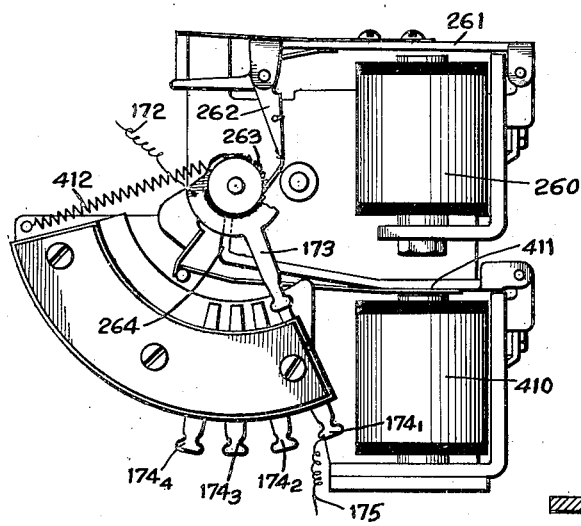
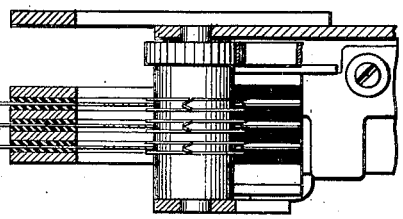
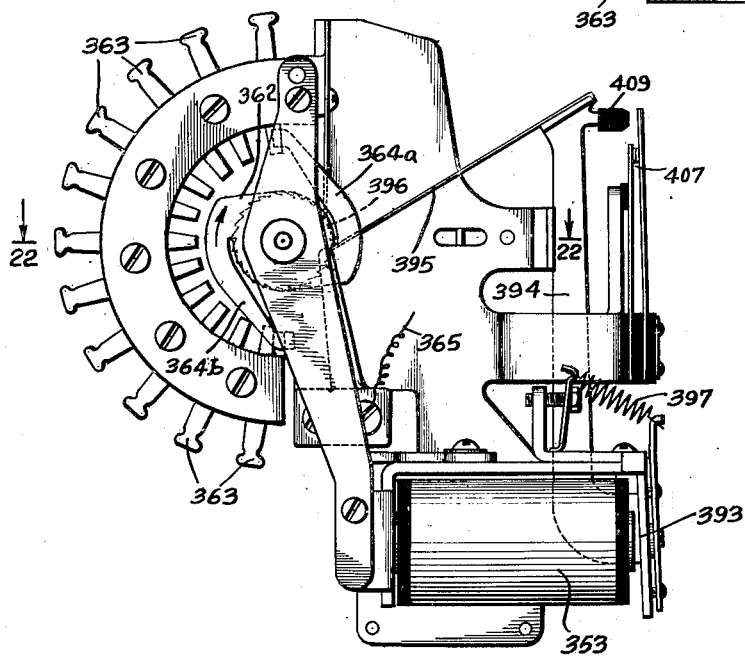
INVENTOR
Gustav Tauschek
BY
[signature]
ATTORNEY Dec. 10, 1940.          G. TAUSCHEK          2,224,774
                     TABULATING MACHINE
              Filed June 24, 1936        23 Sheets-Sheet 15

INVENTOR
BY
ATTORNEY

Dec. 10, 1940.          G. TAUSCHEK            2,224,774
                      TABULATING MACHINE
              Filed June 24, 1936       23 Sheets-Sheet 16
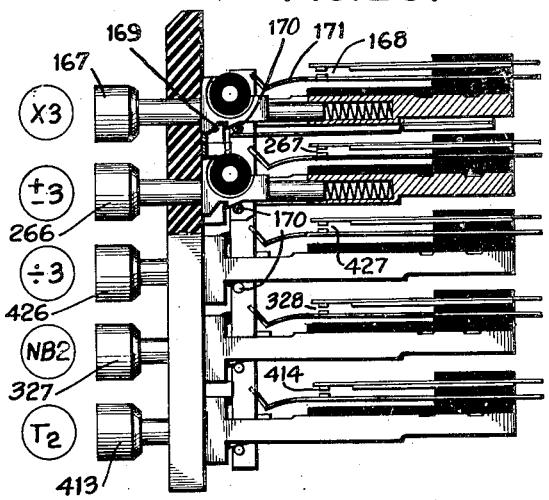
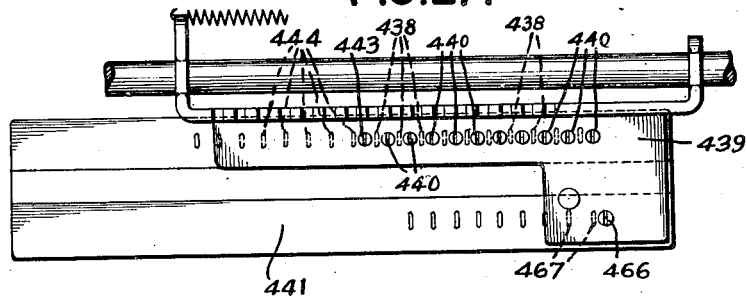
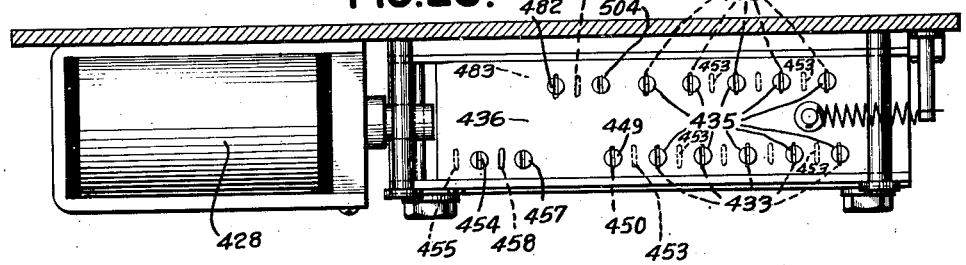
INVENTOR
Gustav Tauschek
BY
ATTORNEY

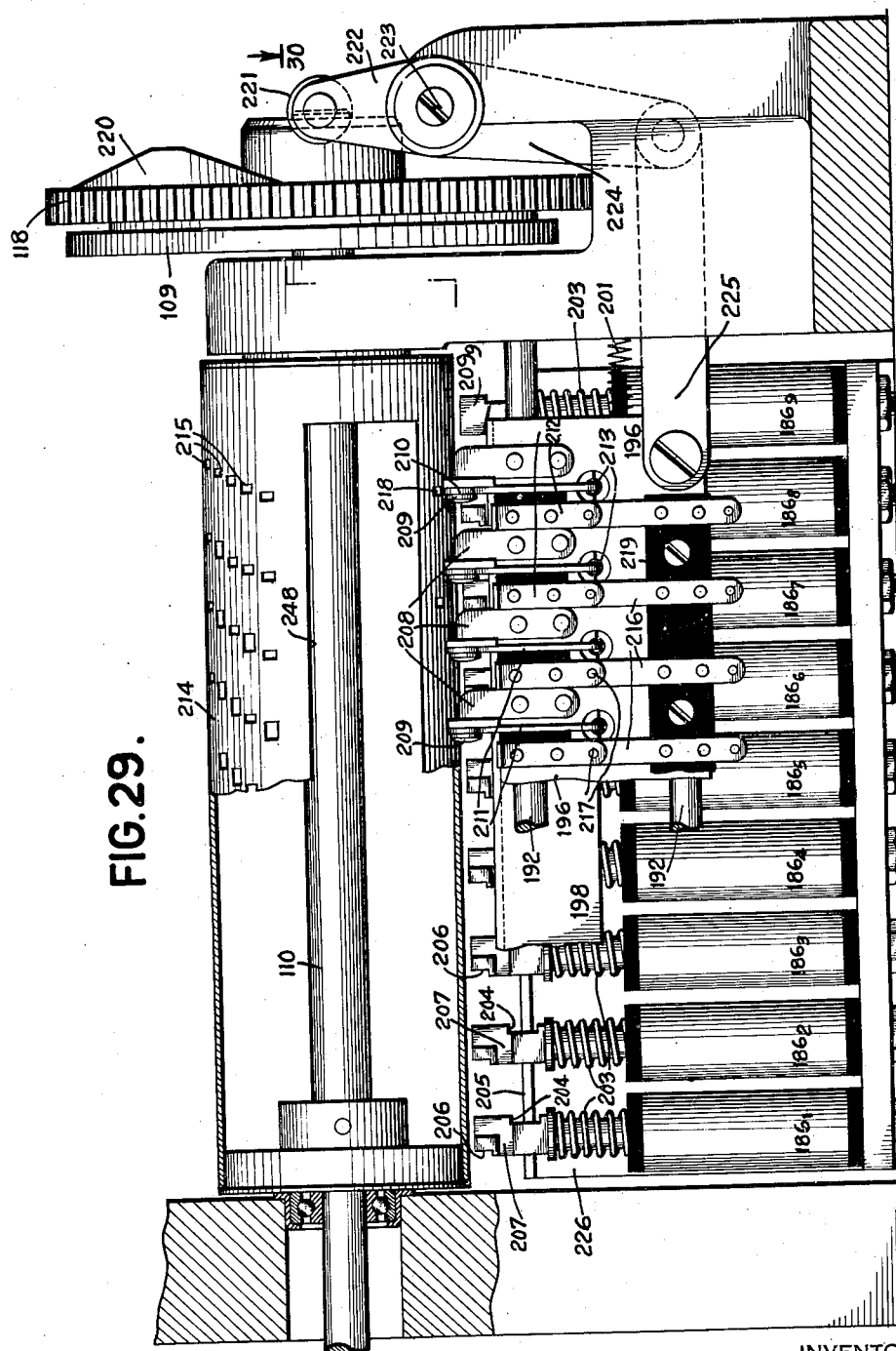

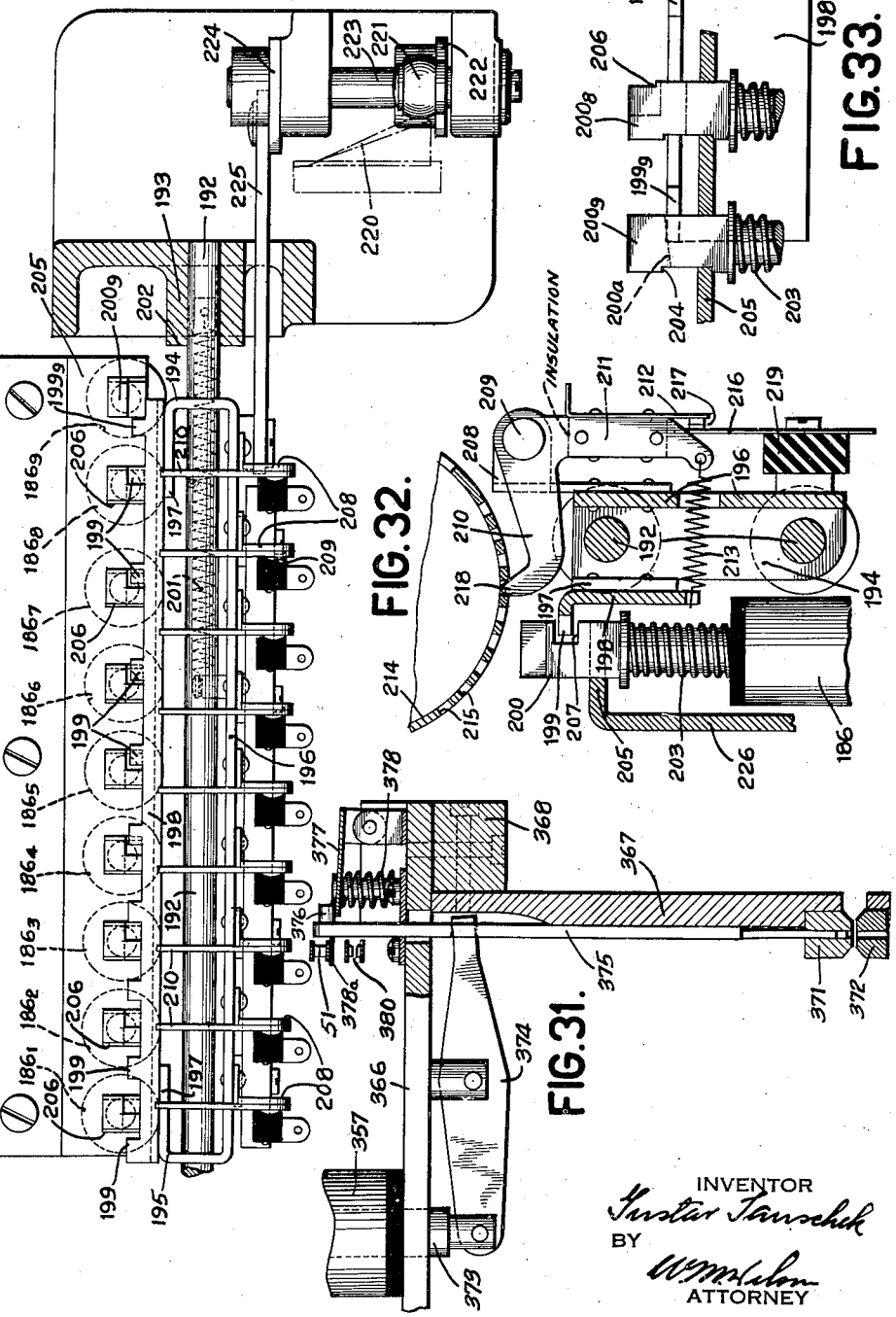

Dec. 10, 1940.  G. TAUSCHEK  2,224,774
TABULATING MACHINE
Filed June 24, 1936   23 Sheets-Sheet 19

INVENTOR
Gustav Tauschek
BY
W. M. Melon
ATTORNEY

Dec. 10, 1940.  G. TAUSCHEK  2,224,774
TABULATING MACHINE
Filed June 24, 1936   23 Sheets-Sheet 20

INVENTOR
Gustav Tauschek
BY
ATTORNEY

Dec. 10, 1940.    G. TAUSCHEK    2,224,774
TABULATING MACHINE
Filed June 24, 1936    23 Sheets-Sheet 21

INVENTOR
Gustav Tauschek
BY
ATTORNEY

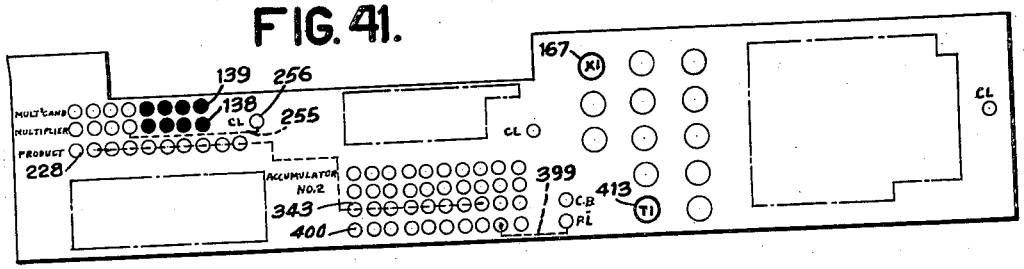
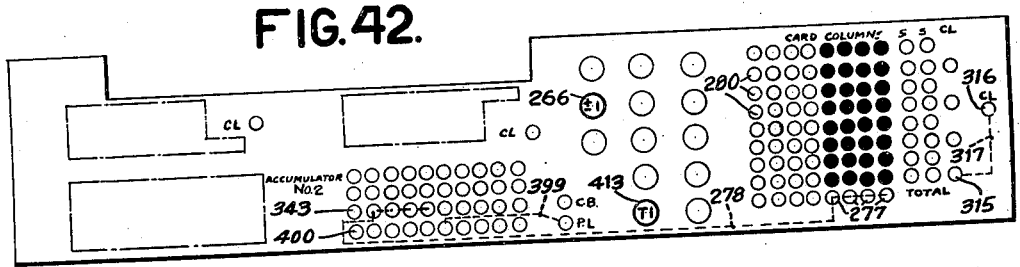
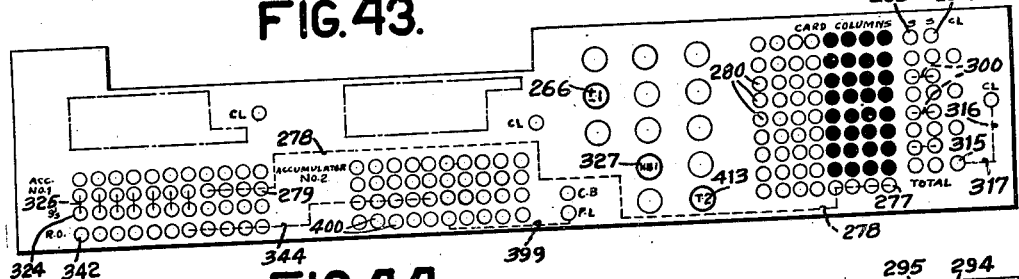
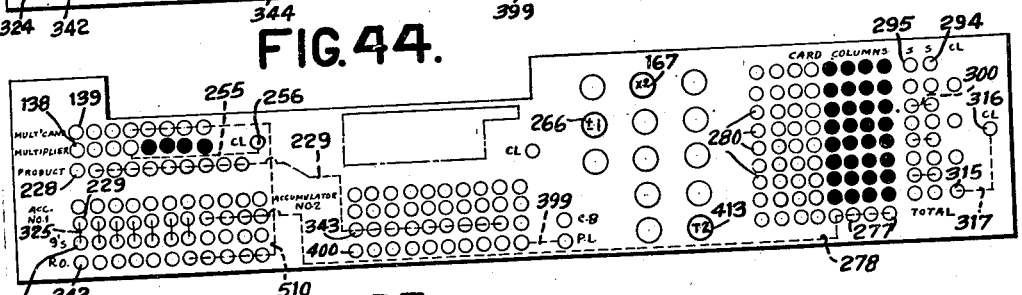
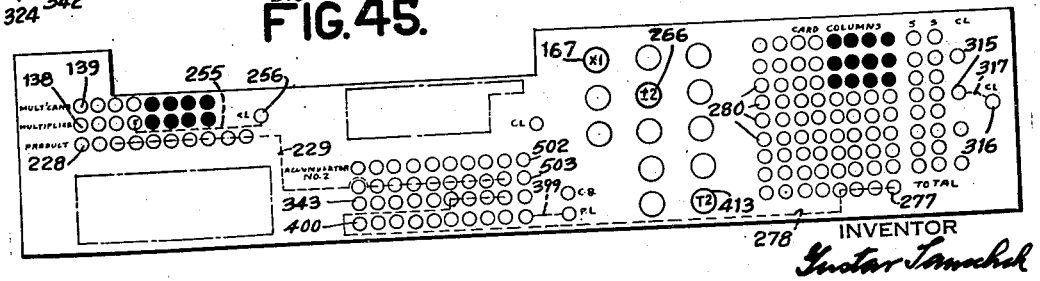

Dec. 10, 1940.    G. TAUSCHEK    2,224,774
TABULATING MACHINE
Filed June 24, 1936    23 Sheets-Sheet 23
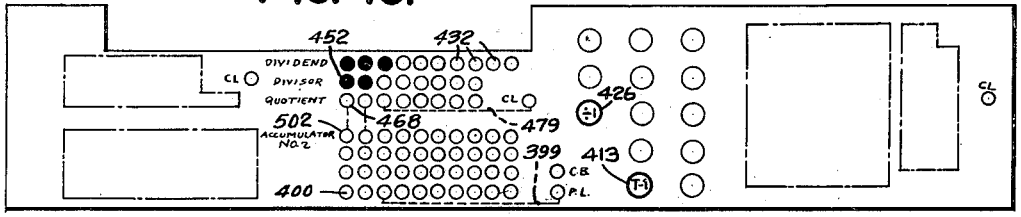
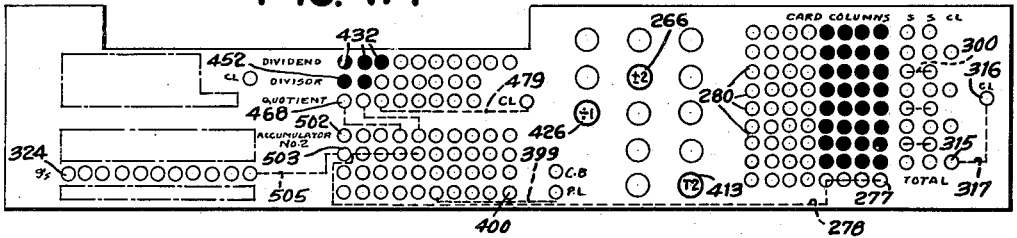
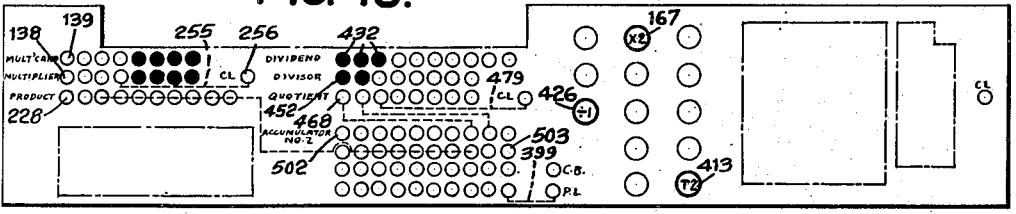
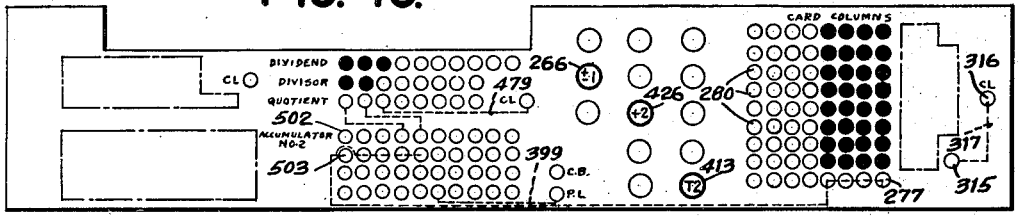
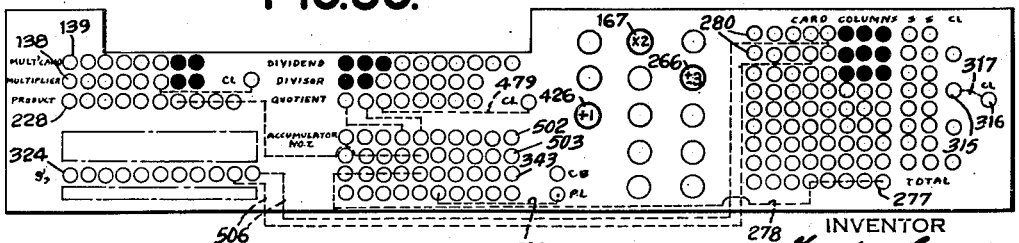

Patented Dec. 10, 1940

2,224,774

UNITED STATES PATENT OFFICE 2,224,774

TABULATING MACHINE

Gustav Tauschek, Weidling, near Vienna, Austria, assignor to International Business Machines Corporation, New York, N. Y., a corporation of New York Application June 24, 1936, Serial No. 86,920

15 Claims. (Cl. 235—61.8)

This invention relates to calculating machines of the type which is adapted to effect calculating operations of different types according to the four arithmetical rules, such as, addition, subtraction, multiplication and division.

Machines of such types have, heretofore, been devised but due to the limitations in construction they have not been entirely automatic in operation requiring the intervention of the operator to carry out succeeding machine operations.

The primary object of the present invention is to devise a calculating machine of the type defined which will carry out the series of different calculations automatically and without the intervention of the operator. Machines of such type are primarily useful in solving simple and complex equations when the representation of the values involved are made in some sort of number setting or representing means, whether it be value keys, settable number devices, a perforated card or the like. While the invention has been disclosed in connection with a card controlled machine it can be readily applied to calculating machines with manually set number representing devices and the present form of invention should be considered as merely illustrative and not restrictive.

A still further object of the invention is to provide pre-set calculating control devices which determine which types of calculating operations are to be performed and the sequence in which they are performed. Preferably, a single calculating unit is employed; for effecting subtraction and addition of values represented on a plurality of card fields according to a preselection so that the algebraic sum may be entered in an accumulator; a single calculating unit to effect multiplication and; a single unit to effect division, wherein the results of all the calculations may be entered in said accumulator. A plurality of keys, three in number are provided for each unit, each key being in a different row. Hence the selection of a unit is effected by the depression of a key and its order of operation in the sequence is determined by which key in the three rows is depressed.

A still further object of the invention is to provide a perforating means to punch the result of a calculation or a series of different calculations upon the card controlling the calculations and to perform this operation automatically and without any attention of the operator.

Digressing to the details of the various units comprising the machine it is a still further object to devise an improved form of card feeding mechanism which is capable of feeding a card at its marginal edge and without interference with the sets of brushes adapted to analyze the perforated card columns.

The detachable brush units, which are a relatively important feature of the invention, consist in each of a series of brushes adapted to be correlated with a card column. The brush units are positioned according to the controlling columns and they are similar in construction except for a brush unit of the units column of a field involving a subtractive item where a change in construction is made to cause the entry of a tens complement in that order.

A still further object of the invention is to provide an improved form of brush reading unit which consists of an emitter correlated with a brush unit and adapted to transmit electrical impulses at differential times depending upon which index point is perforated, or in other words, which brush of a unit encounters a perforation.

Another object of the invention is to provide a supplemental emitter capable of transmitting impulses at complementary times for the purposes of subtraction when employed in connection with the cross calculation unit.

A still further object of the invention is to provide a plurality of accumulators for a dual purpose, one of which is to receive the result of a cross calculation when a subtractive item is involved. In this case a negative condition of the accumulator is sometimes obtained and by improved means this negative or complementary result is transmitted as a tens complement to the second accumulator by means of the negative emitter so that a true number is entered in the second accumulator. The second purpose of the provision of a plurality of accumulators is to provide an accumulator to receive a dividend entry in the operation of division while the quotient may be entered in the second accumulator in which a partial result is already entered or which may, or may not, receive the result of a subsequent type of calculation.

A still further object of the present invention is to devise an improved form of card controlled multiplying machine adapted to multiply numbers under card control and preferably by the partials product method.

Another object of the invention is to provide an improved form of card controlled dividing machine capable of dividing two values represented on a single card.

Another object of the invention is to provide an improved form of cross calculating unit of a construction considerably simpler than has been devised heretofore.

Another object of the invention is to provide cycle limiting devices for each of the three units which eliminate idle cycles of the machine in securing the ultimate result and initiate succeeding calculating operations automatically when the result of one calculation is secured.

A still further object of the invention is to provide means whereby the cycle limiting device of the calculating unit last employed, or the first, if there is only one employed, causes the punching mechanism to be automatically rendered operative.

In connection with the punching mechanism it is an object to construct and devise an arrangement which consists of a single line of punches shiftable to be correlated with a card column not being analyzed, in which case the same card is fed to the punches and analyzing means at the same time, differing from the prior art construction where the card is fed first to the analyzer and then to the punches.

The improved form of punching mechanism is entirely electromagnetic in control and operation and operates independently of the main operating mechanism. By the elimination of any cyclic control or cyclic operation punching operations ensue very fast and with almost lighting rapidity, the time limitations being only the response of the control relays and punching magnets.

A still further object of the invention is to provide a punch limit control so that upon the punching of a preselected number of digits the machine operation will be immediately terminated and whereby zeros to the right will not be punched, since punching is initiated from the highest denominational order.

A still further object of the machine is to provide an electrical means to sense which keys in the different rows have been predepressed and to cause the automatic functioning of the selected units, and in the order predetermined by the keys depressed.

A still further object of the invention is to provide special keys, one a key designated "NB" and adapted to cause negative total transfer operations and the other designated herein as a "T" key to cause automatic total punching operations when all three calculating units are not utilized in the performance of a composite calculation.

A still further object of the invention, especially in connection with the punching unit, is to provide means to cause the card feeding mechanism to feed the card step by step as digit punching operations ensue.

A further object of the machine is to devise a means for checking calculations performed by the various calculating means so as to localize errors either in calculation or punching. By the improved arrangement the checking operation requires but a single result receiving means and the latter receives the result and controls the punching of the result of the first calculation after which it is cleared. Thereafter the same card controls the re-calculation, the result of which is entered in the single result receiving means and which is then compared with the result recorded on the card. A non-comparison or lack of identity is signaled to the operator. The checking device operates rapidly and without cyclic operations requiring a minimum of extra time for checking purposes.

Coming now particularly to the consideration of the various calculating operations capable of being performed by the machine another object of the invention is to provide an arrangement whereby the machine can be utilized to perform repeated calculations of one type, or in combination.

In the appended drawings and the following specification it is explained that the machine can perform the calculation of multiplication alone. Obviously by the selection of the dividing mechanism the calculation of division may be performed alone and a similar statement follows for the cross calculation unit which causes addition and with or without subtraction. By the selection of three of these units the requirement of a universal tabulating machine is supplied and an exemplary problem is described hereinafter in connection with such use.

Various other composite calculations may be performed and while a number of these have been described it is not the intention to be confined to these particular uses since by the skill of the operator other calculations can be performed.

Among these is the possibility of cross algebraic calculation of one or more amounts when the result is positive and utilizing this result as a multiplicand or multiplier value. This result is then multiplied by an amount represented on the card which contains the representation of the values of algebraic cross calculation.

The machine may also multiply two values and add to the resultant product one or more values either additively or subtractively.

The machine may also divide two values and add to or subtract from the quotient result one or more items. In this type of computation the quotient result enters as an item of cross calculation.

The machine may also divide two values and add the quotient result to a product which is the result of a multiplying operation.

The provision of the separate calculating units and the calculation unit selecting devices provides a wide variety of calculating operations and permits of a rapid change in types of calculating operations, all of which will be obvious as the following specification is understood.

Further and other objects and advantages will be hereinafter set forth in the accompanying specification and claims, and shown in the drawings, which by way of illustration show what is now considered to be the preferred embodiment of the invention.

In the drawings:

Figs. 1, 2, 3 and 4 when adjacently positioned in the order

Fig. 12 is a longitudinal sectional view of the card feeding mechanism.

Fig. 13 is a view in side elevation of part of the feeding tape and one of the card picker devices.

Fig. 14 is a detail view showing the construction employed to provide a card throat to prevent more than one card from being fed out of the supply hopper at one time.

Fig. 15 is a plan view showing part of the feeding tape and one of the picker devices carried thereby.

Fig. 16 is a transverse sectional view taken on the line 16—16 of Fig. 5 and shows clearly the construction of one of the detachable brush units and the mechanism for causing the reciprocation of the brushes.

Fig. 17 is a front view of the assembled machine.

Fig. 18 is a view in side elevation showing the denominational shift device for the multiplying mechanism.

Figs. 18A and 18B are sectional views showing details of certain contact devices.

Fig. 19 is a plan view of the mechanism shown in Fig. 18.

Fig. 20 is a sectional view taken on the line 20—20 of Fig. 18.

Fig. 21 is a view in side elevation of the electromagnetically operated step-by-step device utilized to determine the type of calculating operation to be performed as the machine is operated.

Fig. 22 is a sectional view taken on the line 22—22 of Fig. 23.

Fig. 23 is a view in side elevation illustrating the preferred form of rotary switch utilized in connection with card punching operations.

Fig. 26 is a transverse sectional view showing the construction of the pre-set calculating determining keys.

Fig. 27 is a sectional view taken on the line 27—27 of Fig. 35.

Fig. 28 is a sectional view taken on the line 28—28 of Fig. 35.

Fig. 29 is a view in side elevation taken on the line 29—29 of Fig. 5 showing the construction of the partials product multiplying mechanism.

Fig. 30 is a sectional view taken on the line 30—30 of Fig. 29.

Fig. 31 is a sectional view showing the construction of the card punching mechanism.

Fig. 32 is a sectional view showing a portion of the construction of the partials product multiplying mechanism.

Fig. 33 is a view in side elevation taken on the line 33—33 of Fig. 16.

Figs. 41-50 inclusive are diagrams of the plugboard illustrating the plugging connections made and the manipulative devices operated for different calculating operations.

Figure 1:
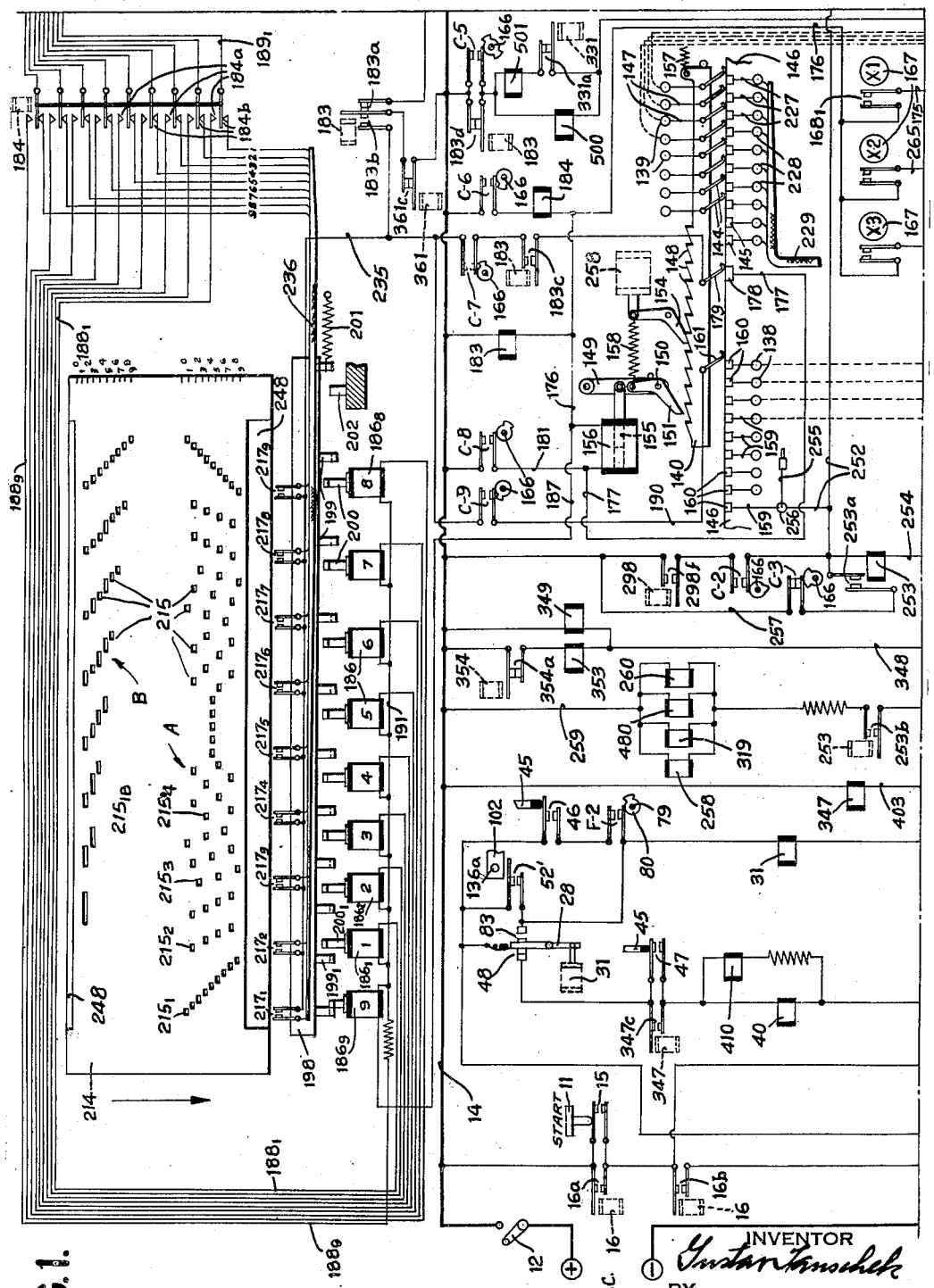
Fig. 1, Fig. 2,
Fig. 3, Fig. 4, represent the electrical wiring diagram of the machine.
Figure 3:
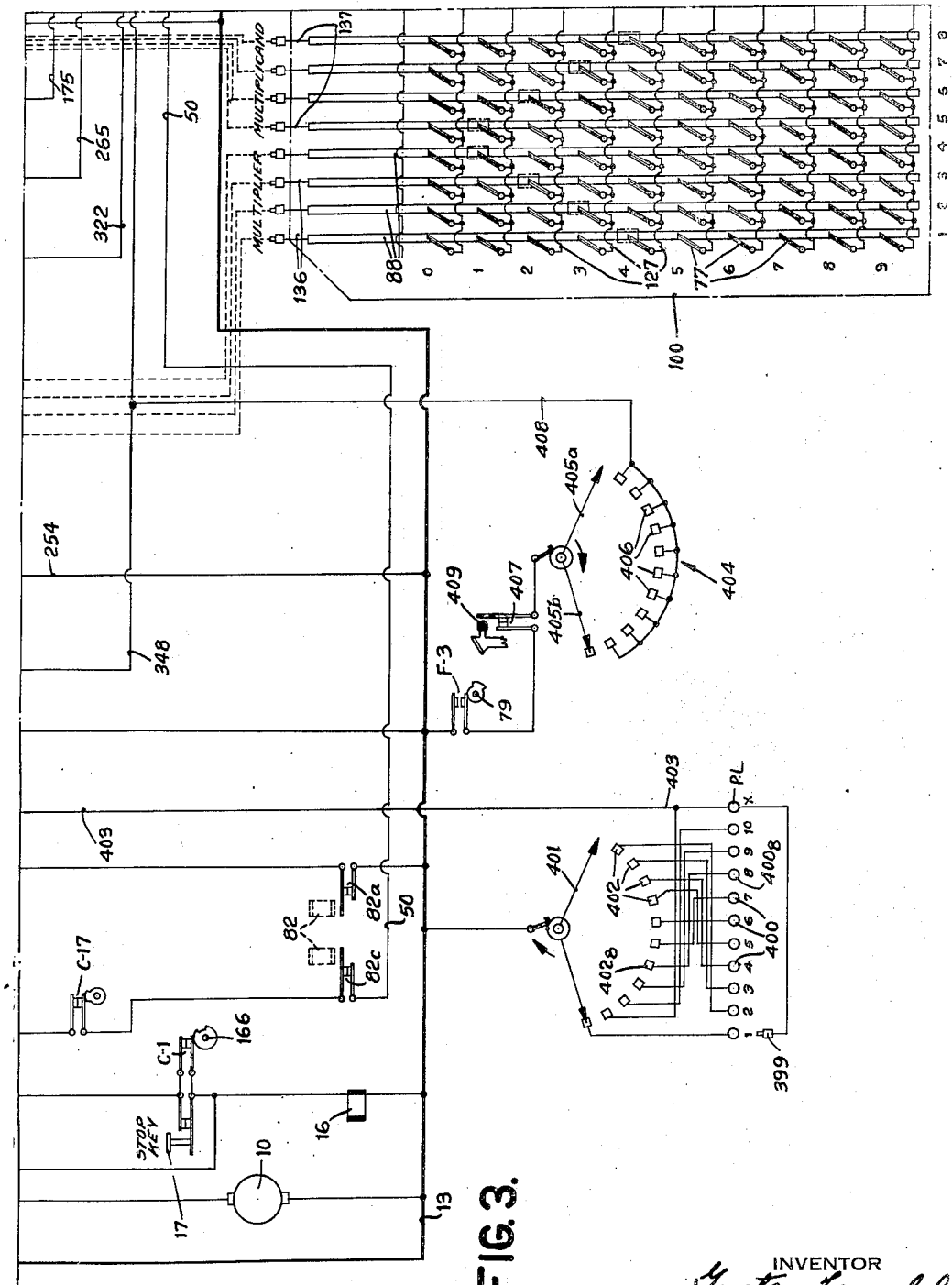
Figure 5:
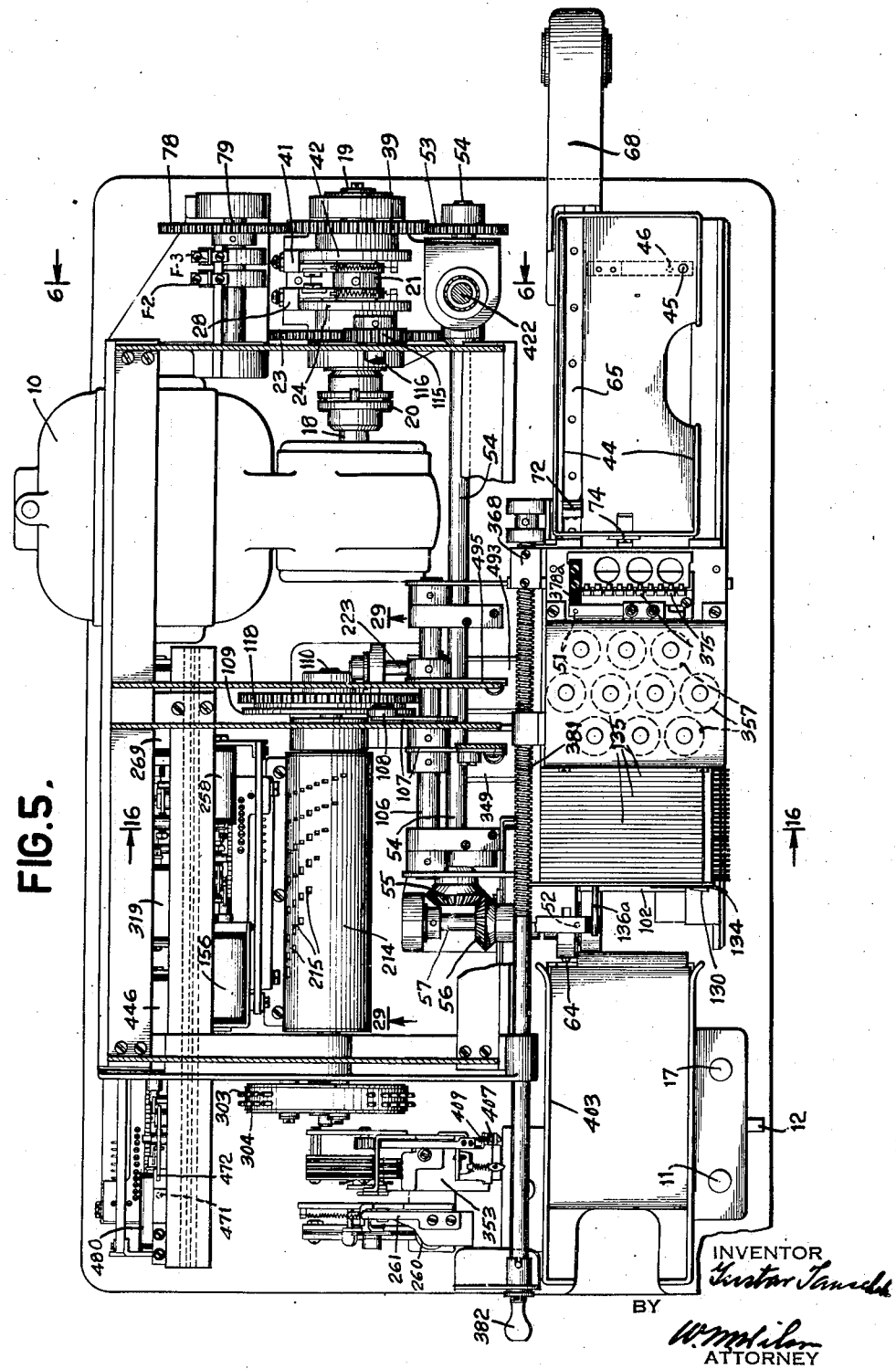
Fig. 5 is a longitudinal sectional view of the machine and is taken on the line 5—5 of Fig. 17.

The power for operating the various mechanisms of the machine is derived from an electrical motor 10 (Figs. 3 and 5). In order to initiate the operation of the motor and cause it to operate continuously until subsequently stopped, there is provided a start key 11 (Figs. 1 and 5).

Electrical power for the machine is provided by a direct current supply D. C. which is supplied to the motor and electrical circuits of the machine upon closure of a switch 12 (Figs. 1 and 5) thereby providing by a bus bar the positive line side 14 (Fig. 1) and the negative line side 13 (see Fig. 3) by another bus bar. Upon the manual depression of the start key 11 (Fig. 1), its contacts 15 will be closed thereby connecting the positive line side 14 to a magnet 16 (Fig. 3) of a motor relay (Fig. 3) through contacts controlled by a stop key 17, the other side of the magnet being connected to the negative line side 13. The magnet 16 when energized is adapted to close relay contacts 16b (Fig. 1) thereby connecting the motor 10 across the lines 13 and 14 and causing it to run. By the energization of the motor relay magnet 16 its relay contacts 16a (Fig. 1) will also be closed and these contacts will shunt the start key contacts 15 thereby causing the motor relay magnet 16 to be continuously energized until deenergized by means to be subsequently described. At this point in the description it should be noted that hereinafter magnets of relays employed in the machine will be designated by numerals and the related contacts of the relays by the same numerals with subscripts $a$, $b$, $c$, etc.

Figure 6:
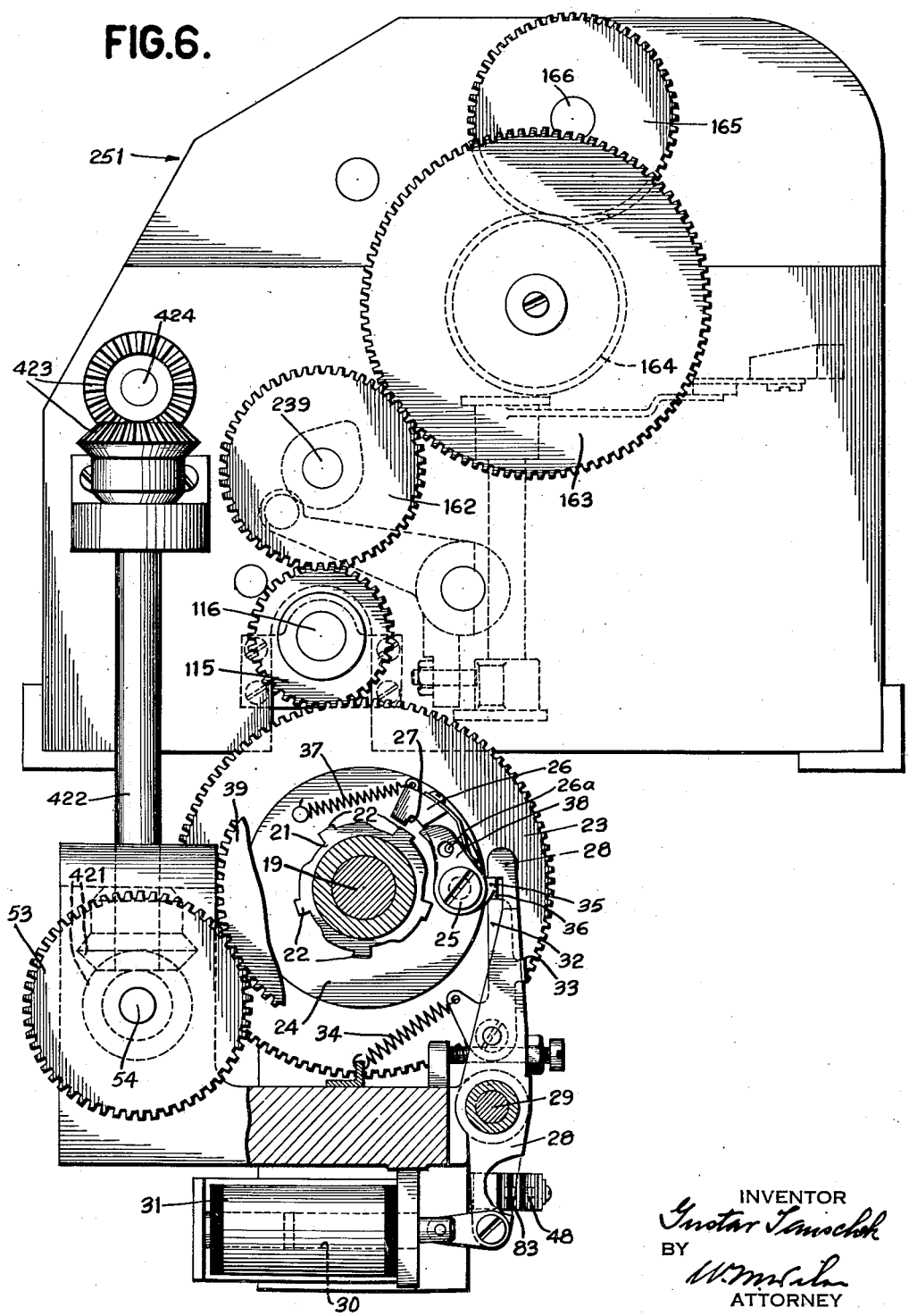
Fig. 6 is a cross sectional view taken at the right end of the machine and is taken on the line 6—6 of Fig. 5 and shows particularly the construction of one of the clutches and associated gear drive.
Figure 7:
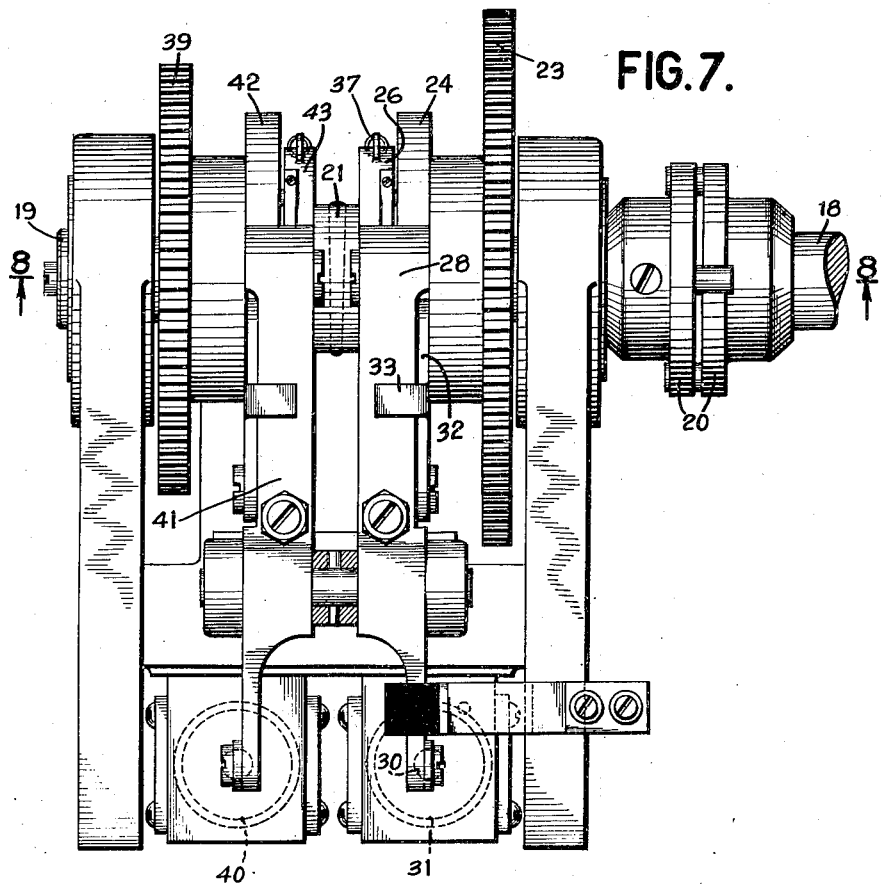
Fig. 7 is a view in side elevation showing in detail the arrangement of the two clutches provided for the machine.
Figure 8:
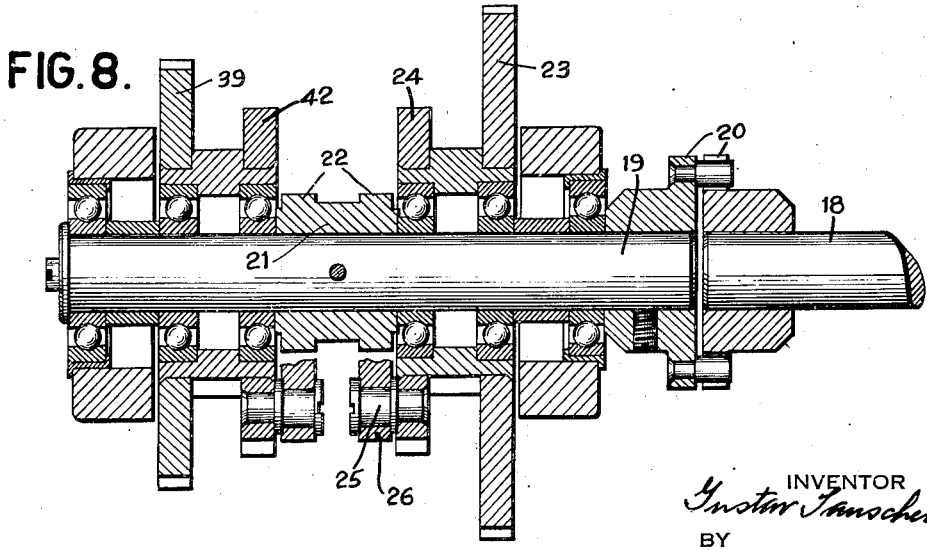
Fig. 8 is a longitudinal sectional view and is taken on the line 8—8 of Fig. 7.

Referring now to Figs. 5, 7 and 8, it will be noted that the drive shaft 18 of the motor 10 is adapted to continually rotate a drive shaft 19 through a coupling 20. The shaft 19, while it continually rotates, is adapted to selectively operate various mechanisms of the machine and to provide for the selective operation of these mechanisms the machine is equipped with two one revolution clutches which are substantially identical in construction and operation. One of these clutches is shown in Fig. 6 and this figure shows a construction of a one revolution clutch which is well known in the art to which this invention appertains.

The shaft 19 which continually rotates has secured thereto an element 21 provided with a plurality of sets of radial extensions 22 (Fig. 8). Attached to a driving gear 23 is a disk 24 upon which is pivoted at 25 a spring pressed pawl 26 having a shoulder 27 thereof normally held out of engagement with one of the extensions 22 by means of a hook of a clutch control arm 28. The arm 28 is pivoted at 29 and has connected at its lower end a core 30 of a clutch control magnet 31. Pivotally mounted on the arm 28 is an arm 32 provided with a lug 33 bent over so as to engage with an edge of the arm 28. A spring 34 connected to an extension of the arm 32 causes the arm 28 to be held in such a position that the hooked extremity of the arm 28 will engage with a finger 35 of the clutch pawl 26 holding the latter out of engagement with the related extension 22. Normally, a square lug 36 of the disk 24 is received between the top of the arm 32 and the horizontal edge forming the hooked portion of the arm 28 thereby holding the disk 24 and gear 23 in a normally locked condition.

Upon the energization of the magnet 31, it will be obvious that the arm 28 will be rocked in a clockwise direction thereby releasing the clutch pawl 26 for movement by means of a spring 37 connected thereto. During the counterclockwise rotation of shaft 19 the related extension 22 will engage with the shoulder 27 as element 21 rotates to cause the rotation of the disk 24 and the gear 23. At the termination of a complete rotation of the gear 23, which hereinafter is designated as "a machine cycle," during which time magnet 31 has been deenergized the hooked extension of the arm 28 will engage with the finger 35 of the clutch pawl 26 thereby disengaging the clutch pawl 26 from the related extension 22, thus terminating the rotation of the gear 23.

Also mounted by the pivot of the clutch pawl 26 there is provided a loosely pivoted arm 38. Upon the release of the clutch pawl 26 by the control arm 28 it will be obvious that the related extension 22 will be firmly held between the shoulder 27 of the clutch pawl 26 and the free end of the arm 38 thus securely locking the disk 24 and element 21 together. When the clutch pawl 26 is subsequently moved to disengaged position with respect to the extensions 22 the arm 38 by means of a pin 26a secured to the clutch pawl 26 will likewise be moved free of the extension 22, as shown in Fig. 6. At this time the lug 36 will be firmly held between the shoulder of the arm 28 and the upper end of the arm 32 to prevent any overthrow of the disk 24.

Referring to Fig. 7, it will be noted that a similar clutch is provided to cause the rotation of a gear 39 and this clutch is controlled by a card feed clutch control magnet 40. An arm 41 which is similar to the arm 28 is operated by magnet 40 and also has associated therewith a clutch pawl and disk arrangement similar to that disclosed in Fig. 6. The clutch disk of the clutch now being described is designated by numeral 42 and is similar to the disk 24 previously described and the clutch connection is adapted to cause a mechanical driving connection between one of the other sets of radial extensions 22 and a clutch pawl 43 pivotally carried by the disk 42 and in the plane of the other set of extensions 22.

The clutch control magnet 40 when energized is adapted to cause the feeding of a tabulating card from a hopper to an analyzing mechanism for one or more different calculating operations performed selectively and automatically by an operation of the machine.

The electrical connections for causing an energization of the clutch control magnet 40 (shown in Fig. 7 and also in the wiring diagram of Fig. 1) will now be described. The tabulating cards 100 which are adapted to control calculating operations are placed within a hopper 44 (Figs. 5 and 12) of a box-like formation, the upper end being open for the reception of the cards and the weight of a card together with the usual presser plate is sufficient to depress a plunger 45 (Fig. 5) and cause the closure of contacts 46 and 47 (Figs. 1 and 12) and such contacts will remain closed as long as there is a card in the hopper 44.

Figure 2:
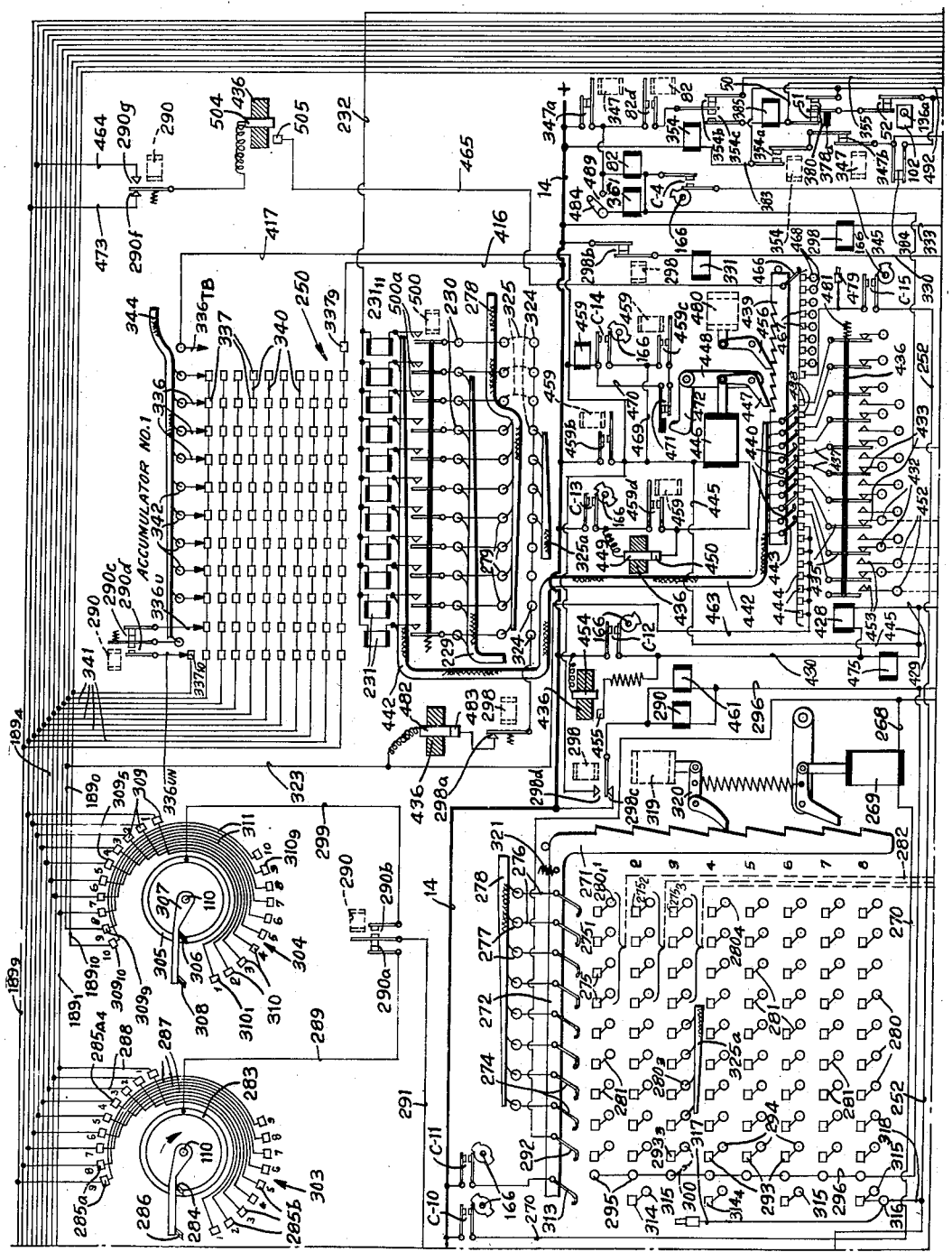
Figure 4:
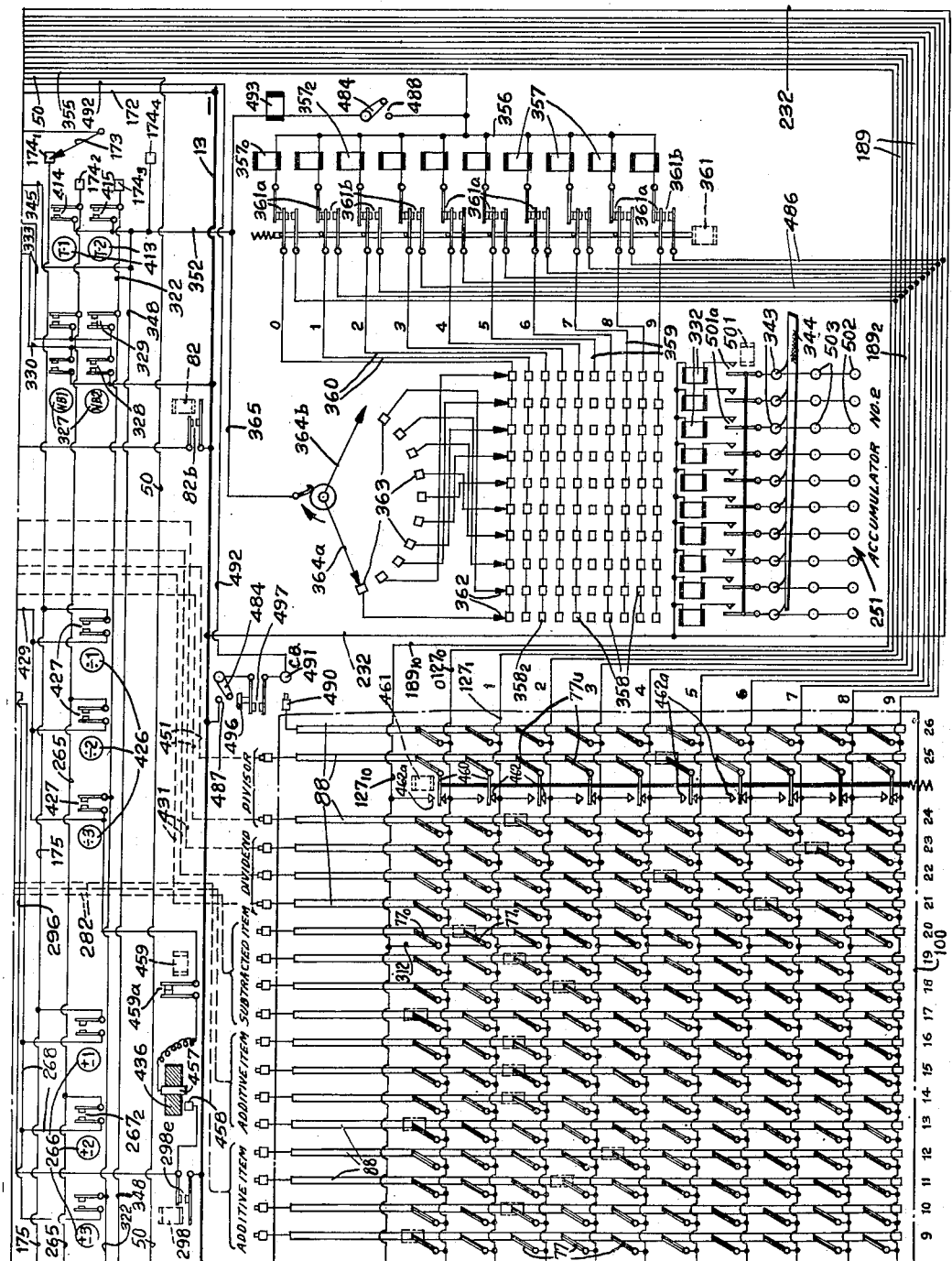

Referring now to Fig. 1 the circuit for the card feeding clutch control magnet 40 will now be explained. When the motor relay 16 is energized and contacts 16a are closed and with a card in the hopper, the circuit extends from the positive line side 14 through relay contacts 16a now closed, stop key contacts, contacts 48 (Fig. 1) now closed, contacts 47 (Figs. 1 and 6) now closed, clutch control magnet 40, cam controlled contacts C—17 (Fig. 3) now closed, relay contacts 82c which are now closed, to a wire 50 which extends as shown in Fig. 2 to contacts 51 which are now closed. Contacts 51 are connected by a wire to normally closed contacts 52, one blade of which is connected to the negative line side 13 (Fig. 4). Upon the energization of the clutch control magnet 40, the gear 39 (Fig. 6) will be rotated to cause the feeding of a card 100 from the hopper 44 in a manner now to be described.

The gear 39 (Fig. 6) meshes with a gear 53 attached to a shaft 54 and the extremity of the shaft 54 carries as shown in Fig. 5 a bevelled gear 55 in mesh with a bevelled gear 56 loosely mounted on a shaft 57.

Figure 9:
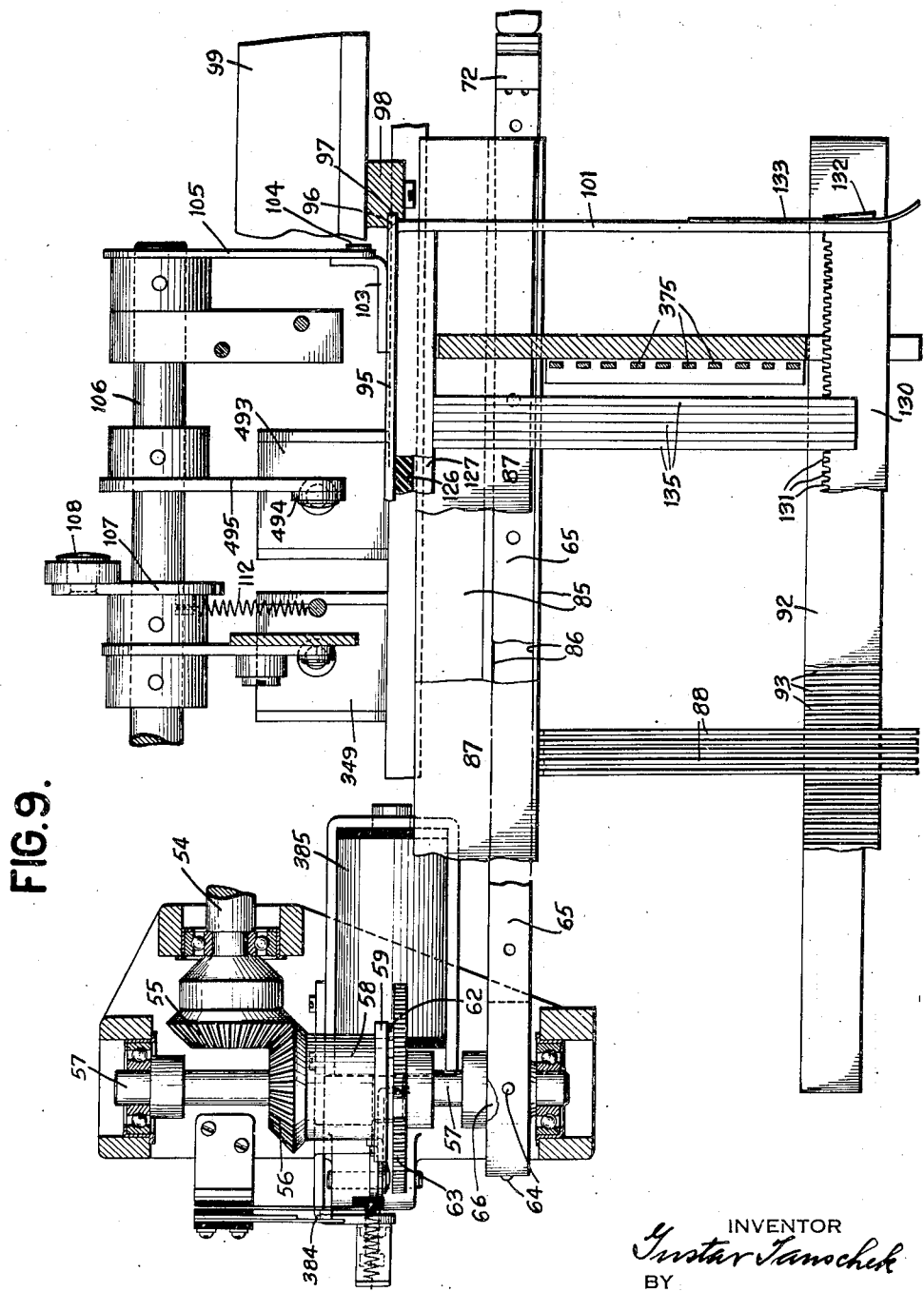
Fig. 9 is a plan view showing part of the analyzing brush reciprocating frame and the gear driving connections to the card feeding mechanism.
Figure 11:
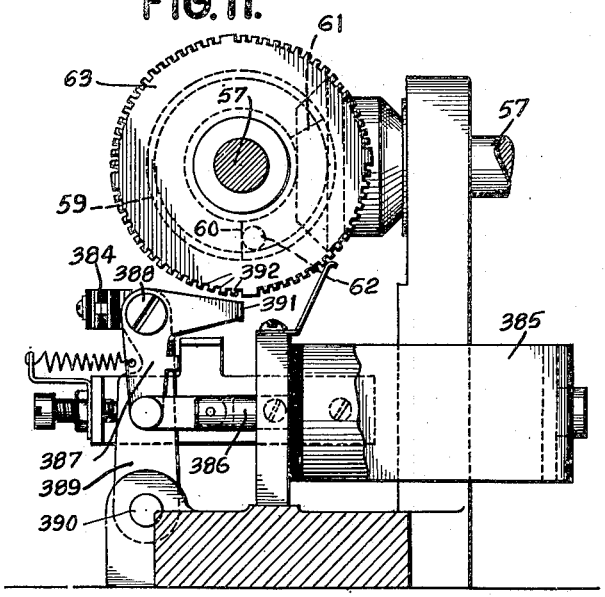
Fig. 11 is a detail view of the driving connections between the main drive and the card feeding mechanism and shows the electromagnetically operated devices for feeding the card step-by-step as card punching operations are effected.

Secured to the bevelled gear 56 is a sleeve 58 (Figs. 9 and 11) to which is attached a disk 59, it being understood that both the sleeve 58 and disk 59 are loosely mounted on a shaft 57. The formation of the disk 59 is best shown in Fig. 11 wherein it will be observed that it is provided with a cut-out portion forming shoulders 60 and 61, the shoulder 60 normally abutting a pin 62 carried by a mutilated ratchet gear 63. The gear 63 is secured to the shaft 57 and one end of the shaft as shown in Fig. 9 has fixed thereto a sprocket wheel 66 (Fig. 12) having a series of radial projections 64. Encircling the sprocket wheel 66 (Fig. 12) is a continuous band of metal 65 preferably of flexible steel or brass, the strip being perforated so as to receive the projections 64 of the sprocket wheel 66.

Referring now to Fig. 12, it will be noted that a shaft 67 is pivotally mounted in a bracket 68 of the machine and the shaft 67 carries a sprocket wheel 69 similar to the sprocket wheel 66 in that it is also provided with projections adapted to receive the apertures of the feeding band 65. As best shown in Fig. 12, the upper part of the band 65 passes through a hopper 44 at the bottom thereof and is so positioned that the lowermost card 100 will rest upon the band or tape 65.

The form of tabulating card 100 adapted to be employed to control calculating operations is well known in the art and is fully shown and described in the patent to C. D. Lake, No. 1,772,492, August 12, 1930, and as shown in this patent the upper horizontal marginal portion is blank and is not adapted to receive perforations to represent values.

The tape 65 is adapted to be aligned with this particular part of the card in order not to interfer with the analyzing brushes adapted to analyze the perforations of the tabulating card. The feeding tape 65 is provided with a plurality of card feeding devices or "pickers" more fully shown in Figs. 13 and 15.

Referring particularly to Fig. 15, it will be seen that to provide an efficient card feeding device, the tape at each of several portions is provided with a pair of tongues 70 and 71, the tongue 70 being formed by means of cuts 70' and 70'' and the associated tongue 71 is formed in a similar manner. The "picker" comprises a wedge-shaped member 72 which is preferably soldered or welded to the tongues 70 and 71 but not to the part of the tape between the tongues 70 and 71. In order to provide a suitable shoulder to engage the edge of the card, a shoulder 73 is provided and is so dimensioned that when the tape 65 is fed to the left under the stack of cards, the inclined end of the member 72 will slightly elevate the right end of the card to be fed until the right edge of the card is engaged by the shoulder 73. Thereupon the movement of the feeding tape 65 to the left will cause the lowermost card to be fed out of the hopper 44 and to a position beneath analyzing brushes to be subsequently described.

It will be obvious in view of the fact that the tape 65 is flexible and must move around the sprocket wheels in a concentric path that the feeding member 72 cannot be rigidly secured to the tape 65. As the tape passes in a concentric path over either sprocket wheel 66 or 69, the tongues 70 and 71 together with the member 72 may occupy a movement independent of the part of the tape 65 passing around a sprocket wheel thereby preventing damaging and separation of the parts if an integral construction was employed.

A plurality of such feeding members 72 is employed and one of them is normally so positioned as to cause an engagement with the lowermost card and feed the same to the left as viewed in Fig. 12 when the card feed clutch control magnet 40 (Fig. 7) is energized.

In order to prevent the feeding of more than one card from the hopper 44 at a time there is attached to one side of the hopper 44 a plate 74 (Fig. 14) positioned with respect to a plate 75 so as to form a card throat 76 of such dimensions that only one tabulating card 100 may be fed out of the hopper 44 at one time.

Upon a complete rotation of the gear 39 (Fig. 7), the tape 65 will be fed to such an extent that the tabulating card will be positioned beneath a series of analyzing brushes 77 (see Fig. 12) whereupon the card will remain in this position during the calculating operation.

Referring to Fig. 5, it will be seen that the gear 39 is adapted to mesh with a gear 78 attached to a cam carrying shaft 79. This shaft carries a series of cams adapted to control the opening and closure of "F" contacts hereinafter to be referred to.

Referring to Fig. 1, it will be seen that shaft 79 is provided with a cam 80 adapted during the final movement of the shaft 79 to close contacts F—2. Assuming that there is a card in the hopper 44 to cause the closure of contacts 46 when contacts F—2 are closed the circuit to the clutch magnet 31 will be closed through relay contacts 16a, stop key contacts, contacts 46 now closed, cam controlled contacts F—2 and also contacts 82a (Fig. 3) which are now closed.

Referring to Fig. 6, it will be obvious that the clutch control magnet 31 is energized just a short time prior to a complete rotation of the gear 39 of the card feed clutch but the gear 23 will not be driven until one of the extensions 22 engage with the previously released clutch pawl 26 at which time the gear 39 has been given a complete rotation. In this manner, the gear 39 is first given a complete rotation and then upon its stopping the gear 23 will, by means of its controlling clutch shown in Fig. 6, be given one or a series of rotations depending upon the type of calculating operation to be performed.

Referring to Figs. 1 and 6, it will be noted that when the arm 28 is shifted by the energization of the magnet 31 the contacts 46 (Fig. 1) will be opened thereby causing the deenergization of the card feed clutch control magnet 40. Nevertheless, as previously stated, the card feed clutch will be retained engaged to cause a complete rotation of the gear 39. With the opening of contacts 46 contacts 83 (Fig. 1) will be closed thereby extending the circuit from the positive line side 14 through relay contacts 16a, stop key contacts, contacts 83 to the clutch control magnet 31 and independently of the card controlled contacts 46 and the cam controlled contacts F—2. When the last-mentioned contacts F—2 open, the circuit to the clutch control magnet 31 will be retained closed by the closure of contacts 83 and the gear 23 will be given a series of rotations until terminated by the opening of contacts 82a effected by the energization of a relay magnet 82 by means to be subsequently described, or by the opening of cam controlled contacts C—1 near the end of the machine cycle if the stop key is depressed as is also later described.

When a tabulating card 100 is fed out of the hopper 44 the leading edge of the card passes to the left, as viewed in Fig. 5, and the card in its travel to the left is further guided by means now to be described.

Referring to Fig. 16, it will be noted that there is provided a longitudinal bar 84 of insulating material supported by the frame of the machine. Attached to the bar 84 is a longitudinal metal plate 85 provided with a recess 86 in which the card feeding tape 65 travels. (See also Fig. 9.) Rigidly secured to the plate 85 is a longitudinal plate 87 which is cut underneath longitudinally so that with respect to the upper surface of the feeding tape 65 there is formed a slot adapted to receive the card 100. The other edge of the card is adapted to travel in a plane beneath the brushes 77 by passing over a series of spaced tracks 88. A bar 89 of insulating material is provided with a tongue 90 providing a space above tracks 88 to further guide the edge of the card in its transverse movement and to keep it aligned with respect to the brushes 77.

A series of tracks 88 are provided, one for each card column, and they are preferably mounted by the following construction. Attached to a stationary bar 91 (Fig. 16) is a bar 92 of insulating material provided with longitudinal slots 93 (see Fig. 9) adapted to receive the tracks 88 which are constructed of some desirable metal of high electrical conductivity. The bar 89 (Fig. 16) is provided with slots similar to slots 93 of the bar 92 and are aligned therewith so that when the bars 90 and 92 are supported in the manner shown in Fig. 16 and suitably spaced apart, slots are provided for holding the tracks 88 in proper position and insulated from each other.

The rear portions of the metallic tracks 88 are received by a series of slots 94 formed in the bar 84 (see Figs. 10 and 16) so as to rigidly hold the metallic tracks 88 at their rear ends and spaced apart from each other. One track 88 is provided for each controlling card column there being guiding means for eighty tracks for a corresponding number of card columns of the tabulating card.

Associated with each track 88 is a brush unit 135 (Fig. 16) comprising a series of ten flexible wire brushes 77 which are adapted, when the card is in analyzing position, to be pressed against the card whereby the brush 77 positioned over the perforation in a column will pass through the perforation and make an electrical contact with the related track 88.

Figure 37:
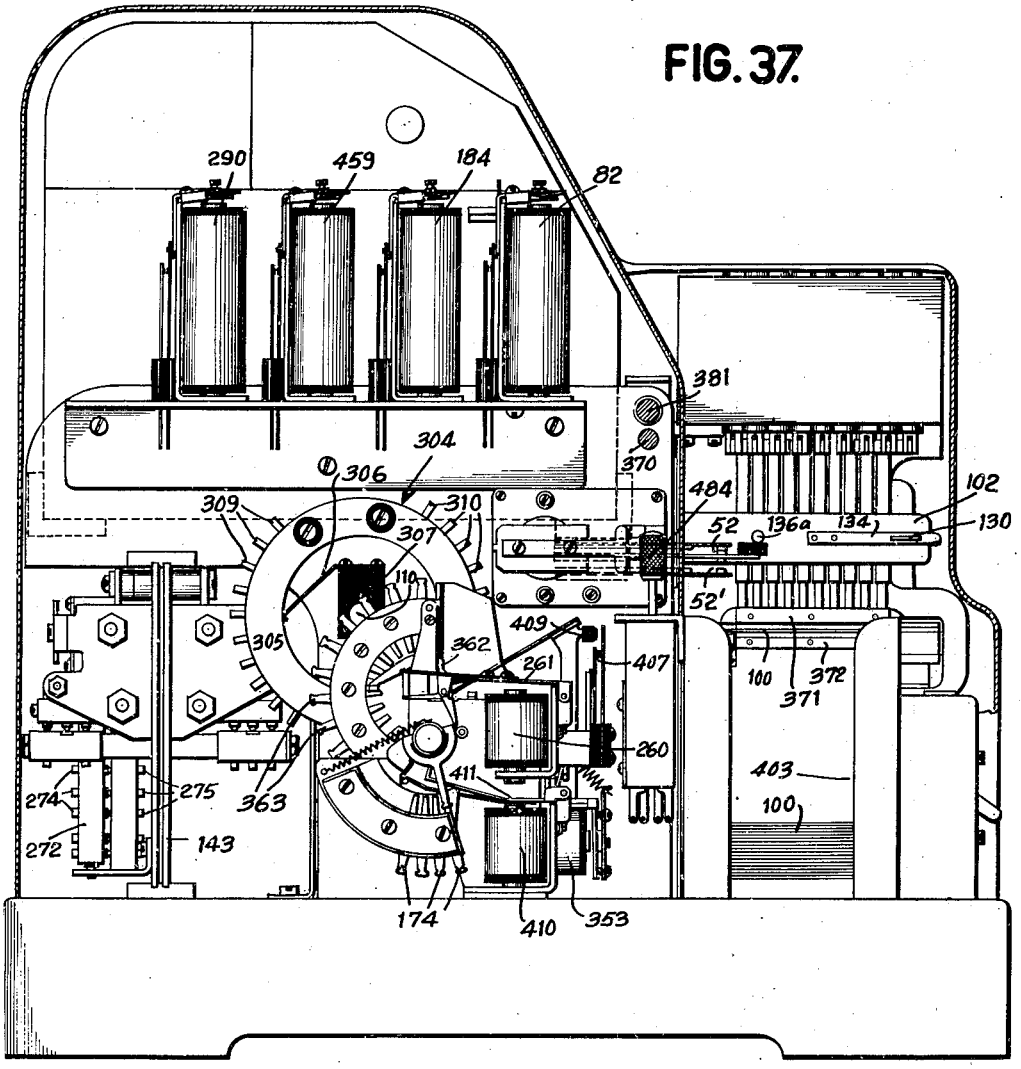
Fig. 37 is an end view of the machine taken at its left end as viewed in Fig. 5.

A suitable reciprocable framework is provided to carry all of the brush units 135 which are manually placed in operative position and to further cause the brushes to partake of a reciprocating movement. As best shown in Fig. 9, this framework comprises a transverse plate 95 provided with ears 96 adapted to fit in slots 97 of guide bars 98 attached to a cross bar 99 comprising part of the machine framework. Fig. 9 shows the structure for guiding the plate 95 in its reciprocating movement at its right end and precisely the same construction is used for guiding the frame at its left end. The transverse plate 95 is provided with integral arms 101 (Figs. 9 and 16), and 102 (Fig. 37). It is, therefore, obvious from the preceding description that the transverse plate 95 and side arms 101 and 102 comprise a yoke-shaped framework which is slidably mounted.

In order to effect a downward movement of the brush carrying framework, the following mechanism is preferably employed. The transverse plate 95 carries at each end, as shown in Figs. 9 and 16 for one end, a bracket 103 provided with a pin 104 adapted to receive the open slot of an arm 105 secured to a rock shaft 106. Attached to the rock shaft 106 is an arm 107 provided with a roller 108 adapted to cooperate with a profile cam 109 secured to a shaft 110. In the normal condition of the machine the brush carrying framework is in its upward position with the brushes 77 above the metal tracks 88 at which time the roller 108 rests on a circular part of the cam 109. During the initial rotation of the cam 109, in a clockwise direction (Fig. 16), and after the card is beneath the analyzing brushes 77, the cam portion 111 will rock the arm 107 against the action of a spring 112 thereby depressing the brush carrying framework downwardly and when it is in a depressed position it will be held by means of a spring pressed latch pawl 113 latching over an arm 114 secured to the shaft 106.

In order to cause the rotation of the shaft 110, the following gear connections are provided. Referring to Fig. 6, it will be seen that the gear 23 is adapted to drive a pinion 115 secured to a transverse shaft 116. The shaft 116 as shown in Fig. 16, is provided with a pinion 117 adapted to drive a gear 118 secured to the shaft 110. As previously stated, during a calculating operation the gear 23 is repeatedly rotated so that, through gear connections described, the cam 109 will also be repeatedly rotated. However, in view of the action of the latching pawl 113 after the initial rotation of the cam 109 further rotations of said cam will be ineffective to again move the arm 107 since the roller 108 thereof will be held out of cooperation with the cam portion 111 of the cam 109 and the brush carrying structure will be held in depressed position.

By means to be later described the brushes are subsequently released for restoration to their normal upward position out of contact with the tabulating card 100.

The preferred form of construction of each brush unit 135 and the means whereby the various brush units 135 are carried by the brush carrying framework will now be described with particular reference to Fig. 16. Each unit 135 comprises a plate 119 of insulating material which is provided with a diagonal cut or recess 120. In the process of manufacture a series of horizontal cuts 121 is made in the plate 119 and diagonal cuts 122 are also made, both of which terminate into the diagonal cut 120. Thus, a continuous recess is formed so as to receive a related brush holder 123 and an electrical contact pin 124 fitted within said holder. The brush holders and pins are differently shaped and bent so as to be received by its appropriate recess to thus provide a series of spaced brushes 77 spaced apart corresponding to the index points of a column of the tabulating card and to cause the conducting pins 124 to be spaced so that each row of conducting pins extends in a vertical plane. When the brush holders and associated pins are assembled within the plate 119 they are substantially flush with its surface so that they may be held in assembled position by means of an attached cover plate 125.

Referring to Fig. 16, it will be seen that the transverse plate 95 carries a longitudinal bar 126 of insulating material suitably cut longitudinally so as to receive eleven metallic bars 127. Adjacent bars are preferably insulated from each other by means of longitudinal strips 128 of insulating material.

A plurality of series of holes in each of the eleven bars 127 is provided and each series is aligned on a vertical line so as to receive the conducting pins 124 of a related brush unit. In order to further receive the conducting pins 124 the bar 126 is provided with holes which are aligned with respect to the holes of the series of bars 127. The bars 126, 127 and separating insulating strips 128 may be conveniently held by the plate 126 by any suitable means.

When certain columns of the tabulating card are adapted to control calculating operations the associated brush units 135 are positioned so that the conducting pins 124 thereof are received and held by the brush carrying framework in the manner previously described. It will also be recalled that for each card column the tabulating card is provided with ten index points, zero to nine inclusive. It will thus be obvious that by the provision of the ten lowest bars 127 all of the brushes related to the same index points of a plurality of columns are electrically connected by the related bar 127. However, the metal tracks 88 are insulated from each other so that only the brush 77 which passes through the particular perforation of a column will be effective in an electrical circuit for control purposes.

In order to further hold the brush units 135 in adjusted position to the brush carrying framework each of the plates 119 and 125 (together with the side arms 101 and 102 of the yoke-shaped frame) is provided with a slot 129 adapted to receive a locking plate 130.

The locking plate 130, as best shown in Fig. 9, is provided with a plurality of slots 131 for receiving the forward edges of the brush units 135 placed in operative position and thus spacing them apart. When the locking bar 130 is manually inserted so as to enter the slots 129 of the brush units 135 and the side arms 101 and 102 a portion 132 (Fig. 9) projecting outside of plate 101 will be received by an aperture in a spring plate 133 attached to the plate 101, the aperture corresponding to the sectional outline of the projecting portion 132. A somewhat similar locking means for the left end of the locking plate 130 is provided by means of a spring plate 134 (see Fig. 37).

As diagrammatically shown in Fig. 2 the arm 102 carries a pin 136a (see also Fig. 17) adapted when the brush carrying framework is depressed to engage with the lower blade of the contacts to thus open contacts 52 and open the circuit of the card feed clutch control magnet 40. Thus cards cannot be fed to cause damage to the brushes 77 if the brushes are in depressed position.

It should also be noted that the pin 136a is also adapted to close contacts 52' (Figs. 7 and 5) when the brush carrying framework is depressed and such contacts are utilized, as will now be described, to cause the energization of the clutch magnet 31 after the start key has been depressed.

Referring to Fig. 3 it is obvious that when the contacts controlled by the stop key 17 are opened during a cycle of machine operation the circuit to the motor relay magnet 16 is opened at this point. However, these contacts are shunted by cam controlled contacts C—1 controlled by a cam which is on a shaft 166 driven by gear 23, as will appear later.

These contacts thus retain the motor relay 16 magnet and clutch magnet 31 energized until almost a complete revolution of the gear 23 even though the stop key contacts are opened at any time during the machine cycle. The clutch and gear 23 coast to home position after cam contacts C—1 open, as is well known in the art.

If it is now desired to again start the machine, with the brush framework down and the contacts 52' (Fig. 1) closed, the start key is now depressed to energize the motor relay magnet 16. The circuit to the clutch control magnet 31 will now be from the positive line side 14, through relay contacts 16a, stop key contacts, and contacts 52' to the clutch control magnet 31.

*Multiplying mechanism*

The present machine is adapted to automatically effect in a predetermined sequence different types of calculating operations under control of a single tabulating card 100. For the present, there will be considered the manner in which multiplying operations, preferably effected by the partial products method, may be performed.

Figures 25, 38:
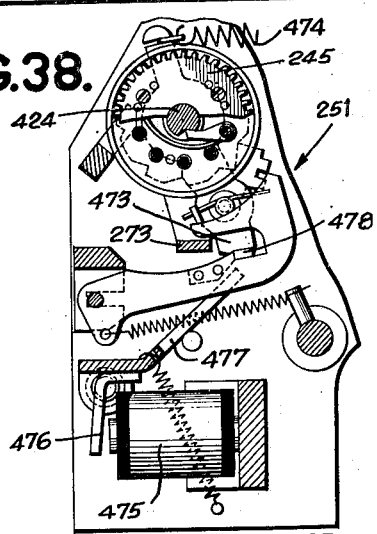
Fig. 25 is a plan view of part of a tabulating card shown perforated to control the various calculating operations selected by way of example and the punched result thereof.
Fig. 38 is a detail view of a transfer lock for one of the accumulators.

In Fig. 25, there is shown a tabulating card 100 which is shown perforated in columns 1 to 4 to represent a multiplier -4321- and also shown perforated in columns 5 to 8 inclusive to represent a multiplicand -1234-, which numbers can be multiplied together to enter the product in a product receiving accumulator. The card is placed in the hopper 44 with the printed face upwardly so that the card is fed to the brushes with the part having the cut-off corner leading. Correlated with these card columns, as previously described are analyzing units 135 and the metal tracks 88 each of which has connected thereto a plug cord (see Fig. 16), numeral 136 (Fig. 3) representing the plug cords for the multiplier and numeral 137 representing the plug cords for the multiplicand.

The plug cords 136 are inserted as shown by dotted lines in plug sockets 138 (Fig. 1) and the plug cords 137 are inserted as shown by dotted lines in plug sockets 139 (Fig. 1). Fig. 17 discloses the plugboard of the machine and the plug sockets 138 and 139 receiving plugs 136 and 137 in carrying out the multiplying operation used as an example are shown in black as well as for other sockets received by plugs connected to the metal tracks 88.

The above described plugging operations and others are made prior to machine operations and where other columns are utilized to represent the multiplier and multiplicand the metal tracks 88 corresponding to said card columns are plugged and brush units 135 are inserted for corresponding columns. It should also be noted that plug connections for the multiplier representing columns are so made that the "units" representing column will be the first to control and the others in succession in accordance with their increasing denominational orders. This, of course, is the usual practice and is well known to be necessary for proper multiplying operations.

The denominational shift device for the multiplying mechanism is diagrammatically shown in Fig. 1 and the details are disclosed in Figs. 18, 18A, 18B, 19 and 20 wherein it will be seen that there is provided a bar 140 of insulating material which is attached to a ball 141 slidably mounted on a rod 142. The rod 142 is carried by a multiplying unit frame plate 143 which is also adapted to carry the various parts comprising the denominational shift device. In the normal position of the bar 140 a series of contact elements 144 carried thereby will be out of contacting relationship with contact elements 145 carried by a stationary bar 146 and also fixed to the frame plate 143.

Each of the contact elements 144 has a wire connection 147 to the related one of the aforementioned plug sockets 139. However, upon a half step of movement of the bar 140 by means now to be described, the contact elements 144 will be shifted to make electrical contact with the series of stationary contact elements 145.

The means for effecting this initial half shift of the bar 140 will now be described. The bail 141 is provided with a series of teeth 148 (Fig. 18). Pivotally mounted on the frame plate 143 is an arm 149 upon which is pivoted at 150 a feeding pawl 151 having a lug 152 adapted to cooperate with the teeth 148 but normally overlie the upper edge of the bail 141 and between adjacent teeth 148 thereof. Also resting upon a tooth portion between successive tooth spaces is a lug 153 of a retrograde preventing pawl 154. An extension of the feeding pawl 151 is pivoted to a core 155 of a magnet 156. Upon energization of the magnet 156 the pawl 151, as it is shifted to the left, will be moved a half step idly until the lug 152 enters the notch comprising the tooth space at the extreme left, as shown in Fig. 18. Upon further movement of the core 155 caused by the continued energization of the magnet 156 the feeding pawl 151 will cause bar 140 to be shifted the distance of a half tooth space at which time the lug 153 of the retrograde preventing pawl 154 will engage with a tooth space of the bar 140 thereby preventing any retrograde movement of the bar 140 which would be caused by a return spring 157 connected to the bar 140 and the frame plate 143.

Upon the return of the arm 149 and the feeding pawl 151 effected by a spring 158 the arm 149 will be returned to its normal position and the spring 158 will rock the feeding pawl 151 clockwise to the position shown in Fig. 18, but at this time the lug 152 will be directly positioned over a tooth space. Thereupon each subsequent energization of the magnet 156 will cause the bar 140 to be moved a distance corresponding to a full tooth space.

The sockets 138 are adapted to have wire connections 159 to a series of contact elements 160 carried by the stationary bar 146. Cooperating with the contact elements 160 is a single movable contact element 161 movable to coact successively with the contact elements 160 as the bar 140 is given successive movements in equal units. The first contact element 161, as best shown in Fig. 18a, is normally out of electrical contact with the contact element 160 correlated with the units card column. However, upon a shift of the bar 140 equal to a half a unit the contact element 161 will make the desired electrical contact with the first contact element 160 of the series, whereby multiplying operations may be effected under control of the first multiplier digit, which in the problem assumed represents the digit "1."

Referring particularly to Fig. 6, it will be recalled that after the card has been fed to the desired analyzing position, the gear 23 will be given a full rotation to drive a pinion 115. The pinion 115 meshes with a gear 162 which is in mesh with a gear 163 secured to which is a pinion 164. The pinion 164 drives a pinion 165 secured to the shaft 166.

Figure 24:
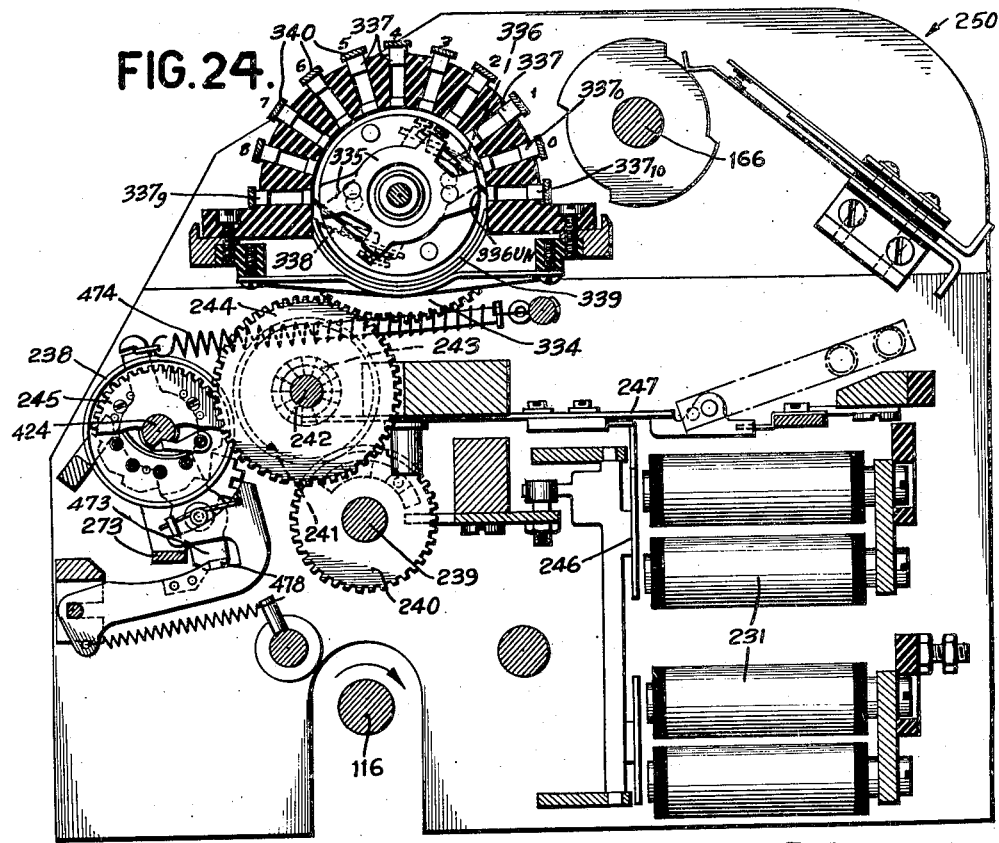
Fig. 24 is an enlarged sectional view taken on the line 24—24 of Fig. 17 and show the details of one of the accumulators.

Shaft 166 is also shown in Fig. 24 and carries a series of cams which control the opening and closing of various C contacts employed during a multiplying and other calculating operations, each of which will be described as the description progresses.

Referring to Figs. 1, 17 and 26 reference numeral 167 refers to a series of multiplying control keys, each key cap having a letter "X" to represent multiplication and a numeral as a subscript. When the calculating operation is to be multiplication one of these keys 167 is manually depressed to cause the closure of related contacts 168. In the example assumed multiplication is the first calculation of a series so that the $X_1$ key is depressed to cause the closure of contacts $168_1$ (Fig. 1). The construction of one of the keys 167 which is the same for all is shown in Fig. 26 where it will be seen that when the key is depressed a locking notch 169 will be engaged by a pin 170 carried by a spring urged detent plate to hold the key in its depressed position. The depression of the key is adapted to elevate a contact blade 171 to cause the closure of the aforementioned contacts 168.

Referring now to Figs. 2 and 4, it will be seen that from the negative line side 13 there is a wire connection 172 to a switch arm 173 through contacts 384 (see also Fig. 11) which are normally closed. The switch arm 173 is also shown in Fig. 21 and in its normal position, corresponding to the first calculating operation, it is in electrical contact with a contact point $174_1$, which leads by a wire connection 175 (see Fig. 4) to the contacts $168_1$ of key $X_1$ (see Fig. 1). From the closed contacts $168_1$ there is a wire connection 176 (Fig. 1) to the magnet 156 and also to a multiplication control relay 183 which is connected to the positive line side 14.

When the key $X_1$ is depressed to cause the energization of the magnet 183 of a relay, this relay will cause the opening of contacts 183a and 183d and the closure of contacts 183b and 183c, all being shown in Fig. 1.

The other side of the magnet 156 has a wire connection 177 to a contact plate 178 carried by the bar 146 and normally contacting with a movable contact element 179 carried by the movable bar 140. From the contact element 179 the circuit extends through the relay contacts 183c, now closed, cam controlled contacts C—7 closed by a cam secured to the shaft 166, the relay contacts 183b now closed, normally closed relay contacts 361c to the positive line side 14. The desired key 167 is shifted prior to a multiplying operation so that early in the first rotation of the shaft 166 contacts C—7 will be closed to cause the energization of the magnet 156 effecting a half step movement of the bar 140. After a half step movement of the contact element 179 (Fig. 18b) the latter will still contact with the plate 178 but later in the same cycle of rotation of the shaft 166 other contacts C—8, as will be described, will again cause the energization of the magnet 156 but effect in this instance a units movement of the bar 140. Magnet 156 has a wire connection 181 to the cam controlled contacts C—8 which are connected to the positive line side 14. Contacts C—8 will be subsequently effective to move the bar 140 a unit after its first movement of a half unit, and magnet 156 will be energized by successive electrical impulses to cause successive units movement of the bar 140.

The wire 176 is also connected to a magnet 184 of a relay, said magnet being connected to the positive line side through cam controlled contacts C—6. When the magnet 184 is energized a series of contacts 184a will be closed to complete circuit connections to be subsequently described.

As the bar 140 is shifted so that the contact element 161 (Fig. 1) successively makes electrical contact with the correlated contact elements 160 one of a series of control magnets identified in Fig. 1 by the general designation 186 is adapted to be selectively energized. The particular magnet 186 which is energized is dependent upon which index point of a particular multiplier column is perforated. When the first contact element 160 is engaged by the contact element 161 the units column will be selected for control purposes and since it is assumed that the "1" index point position is perforated, the magnet designated $186_1$ will be energized by the following described circuit. This circuit leads from the wire 176, which, as previously described is connected to the negative line side 13, to a wire $187$ which is connected to one side of the magnet $186_9$. From the other side of said magnet $186_9$ there is a wire connection 191 leading to one side of the magnet $186_1$ as well as to one side of the other magnets $186_2$ to $186_8$. From the other side of the magnet $186_1$ there is a wire connection $188_1$ to the related contacts 184a which it will be recalled are now closed due to the energization of the relay magnet 184. With the relay contacts 184a closed the circuit will be continued by a wire $189_1$ which leads as shown in Figs. 1, 2, 4 to the metal bar designated $127_1$ (Figs. 3 and 4) connecting all the brushes 77 correlated with the "1" index point position of all the controlling card columns. The circuit will be continued by the passage of the related brush 77 through the perforation at the "1" index point position (since the first multiplier digit is "1") and to the metal track 88 correlated with the units multiplier card column.

The circuit then extends by the plug connection effected by the plug 136 and socket 138 and contact elements 160 and 161 (now closed) to cam contacts C—9 by a wire connection 190 and thence to the positive line side 14 through relay contacts 183b and 361c now closed. Cam contacts C—9 close after contacts C—7 have been closed to give the initial half step of movement to bar 140 to engage contact elements 160—161. Obviously, in view of similar wire connections 189₁—189₉ from the series of contacts 184a to the metal bars 127 if any other index point including the "9" index point position has been perforated the corresponding magnet 186 will be energized. However, in each case since magnet 186₉ is in series with the selected magnet of the group 186₁ to 186₈ the control magnet 186₉ is always energized whether the "9" index point position is perforated or not. The function of the control magnets 186 will now be described.

Referring particularly to Figs. 16, 29, 30 and 32, a pair of guide rods 192 are adapted to be supported by a pair of frame pieces, one of which is shown in Fig. 30 and designated by numeral 193. Slidably mounted on these guide rods is a frame consisting of two side plates 194 and 195 which are apertured to receive the rods 192 and which are connected by an integral transverse plate 196. The side plates 194 and 195 have integral bent portions 197 adapted to carry a plate 198 provided with a plurality of bent over stop lugs 199. By the normal cooperation of the stop lug designated 199₉ (Fig. 30) with the movable core 200₉, of the aforementioned magnet 186₉, it will be evident that the movement of the aforedescribed frame by the action of a spring 201 connected thereto will be prevented.

Each of the magnets 186 is provided with a movable core 200 and each core is adapted to be moved downwardly against the action of a spring 203 when the related magnet is energized until a stop shoulder 204 (see Fig. 33) thereof is engaged with the top surface of a bent portion 205 of a stationary plate 226. When the magnet 186₉ is energized alone the related core 200₉ will be depressed and the frame will be moved the maximum distance by the spring 201 until the side plate 194 coacts with an abutment 202 (Fig. 30) of the frame piece 193. With the energization of any magnet 186₁—186₈ the plate 198 will be moved to the right as viewed in Figs. 30 and 29 until a stop shoulder 199 of the plate 198 strikes the side of the shifted core 200 but passes over a shoulder 206 of the core 200 of the magnet energized to hold plate 198 in shifted position even though the magnet is later deenergized. From Fig. 30, it will be evident that the various stop shoulders 199 to the left of the cores 200 are at varying distances. For example, the stop lug 199 at the extreme left, as shown in Fig. 30, will allow plate 198 to move a distance of one unit until the lug 199 strikes the core of the energized magnet 186₁ and over its shoulder 206. The second stop lug 199 from the left will permit plate 198 to move a distance of two units until the second stop lug 199 strikes the core of the magnet 186₂ and over its shoulder 206 and so on for the remaining magnets 186₃—186₈. The stop for the plate 198 when magnet 186₉ is energized has been previously described. As best shown in Fig. 32 for one core 200, the cores are provided with recesses 207 through which the stop lugs 199 may freely pass through the cores 200 of the unenergized magnets 186 when the movement given to plate 198 exceeds one unit.

As best shown in Figs. 29 and 32, riveted to the plate 196 is a series of brackets 208 each adapted to carry the pivot pin 209 of a related bell crank comprising an arm 210 and an arm 211. Each arm 211 carries an insulated contact plate 212 and each bell crank is urged by a spring 213 to cause a finger 218 of the related arm 210 to contact with the periphery of a rotatable cylinder 214. As shown in Fig. 32 the periphery of the cylinder 214 is provided with a plurality of differentially positioned apertures 215. Whenever an apertured portion of the cylinder 214 in its rotation receives the finger 218 of the arm 210 the spring 213 will rock the associated bell crank to close the contacts 217. The contact plates 216 are insulated from each other since they are carried by a bar 219 of insulating material and which is attached by any suitable means to the plate 196. Hence, the series of contacts 217 and operating fingers 218 may be moved transversely with respect to the cylinder 214 and to positions depending upon which magnet 186 is energized.

The differential positioning of the frame permits the various fingers 218 to be aligned and enter certain apertures 215 of the cylinder 214 during its rotation and such differential positioning is effected prior to the time that any of the fingers 218 coact with the apertures 215 during the rotation of cylinder 214.

As best shown in Fig. 29, the cylinder 214 is attached to the shaft 110 and as stated the latter is adapted to be given a complete rotation for each multiplying operation involving a single multiplier digit. At the termination of each rotation of the cylinder 214, a cam portion 220 (Figs. 29 and 30) attached to the gear 118 will coact with a roller 221 of an arm 222 secured to a rock shaft 223.

The rock shaft 223 is provided with a depending arm 224 which, as shown in Fig. 29, is connected to the plate 196 by a link 225. By this means the frame is returned to its normal position where it is relatched by the coaction of the core 200₉ with the stop lug 199₉ (see Fig. 33), since in the meantime the related magnet 186₉ together with any other selected magnet 186 have been deenergized. The lugs 199₉ in the movement of the plate 198 to the right engages a bevelled edge 200a of the core 200₉ depressing the latter until lug 199₉ is free whereupon the core 200₉ will be raised by its spring 203 and the core will be elevated with the lug 199₉ contacting with the side edge of the core 200₉ to hold the contact carrying frame in normal position.

As previously stated the cylinder 214 is provided with a number of perforations or apertures 215 so dimensioned and located as to represent the units and tens products of a multiplication table, the section A (Fig. 1) representing the units of the products and the section B representing the tens of such products. The formation of such a cylinder and the location of the apertures 215 so as to perform multiplying operations by the partials product method is fully shown and described in the German patents to Koller, #244,013 and #242,020.

There will now be described the manner in which multiplication is effected for the example assumed, that is, the multiplication of -1234- by -4321-.

The fixed contact elements 145 are provided with wire connections 227 (Fig. 1) which lead to a plurality of product sockets 228. These sockets are also shown in Fig. 17 and as shown in this figure and Figs. 1 and 2 there is provided a plug-ended cable 229 with wire connections adapted to individually connect the sockets 228 with the sockets 230.

Each of said sockets 230, as shown in Fig. 2, is connected to a related accumulator control magnet 231 through related relay contacts 500a and one side of each of said control magnets 231 of an accumulator 250 (Fig. 24) is connected by a common connection 232 which leads to the negative line side 13 as shown in Fig. 4.

After the bar 140 (Fig. 1) has been given a movement equal to a half unit cam contacts C—9 are closed so as to complete the circuit (previously described) to the selected control magnet 186₁ because the units multiplier digit is "1" and cause the energization of the latter since cam contacts C—6 are now closed to cause magnet 184 to be energized and close the contacts 184a between the lines 188₁ and 189₁. It will be understood that the movement of plate 198 and the sets of contacts 217 will be performed previous to the time the cylinder 214 has been turned sufficiently so that the fingers 218 could engage with certain perforations 215 aligned therewith. Since the plate 198 is given a longitudinal movement of a unit under control of magnet 186₁ the selected contacts 217₁ to 217₄ will be aligned with certain perforations 215 of the cylinder 214. Only the contacts 217₁ to 217₄ will be effective for accumulator entry control purposes in the example assumed because the index points 1—4 are perforated to represent the multiplicand and by reason of the following described circuit. From the positive line side 14 there is, through closed relay contacts 361c, as previously stated, a wire connection (Fig. 1) to contacts 183b which are closed during the multiplying operation because the selected key 167 is held depressed. From said contacts 183b there is a wire connection 235 to one blade of each of the series of contacts 217₁ to 217₉. The other blade of each of said contacts 217₁ to 217₉ has a related wire connection in a cable 236 to the fixed blade of the relay contacts 184b.

When the contacts C—6 open, relay magnet 184 (Fig. 1) will be deenergized and contacts 184a will, therefore, be opened thereby disconnecting the magnets 186₁ to 186₉ from the corresponding lines 189. Even through magnet 186₁ is now deenergized the position of the stop lug 199 over the shoulder 206 (see Fig. 33) of the depressed core 200 will retain the plate 198 in its shifted position of one unit as previously described.

The apertures 215 are so located that during the rotation of the cylinder 214 the contacts 217 aligned therewith will be closed when the related fingers 218 project through the apertures 215 and the engagement occurs at differential times during the rotation of the cylinder 214. For example, due to the lateral shift of the sets of contacts 217 a distance of one unit during the rotation of the cylinder 214 the entry of the finger 218 of contacts 217₄ with an aperture 215₄ (Fig. 1) will cause contacts 217₄ to be closed at the "4" point in the accumulator operating cycle. By reason of the fact that there will be a longer time delay before the finger 218 of the contacts 217₃ enters the aperture 215₃, the related contacts 217₃ will be closed later in the accumulator operating cycle, and by reason of the location of the particular aperture 215₃ contacts 217₃ will be closed at the "3" point in the accumulator operating cycle. Correspondingly, contacts 217₂ and 217₁ will be closed at the "2" and the "1" point, respectively, in the accumulator operating cycle due to the position of apertures 215₁ and 215₂.

Contacts 217₁ to 217₄ are only effective in the multiplying operation because the card is perforated to represent digits 1 to 4 of the multiplicand at the thousands, hundreds, tens and units order respectively to cause in the multiplying operation for the first multiplier digit "1" the energization of the accumulator control magnets 231 (Fig. 4) of corresponding denominational orders. When a particular contact 217 is closed the circuit connection will be extended from the positive line side 14, normally closed relay contacts 361c, contacts 183b now closed, the closed contact 217 involved, to a particular digit representing line 189 through the wire in the cable 236 and related relay contacts 184b. Said lines, as previously stated, are connected to the related connecting bars 127 and thence by means of the brushes 77 passing through the perforations at index point positions 1 to 4 to the metal tracks 88. The circuit then extends by the plug cords 137 to the sockets 139, wires 147, contact elements 144, 145, wires 227, sockets 228, plug cable 229 to the sockets 230 (Fig. 2), relay contacts 500a, accumulator control magnets 231, and wire 232 to the negative line side (see Fig. 4).

Contacts C—5 are closed to close the circuit of the relay magnet 500 and its energization causes the closure of relay contacts 500a during the time the fingers 218 are correlated with the apertures of sections A and B of cylinder 214. Contacts C—5 close after contacts C—6 have been opened and which opening causes relay magnet 184 to be deenergized and the resultant closure of relay contacts 184b.

By reason of the transmission of the differentially timed electrical impulses created by the apertures 215 and the resultant energization of accumulator control magnets 231 accumulator wheels 238 (see Fig. 24) are adapted to be given rotations of differential extents.

The construction of the accumulator 250 adapted to be employed in connection with the present invention is well known in the art and is fully shown and described in the patent to C. D. Lake, #1,307,740 dated June 24, 1919, and for this reason will only be generally explained.

The driving shaft for the accumulator is designated by numeral 239 and as shown in Fig. 6 has attached thereto the driving gear 162. The ratio of the gearing to shaft 239 and to the shaft 110 (Fig. 16) from the gear 23 is so selected that for each revolution of the shaft 110, corresponding to a full rotation of the partials product representing cylinder 214, there will be two rotations of the accumulator drive shaft 239 or two accumulator operating cycles for one revolution of the cylinder 214.

Reverting now to the description of the accumulator 250 a gear 240 (Fig. 24) secured to the shaft 239 is adapted to drive by means of an intermeshing gear 241 a shaft 242. Mounted upon said shaft are a plurality of electromagnetically controlled clutch devices designated generally by the reference numeral 243 (Fig. 24). One of said clutch elements of each clutch device is fast to the shaft 242 and the other is loosely mounted upon said shaft but is secured to a gear 244 adapted to drive a gear 245 secured to the related accumulator wheel 238.

When a particular accumulator control magnet 231 is energized at a differential time an armature 246 thereof will be attracted so as to release a spring-pressed clutch control lever 247 for movement thereby engaging the clutch device 243 and causing the rotation of the accumulator wheel 238 at a differential time and up to a fixed time.

In view of the fact that the clutch connection continues despite the deenergization of the control magnet 231 until a fixed point in the cycle of operation is reached it is only necessary to form the apertures 215 as shown in Fig. 1 so as to cause the transmission of short electrical impulses at the proper points in the cycle. In view of the continuity of the clutch engagement the accumulator wheel 238 will be rotated without interruption irrespective of the fact that the finger 218 will subsequently engage with the periphery of the cylinder 214 and thus cause the opening of related contacts 217.

At a fixed point at the end of each operating cycle the clutch control lever 247 is shifted to disengage the clutch device by means more fully shown and described in the aforementioned patent to C. D. Lake, 1,307,740.

Summarizing, therefore, it will be noted that since the units of the multiplicand is perforated to represent "4" and since the units multiplier digit represents "1," contact 217₄ will be closed by the perforation 215₄ at the "4" point in the cycle thereby causing the units order accumulator wheel to be rotated to an extent of four units causing the wheel 238 to exhibit "4." Correspondingly, contacts 217₃ being closed one point later in the cycle will cause the tens order accumulator wheel 238 to be turned three steps so as to exhibit "3." Also, since the multiplicand is perforated at the "2" and "1" index point positions in the hundreds and thousands order respectively, contacts 217₂ and 217₁ will be closed by related perforations 215₂ and 215₁ so as to cause the accumulator wheels of corresponding denominational orders to be rotated so as to exhibit at the end of multiplication operation for the units partials product, "2" and "1." The accumulator wheels 238 will now exhibit -1234-.

After the apertured section A of the partials product representing cylinder 214 is out of cooperation with the fingers 218 contacts C—8 will be closed so as to cause a second energization of the magnet 156 thereby effecting a movement of the bar 140 equivalent to a single unit. This will effect a change in denominational relationship between the accumulator control magnets 231 and the multiplicand entering brushes 77 for the subsequent entry of the "tens" partials product. In view of the fact that in the example assumed multiplication of the multiplicand -1234- by the multiplier digit "1" does not produce any "tens" partials product, there will be, in the example assumed, no accumulator entry during the second accumulator operating cycle for the first multiplier digit.

After the section B (Fig. 1) of the partials product representing cylinder 214 is out of cooperation with the fingers 218 the latter will now be aligned with an elongated slot 248 (Fig. 29) so that the cam 220 may shift the frame carrying the contacts 217 back to normal and relatched position preparatory for the next position of the frame controlled by the second multiplier digit. It should be noted that even though the sets of contacts 217 close cam controlled contacts C—5 are now closed energizing relay magnet 184 opening relay contacts 184b disconnecting the series of contacts 217 from the lines 189s to prevent false circuits.

In the example assumed, the second multiplier digit consists of the digit "2" since the "2" index point position of the tens multiplier card column is perforated. In this multiplying operation, magnet 186₂ will be energized permitting a movement of the frame 198 carrying the series of contacts 217 to a distance equivalent to two units. Contacts 217₁ to 217₄ are still effective for multiplying purposes as previously explained since the multiplicand number has not been changed. Contacts 217₁ to 217₄ will now be aligned with other apertures 215 and they are so positioned as to cause an entry in the proper accumulating orders corresponding to the product of each multiplicand digit -1234- and the multiplier digit "2." In view of the previous denominational shift the product of 4×2, or 8, will be entered in the tens order, resulting in the addition of "8" to the previous entry "3." Also the tens multiplicand digit "3" will be multiplied by 2 and the product, or "6," entered in the hundreds order. The multiplicand digit "2" will be multiplied by the multiplier digit 2 and entered in the thousands order. Correspondingly, the multiplier digit 1 will be multiplied by the multiplicand digit 2 and entered in the tens of thousands order of the accumulator. With the previous reading of -1234- in the accumulator and the addition of the next units product, the summation will be as shown below:

```
00000001234   Previous reading
0000002468    Multiplication for second
              digit
00000025814   (No transfer)
00000025914   (After the transfer)
```

In view of the fact that there is a transfer operation in the hundreds order of the accumulator, being initiated by the addition of "3" and "8," a unit will be transferred to the hundreds order of the accumulator prior to the shift of bar 140 and before entering the "tens" partials product. The transfer mechanism employed in connection with the form of accumulator shown in Fig. 24 is well known in the art and is fully shown and described in the aforementioned patent to Hollerith No. 974,272 and Patent No. 1,976,617, to C. D. Lake et al. The transfer mechanism is adapted to carry a unit to the succeeding denominational order whether the entering of the digit to effect the transfer comes from the entering of the units partials product or the tens partials product.

After the apertured section A of the partials product representing cylinder 214 is out of cooperation with the fingers 218 contacts C—8 will be closed to cause another energization of the magnet 156 thereby effecting a movement of the bar 140 equivalent to a single unit.

In multiplication by the second multiplier digit "2," section B will be effective with respect to the contacts 217 during the second accumulator operating cycle. But in this particular multiplication by the digit "2" there will be no "tens" of partials product to be entered and the accumulator will continue to exhibit the sub-product -25914-.

It will be recalled that the bar 140 has been given a denominational shift after section A for the second multiplier digit has been effective so as to cause the succeeding multiplying digit "3" of the hundreds order to be effective for control purposes and also to change the denominational relationship between brushes 77 and the accumulator control magnets 231. However, after the addition of the units product -3692- and expressing the computation as:

```
        00000025914
        000003692
        _____
        00000395114
``` there will be the entry the tens partials product (after a denomination shift) since the multiplier digit consists of "3" and it is to be multiplied by the units multiplicand digit "4" giving a product "12." The tens partials product or the digit "1" will be entered during the second accumulator cycle in the manner which will now be explained.

During the multiplying operation by the digit "3" it will be noted that contacts $217_4$ will be positioned a distance of three steps to the right as viewed in Fig. 1. During the time that the section B of cylinder 214 is effective the finger 218 of contacts $217_4$ will enter an aperture $215_{1B}$ to thereby cause the closure of contacts $217_4$. This will cause an electrical impulse to be transmitted to the thousands order accumulator control magnet 231 thereby causing the entry of a unit in this order.

At this time it is explained that the transfer operations effected after the entry of the units or tens product are not entered in the same accumulator cycle for the multiplier digit but they are timed to occur during the beginning of the next accumulator cycle whether it is for multiplying or any other purpose.

The Patent No. 1,976,617 shows in Fig. 6 the cam (107) adapted to cause the operation of bail 273 (Fig. 24) to effect carry operations. In the present machine this cam is secured to shaft 239 but with such a timing relationship with respect to gear 23 (Fig. 6) that transfer operations for each accumulating cycle will occur at the beginning of the next cycle or at the beginning of the rotation of gear 23. This operation of bail 273 occurs with sufficient rapidity and so early in the next cycle that it will permit other operations, such as resetting of the accumulator, punching, etc., to be all properly performed despite this change in timing in the present machine.

The accumulator 250 will now indicate the incomplete product -00000396114-. Thereafter a subsequent multiplying operation is effected precisely in the manner explained during which time the multiplicand -1234- is multiplied by the multiplier digit "4." At the end of this multiplying operation, the wheels of the accumulator 250 will exhibit the final result or -00005332114-.

It should be observed that it frequently happens that one of the multiplying digits constitutes a zero and in the present embodiment the machine will go through an operating cycle but the only effective work that will be done upon the occurrence of a zero is the denominational shift of the bar 140. Obviously, there will be no entry in the accumulator 250.

After the multiplication operation for the last multiplier digit the machine will go through successive cycles of operation moving the bar 140 step-by-step until the movable contact element 161 makes electrical contact with the contact element 160 at the extreme left. At the beginning of the next cycle of machine operation, when cam contacts C—9 close, a circuit is made extending from the positive line side 14, relay contacts 361c now closed, relay contacts 183b now closed, contacts C—9, wire 190, contact element 161, the contact element 160 just referred to and the wire connection 159 to the related plug socket 256, and by a wire 252 leading to a magnet 253 of a relay. The other side of said magnet is connected by a wire 254 (Fig. 3) to the negative line side 13. Magnet 253 will be energized during the ninth cycle of machine operation whether the multiplier is represented by a number comprising eight denominational orders or not.

In order to eliminate idle cycles and to cause the energization of the magnet 253 in a cycle immediately following that in which the multiplying operation is completed a double ended plug cord 255 is connected between a socket 256 electrically connected to the wire 252 and to the plug socket 138 corresponding to the denominational order which is one higher than the highest order of the multiplier. However, in view of the fact that the bar 140 is given a units step of movement preparatory to the multiplying operation for the succeeding multiplier digit the relay magnet 253 will be energized one cycle after the last cycle of multiplying operation.

The plug socket 256 and the plug cord connection 255 for the example assumed is also shown in Fig. 17 and this plugging connection is also made prior to machine operations.

Referring to Fig. 1 when the magnet 253 is energized it will cause the closure of relay contacts 253a and at the beginning of the cycle in which cam contacts C—9 close cam contacts C—3 are also closed thereby providing a stick circuit for the relay magnet 253 through relay contacts 253a, cam contacts C—3, and a wire connection 257 connected to the positive line side 14. Relay magnet 253 is adapted to effect the closure of relay contacts 253b thereby extending a circuit from the negative line side 13 through relay contacts 253b and a magnet 258, the other side of said magnet being connected by a wire 259 to the positive line side 14. The magnet 258, as shown diagrammatically in Fig. 1 and also in Fig. 18, is adapted to rock the retrograde preventing pawl 154 clockwise thereby releasing the bar 140 for movement to normal position by the action of the return spring 157.

A magnet 260, referring to Fig. 1, is in parallel circuit connection with the magnet 258 and is energized by the aforedescribed electrical circuit. The magnet 260 is shown in Fig. 21 and is adapted to attract its armature 261 to thereby reciprocate a pawl 262 which latter is adapted to engage a ratchet wheel 263 secured to the selector arm 173. Arm 173 is thereby shifted so that it will contact with a contact element $174_2$ and this position will be held by means of a retrograde preventing pawl 264 engaging the teeth of the ratchet wheel 263.

Referring now particularly to Fig. 4, it will be seen that with the electrical contact of the selector arm 173 and the switch point $174_2$ a circuit will be extended from the negative line side 13 through contacts 384 now closed to a wire 265. In Figs. 4 and 17 reference numeral 266 designates a series of three cross-calculation control keys similar in construction to the aforementioned keys 167 (see Fig. 26). The key cap of each of these three keys is provided with a symbol ± indicating that such keys control cross-calculating operations and alongside said symbol a digit is provided indicating which key is to be depressed when the cross-calculation is effected first, second or third in order.

Cross calculation mechanism

In the example assumed the second calculating operation to be performed comprises cross-calculation so that the key 266 designated ± 2 will be depressed to close related contacts 267₂ thereby extending the circuit from the wire 265 through said contacts to a wire 268 connected to one side of an operating magnet 269. The other side of said magnet is connected by a wire 270 to the positive line side through cam controlled contacts C—10.

Figure 34:
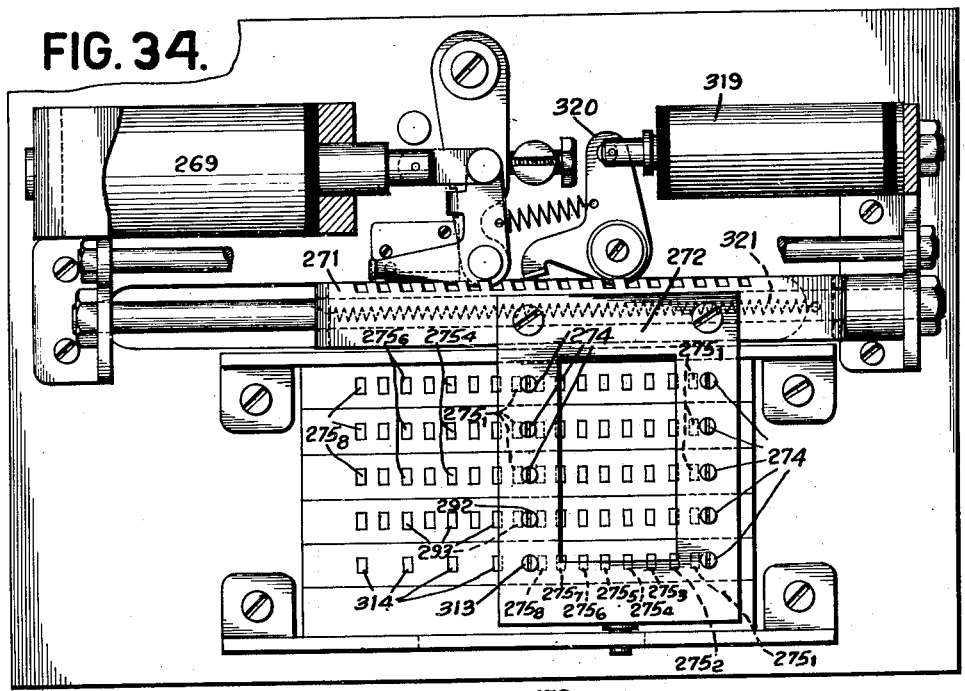
Fig. 34 is a view in side elevation showing part of the mechanism utilized for effecting cross calculating operations.

Magnet 269 is shown in Fig. 34 and when energized is adapted through a pawl and ratchet device similar to that described in connection with the denominational shift device of the multiplying apparatus shown in Fig. 18 to cause an initial movement of a bar 271 equivalent to a half unit. Thereupon the successive energizations of the magnet 269 will move the bar 271 in equally spaced units. The bar 271 is adapted to carry a plate 272 provided with contact elements to be subsequently described.

The cross calculation unit is adapted to control the entry of a plurality of amounts represented on the same tabulating card that represents other amounts to be calculated and to control the entry either additively or subtractively depending upon a preselection.

By way of example, it will be assumed that the cross calculation unit will control the entry of three amounts, the first comprising a number -0234- which is entered additively, the second amount comprising the number -0222- which is also entered additively and the third amount, comprising the number -0321-, which will be entered subtractively. The first amount is represented by perforations in columns 9 to 12, the second amount in columns 13 to 16, and the third amount in columns 17 to 20, as shown diagrammatically in Fig. 4 and also by the card shown in Fig. 25.

Obviously, the other card columns may be perforated to represent other or the same amounts so as to control their entry by the cross calculation unit in the accumulator 250.

Referring to Figs. 2 and 34, the bar 271 is provided with a series of eight amount controlling contact elements 274 adapted to be correlated successively with each series of eight series of contact elements 275₁ to 275₈ and the fingers 274 are adapted to be operatively connected with the first series of contact elements 275₁ when the bar 271 is given its half step of movement. By connections now to be described this will control the entry of the amount represented in columns 9 to 12 in the accumulator 250.

The contact fingers 274 have individual wire connections 276 (Fig. 2) to a series of plug sockets 277 and said plug sockets are also shown in Fig. 17. From the plug sockets 277 there is a plug connection comprising individual wire connections which may be in a cable 278 to a series of sockets 279 (Figs. 2 and 17) of accumulator 250.

The eight series of contact elements 275₁ to 275₈ are connected by wires 281 (Figs. 2, 3 and 4) to eight series of plug sockets 280 (see Fig. 17). The particular series of contact elements 275₁ have, for example, individual wire connections 281 to a series of plug sockets 280₁ (Fig. 17) four of which are received by the plug cords 282 (Fig. 2) electrically connected to the metal tracks 88 (Fig. 4) pertaining to columns 9 to 12. Similar plug connections are made as shown in Figs. 2 and 4 between the metal tracks of card columns 13—16, and 17—20 and the sets of sockets 280 connected to the sets of contact elements 275₂ and 275₃, respectively.

By the above described electrical wiring and plug cord connections, the analyzing brushes 77 passing through perforations of columns 9 to 12 will be electrically connected by individual electrical circuits with the accumulator control magnets 231 which are all connected to the negative line side 13 through the previously described common wire connection 232. The accumulator control magnets 231 are connected to the wires in the cable 278 by the relay contacts 500a. These are closed because the multiplication control relay 183 is now deenergized and its relay contacts 183d are closed to cause the circuit of the relay magnet 500 to be closed. The means for electrically connecting the positive line side 14 to the accumulator magnets 231 at differential times dependent upon the index point perforated will now be explained.

Referring to Fig. 2, it will be seen that the shaft 110 carries an arm and said arm is provided with a brush 284 adapted to continuously make electrical contact with a ring 283. The arm also carries a brush 286 which is adapted to make electrical contact with each of a series of stationary contact elements 285a during one-half of the rotation of shaft 110 and also make electrical contact with each of a second series of stationary contact elements 285b during the second half of the rotation of shaft 110. The above described contact making devices comprise an additive control section 303 of an emitter 304 (Fig. 17). The duplicate arrangement is provided for proper accumulator control operations since it will be recalled that the shaft 110 makes one revolution for two accumulator cycles so that either the contact elements 285a or the contact elements 285b will control the transmission of electrical impulses in an accumulator cycle to the accumulator control magnets 231 by their connection to the positive line side 14.

The related contact elements of the stationary contact elements 285a and 285b are connected by individual wire connections 287 and the contact elements 285a have individual wire connections 288 to the nine digit representing lines 189₁ to 189₉. The contact ring 283 has a wire connection 289 to one blade of contacts 290a, the other blade being connected by a wire 291 to the positive line side 14 through the previously described contacts 183a (Fig. 1) which are closed during the cross calculation operation since magnet 183 is normally deenergized and the normally closed relay contacts 361c. The electrical circuits for the accumulator control magnets will be connected to the positive line side as the brush 286 successively contacts the said contact elements 285a or the said contact elements 285b.

Since the shaft 110 is driven synchronously with respect to the accumulator drive shaft 239 (Fig. 24) electrical impulses will be transmitted to the control magnets 231 at differential times and similar in timing to entry operations during multiplication. For example, in the entry of the amount -0234- when the brush 286 contacts the contact element designated 285A₄, the circuit for the units accumulator control magnet 231 will be extended from the brush 77 at the "4" index point to the positive line side through the related connecting bar 127, the connected digit line 189₄, the wire connection 288 leading to the contact element 285A₄, brush 286, brush 284, contact ring 283, wire connection 289, contacts 290a now closed, wire 291, contacts 183a now closed and normally closed relay contacts 361c to the positive line side 14.

For the entry of the amount in the tens and hundreds order the additive control section 303 of the emitter will cause the correlated accumulator control magnets 231 to be energized at later points in the accumulator operating cycle.

In the multiplying operation previously described the product which was entered in the accumulator comprise the number of -00005332114-. To this is added in the same accumulator the first amount of the cross calculation operation, or -0234-, now giving a result of -00005332348-.

After the first accumulator operating cycle cam controlled contacts C—10 (Fig. 2) will now be closed thereby effecting a circuit connection from the positive line side 14 through said cam contacts C—10 and by a wire 270 to the aforementioned magnet 269, wire 268, contacts 267₂, wire 265, contact 174₂, switch arm 173, contacts 384 to the negative line side 13, which upon its energization will cause a full step of movement of the plate 271.

Contact elements 274 will now be correlated with the second set of contact elements 275₂ and by suitable plug connections, similar to that previously described, the additive section 303 of the emitter will cause electrical impulses to be transmitted to the accumulator magnets 231 at differential times so as to effect the entry of the next additive amount, or -0222-, and after the transfer operations have been effected, which as previously stated will be effected at the beginning of the third accumulator cycle, the accumulator will exhibit the amount -00005332570-.

The third amount to be entered or the number -0321- is entered subtractively. Similar plug wire connections are made but an additional plug connection is also made when an amount is to be entered subtractively. The plate 271 carries a subtracting control contact element 292 (see Figs. 2 and 34) adapted to make electrical contact with one of a series of contact elements 293. Each of the contact elements 293 has a wire connection to a related plug socket 294. The series of plug sockets 294 are shown in Fig. 17 and adjacent said sockets is a series of plug sockets 295 (Fig. 2) which are electrically connected to a wire 296 (Fig. 2) which wire is connected to one side of a relay magnet 290. The other side of the relay magnet 290 is connected to the positive line side through normally closed relay contacts 298c.

In order to cause an amount to be entered subtractively for the third amount a plug connection designated by numeral 300 in Figs. 2 and 17 is made. Similar plug connections for other negative amounts would be made and the related sockets 294 and 295 would be cross connected in the same row that the negative amount is plugged to sockets 280.

When the plate 271 is given its third step and when the contact elements 274 engage with the series of contact elements 275₃, the contact element 292 will make electrical contact with the contact element 293₃ thereby extending the circuit from the negative line side 13 (Fig. 4) through contacts 384, switch arm 173, contact point 174₂, contacts 266, wire 268 to contact element 292, contact element 293₃, to the plug connection 300, to the relay magnet 290 thereby causing its energization. When the magnet 290 is energized contacts 290a are opened and contacts 290b are closed thereby connecting the positive line side to a wire 299 through normally closed relay contacts 183a and 361c.

Referring particularly to Fig. 2, it will be seen that a subtractive section 304 of the emitter is provided and differs from the additive section 303 in the respects now to be noted.

Each amount to be subtracted is entered in the accumulator 250 by the entry of the tens complement so that in order to subtract the third amount, or -0321- the tens complement, or -9679- is entered. Ordinarily to cause the disappearance of the "1" in the accumulator result at the extreme left in the entry of the tens complement each order at the left of the significant figure of the highest order is also complemented to "9," as is well understood, and in the present arrangement such orders may be punched to represent "0" to cause a "9" entry.

The wire 299 (Fig. 2) is connected to a ring 305 which is engaged by a brush 306 carried by an arm 307 also secured to shaft 110. The brush 306 is electrically connected to a brush 308 carried by arm 307 and brush 308 is adapted during one-half of the revolution of shaft 110 to engage with a series of ten contact points 309 and in the other half of the revolution of shaft 110 with another series of ten contact points 310. The related contact points of a set are interconnected by wires 311 and the digit representing lines 189₁—189₉ are connected to the set of contact points 309 in a manner now to be described.

The digit lines 189₈ to 189₀ are connected to the related set of contact points 309 by complementarily arranged connecting wires thereby causing for orders above the units order the transmission of electrical impulses to the related accumulator magnets at differential times but complementary (of nine) with respect to the index point perforated.

For example, the hundreds order of the number to be subtracted comprises the digit "3" and the digit line 189₃ is effective but this line is connected to contact point 309₆ whereby the circuit will be made to the correlated accumulator control magnet 231 at a time in the cycle for the entry of six or the nines complement of "3."

For the units order, the tens complement must be entered in all cases. To secure the entry of the tens complement for this order a different form of brush unit is utilized. The ten brushes 77 as shown in Fig. 36 engage the correlated index point positions as for other units but the pins 124 for the brush positions 1—9 are so disposed as to be connected to the metallic bars 127 corresponding to a digit one unit lower.

In the example assumed the units digit is "1" and the related brush 77₁ is connected to metallic bar 127₀ (see Fig. 4) and there is also as shown in Fig. 2 a connection of the corresponding digit line 189₀ to the contact point 309₉. The latter is so positioned that the units accumulator magnet will be energized at a point in the accumulator cycle to cause the entry of "9" or the tens complement of the units digit "1."

However, in case that the units digit is "0" the units accumulator wheel must be turned a full revolution to effect a transfer of a unit to the wheel of the second denominational order to give the proper tens complement. If the number was -0320- the second digit, or "2" (since it can only control the entry of "7" or the nines complement by the present arrangement), must be increased by "1" to give the tens complement or "8" of the digit "2." This is effected by causing the units wheel to be turned ten steps to effect the transfer of a unit to the tens denominational order.

Figure 36:
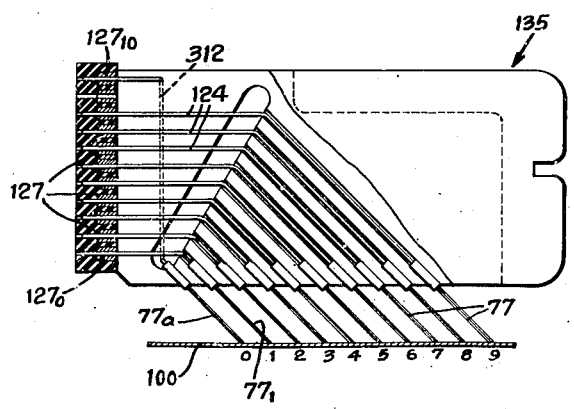
Fig. 36 is a detail view of a special card analyzing unit used for the units denominational order in controlling negative amount entry operations.
Figure 39:
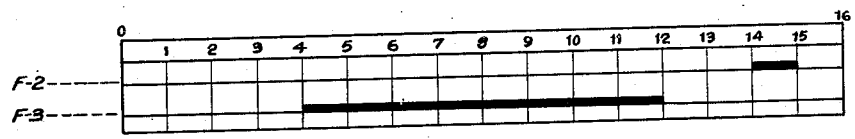
Figs. 39 and 40 are diagrams illustrating the timing of certain cams employed for controlling electrical contacts.
Figure 40:
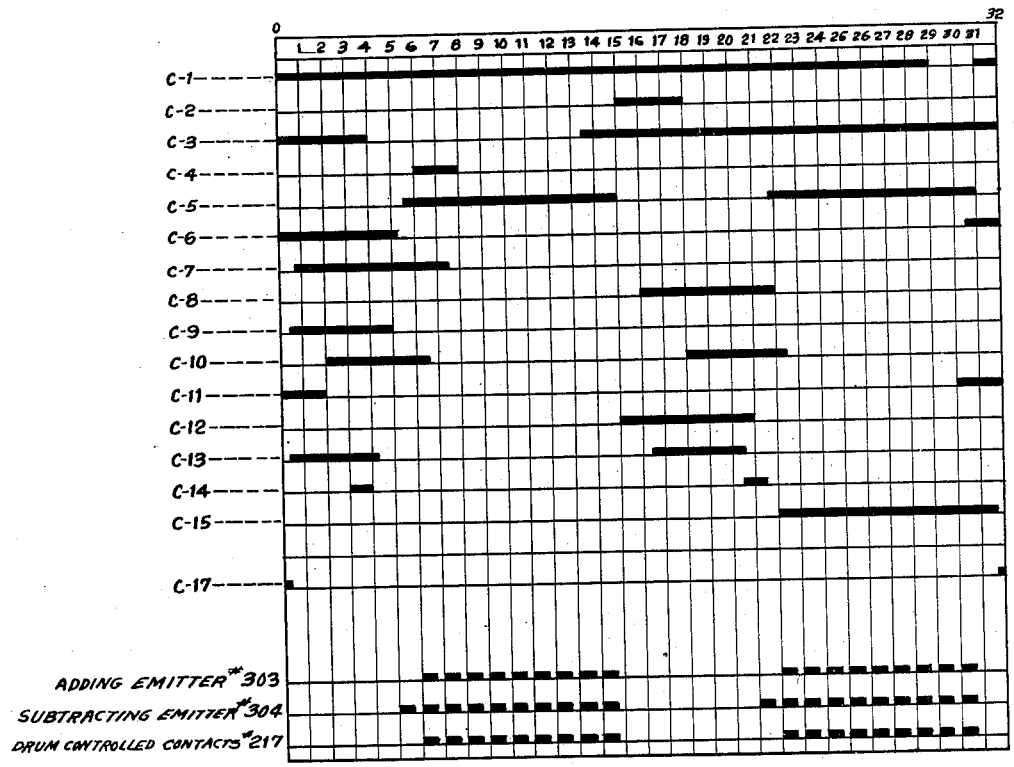

Referring to Figs. 4 and 36 the brush $77_0$ has a special connection 312 to a special metallic conductor bar $127_{10}$. The latter has connected thereto a digit line $189_{10}$ which is electrically connected to the contact element $309_{10}$ (Fig. 2), so positioned as to cause the units accumulator magnet to be energized at a point in the accumulator cycle sufficiently early to effect a complete revolution of the units accumulator wheel. If zeros in orders above the units follow the units order these orders will each control the entry of "9" but the transfer will carry across to be finally entered in the order pertaining to the first significant figure thus giving the tens complement of the first significant figure.

Obviously for the remaining denominational orders not punched it is necessary to enter nines in the correlated orders of the accumulator.

To this end the digit line $189_0$ (Fig. 2) has a wire connection 323 through closed contacts 482, 483 and relay contacts 298a to a series of plug sockets 324 (see Fig. 17) and four of the sockets $280_3$ pertaining to those orders in which a "9" is to be entered automatically and not represented by a punching on a card have plug connections $325_a$ to a series of four sockets 324 (see Fig. 2). Three of the sockets 324, as shown in Figs. 2 and 17 are connected by plug wires 325 to the related accumulator control sockets 279. These plug connections will vary, of course, for each card, and will be made in accordance with the number of orders utilized to represent significant figures of the number to be subtracted. Such "9" entries are also made only when the negative section 304 of the emitter is utilized.

With the previous result or

00005332570 the tens complement of -0321----------- 99999999679 will be added to give a final result of ---------------- 00005332249

This is the result of the solution of an equation, $1234 \times 4321 + 0234 + 0222 - 0321$ and is shown in the accumulator 250.

The cross calculation unit is also provided with a cycle limiting device operating in a manner substantially the same as that described in connection with the multiplying mechanism.

Referring to Figs. 2 and 34 the plate 271 also carries a contact element 313 which is electrically connected to the positive line side through cam controlled contacts C—11 which are closed near the end of a machine cycle. Correlated with the contact element 313 is a series of contact elements 314 and they are so positioned that the contact element 313 will contact with one of said contact elements 314 so as to cause the elimination of idle operating cycles after an even number of accumulator operating cycles have been completed. The reason for this is that all operations that follow cross calculation operations must be initiated after the completion of a full rotation of the main driving gear 23 (see Fig. 6). The rotation of gear 23 is completed, obviously, only after two accumulator cycles have been completed.

In the present case, it is assumed that three accumulator operating cycles are involved in the example assumed and after the termination of the third accumulator operating cycle the magnet 269 (Fig. 2) will be energized to cause a step of movement of the plate 271 whereupon the contact element 313 will be engaged with the contact element designated $314_4$ in Fig. 2. Each of said contact elements 314 have electrical connections to correlated sockets 315 (see also Fig. 17) and a plug connection 317 is adapted to be made between the plug socket 315 correlated with the contact element $314_4$ which is to control the cycle limiting device and to a socket 316. This plug connection 317, for the example assumed, is shown in Fig. 17. The plug socket 316 has a wire connection 318 to the wire 252 which leads as shown in Fig. 1 to the previously described relay magnet 253. The latter will be energized to cause the energization of relay magnet 253 and the closure of relay contacts 253b by the closure of contacts C—11 (Fig. 2) which is in the latter part of a machine cycle of operation.

Referring to Fig. 1 in shunt connection with the magnets 258 and 260 which are energized when contacts 253b are closed is a magnet 319 and said magnet, as shown in Fig. 34, is adapted to rock a retrograde preventing pawl 320 thereby releasing the plate 271 for movement to a normal position by the action of a return spring 321.

With the energization of the magnet 319, the magnet 260, referring to Figs. 2 and 21, will again be energized thereby causing the switch arm 173 to make electrical contact with the contact element $174_3$ (Fig. 4) thereby connecting the negative line side through contacts 384 and the switch mechanism just described to a line wire 322 (Fig. 4).

*Transfer of a total*

With the final result in accumulator 250 it is desirable to punch this amount on the tabulating card controlling the calculations. Before this can be done, however, it is necessary to transfer the amount from the accumulator 250, if it is selected to receive entries, to an accumulator 251 (Fig. 17) since only the latter controls the punching mechanism. As will be pointed out later, accumulator 251 can also receive entries which are the results of calculating operations in which case a transfer of a total is not necessary.

Referring to Figs. 4 and 17 reference numeral 327 designates two keys, the key caps of which have the symbols NB—1 and NB—2 and are utilized when a subtraction operations enters into a calculation to give rise to a possible negative result in accumulator 250 and whenever a transfer from accumulator 250 to 251 is effected. The key NB—1 is utilized when total transfer operations are to take place after a calculation of one type has been performed and the key NB—2 will be operated in carrying out the illustrative operation since two types of calculating operations are involved.

As best shown in Fig. 26, the key designated NB—2 is adapted when depressed to close contacts 328 and also close other contacts 329 (Fig. 4) similar to contacts 328 in Fig. 26 and since the selected key 327 is depressed and locked in depressed position prior to an operation of the machine it will be seen that normally there is a circuit connection from the negative line side 13 through contacts 328 (Fig. 4) and by a wire 330 to a magnet 331 (Fig. 2) of a relay, the circuit thence leading to normally closed relay contacts 298b to the positive line side 14.

Referring to Fig. 1, it will be recalled that when the multiplication control relay magnet 183 is energized to open contacts 183d the relay magnet 500 is energized under control of cam controlled contacts C—5. However, in view of the normal energization of relay magnet 331 the relay magnet 501 in parallel with relay magnet 500 is not energized in cross calculation and multiplication by the closure of contacts C—5 since relay contacts 331a are opened by the energization of relay magnet 331. The normal opening of relay contacts 501a (Fig. 4) disconnects one side of the accumulator magnets 332 of the accumulator 251 from the positive line side 14 through possible plug connections and wiring during the accumulator operating cycles for cross calculation and multiplication. This will prevent the transmission of possible electrical impulses to improperly operate accumulator 251.

It will be remembered that at the latter part of the machine cycle (after cross calculation has been effected) at which time the cam controlled contacts C—11 are closed (Fig. 2), the cycle limit relay magnet 253 (Fig. 1) will be energized through the aforedescribed cycle limiting electrical circuit to cause the energization of the magnet 260 (Fig. 1) and the shifting of the switch arm 173 (Fig. 4) to engage with the contact point $174_3$.

Thereupon a circuit will be made leading from the negative line side 13 comprising, wire 172, contacts 384, switch arm 173, contact point $174_3$, the key controlled contacts 329 (now closed), a wire 333 to the magnet 298 (Fig. 2) of a relay, the other side of the magnet being connected to the positive line side 14. This will cause the energization of relay magnet 298 and the opening of contacts 298b (Fig. 2) which when opened cause the deenergization of the relay magnet 331. With the deenergization of the relay magnet 331, referring to Fig. 1, it will be seen that relay contacts 331a are closed thereby causing the energization of the relay magnet 501 and the closure of relay contacts 501a (Fig. 4) connecting one side of the accumulator magnets 332 of accumulator 251 to a series of plug sockets 343 during the total transfer operating cycle.

Referring now to Fig. 24, and giving an explanation of a construction utilized for each order of the accumulators 250 and 251 by considering part of the construction of the units order of accumulator 250, it will be seen that the gear 244 is in mesh with a gear 334 with which is rotatable an arm 335 carrying a brush contact element 336. The brush 336 is adapted to be differentially positioned so as to contact with a certain contact element of a series of ten contact elements 337. For example, if there is no entry in one order of the accumulator, the related brush 336 will contact with the contact element $337_0$. If a "2" has been entered in the same order the brush 336 will contact with a contact element $337_2$, etc. In order to take an electrical connection from the brush 336 the arm 335 carries another brush 338 which is in continuous contact with a segmental track 339.

The above described accumulator read-out device is well known in the art and is shown and described in detail in the patent to G. F. Daly, #1,921,454, dated August 8, 1933, and for this reason it is only generally described. The above described construction is also shown diagrammatically in Fig. 2 wherein it will be seen that all of the contact elements 337 of the same digit are connected together by an electrical connection 340. From the straps 340 there are ten electrical wire connections 341 to the related digit representing lines $189_0$ to $189_9$.

Each of the movable contact elements 336 through the brush 338 and segment 339 (Fig. 24), has a wire connection to a plug socket 342 but the contact element of the units order, designated $336u$ in Fig. 2, is connected to its related socket 342 through its brush 338, segment 339 and normally closed relay contacts 290c. The series of sockets 342 is adapted to be plug connected to a series of sockets 343 of the accumulator 251 (Fig. 4) by means of wires in a cable 344 (see Fig. 17). Since the sockets 343 are connected to the accumulator control magnets 332 of accumulator 251 (see Fig. 4) through the relay contacts 501a it will be evident that during the accumulator transfer cycle as the brush 286 (Fig. 2) sweeps over the series of contact elements 285a or 285b electrical impulses will be transmitted to the accumulator control magnets 332 of accumulator 251 at differential times depending upon the position of each contact element 336 of accumulator 250 (Fig. 24) of each denominational order. It is also pointed out that since the result in the accumulator 250 is a positive result in the example assumed the additive section 303 of the emitter will be operative since relay contacts 290a (Fig. 2) are normally closed and also contacts 290c are closed.

Therefore, the accumulator 251 will be operated in a manner previously explained to enter an amount in each denominational order commensurate with the value of the amount originally represented in the corresponding order of the accumulator 250.

If the result in accumulator 250 was negative this result would be indicated by one or more "9's" in the highest denominational orders and particularly in the highest denominational order in which the brush $336_{TB}$ of the tens of billions order contacts with the related contact element $337_9$ (Fig. 2) thus establishing a circuit described as follows: The positive line side 14, wire 416, contact element $337_9$, brush $336_{TB}$, wire 417, relay contacts 298d now closed, relay magnet 290, wire 296, relay contacts 298e (Fig. 4) now closed to the negative line side, thus causing relay magnet 290 (Fig. 2) to be energized and the opening of relay contacts 290a and 290c and the closure of relay contacts 290d and 290b, the latter thereby selecting the negative section 304 of the emitter.

For the units order the brush $336u$ has secured thereto a supplemental brush 336UN but displaced one unit with respect to the brush $336u$ and correlated with a series of contact elements 337 arranged as described. Obviously, if "0" is represented as the units digit the brush 336UN will contact with the contact element $337_{10}$. The latter has a wire connection to the digit line $189_{10}$ to cause a full rotation of the units order wheel under control of the negative emitter 304. In any other position of the brush 336UN it will contact with a contact element 337 which has a wire connection 341 to a digit line 189 which represents a digit one unit less than the digit represented in the units order wheel.

But due to the inverse wire connections from said digit lines 189 to the contact points 309 or 310 to the negative emitter the latter will cause the transfer of the tens complement for the unit order. For succeeding columns the nines complement of the digits will be transferred. Hence accumulator 251 will, in either a negative or positive condition of accumulator 250 represent a true number to control the result punching mechanism now to be described.

After the total transfer operation has been effected cam controlled contacts C—2 (Fig. 1) will be closed thereby establishing a circuit from the positive line side 14, relay contacts 298f now closed, cam controlled contacts C—2, relay magnet 253, to the negative line side 13 (Fig. 1) causing the energization of the cycle limit control magnet 253 resulting in the closure of its relay contacts 253b (Fig. 1) and the energization of the magnet 260. Referring now to Fig. 2 and Fig. 21 the switch arm 173 will now be positioned so as to make electrical contact with the contact point 174₄ thereby causing operations now to be described in detail.

Cam controlled contacts C—3 (Fig. 1) are closed when cam controlled contacts C—2 close and remain closed until after the beginning of the next machine cycle thus providing a stick circuit through relay contact 253a and wire 257 for the magnet 253 so that the latter is energized at the beginning of the next machine cycle.

Result punching mechanism

The mechanism whereby the card which controls the calculating operations may be punched step by step as the result standing on the accumulator 251 is read out will now be described.

Upon the contact of the switch arm 173 with the contact element 174₄ (Fig. 4) a circuit from the negative line said as described before will be extended from the contact element 174₄ by a wire 345 to cam controlled contacts C—4 (Fig. 2) and thence from said cam controlled contacts to the total control relay magnet 82, then through normally closed relay contacts 374a to the positive line side. The cam controlled contacts C—4 are adapted to be closed in the early part of the machine cycle to cause relay magnet 82 to be energized but after tens transfer operations have been effected for accumulator 251 since the last described accumulator is adapted to have the same timing operation as accumulator 250. The machine is so arranged that amounts may be directly entered in accumulator 251 so that a tens transfer operation may be required in accumulator 251 and the timing of contacts C—4 take care of this possibility. Relay contacts 82b (Fig. 4) close to provide a stick circuit for relay magnet 82.

It is evident that irrespective of the subsequent opening of contacts C—4 the relay magnet 82 will be held energized by the closure of the relay contacts 82b (Fig. 4) and normally closed relay contacts 347a.

From the contact element 174₄ (Fig. 4) there is a wire connection 348 leading as shown in Figs. 4, 3 and 1 to a brush release magnet 349 (see Fig. 1), the other side of said magnet being connected to the positive line side 14. It is obvious that upon the contact of the switch arm 173 with contact point 174₄ the magnet 349 will also be energized.

As shown in Fig. 16, the energization of the magnet 349 will through its movable core 350 and a link 351 rock the latching pawl 113 thereby disengaging it from the arm 114 which is secured to the shaft 106. Under the action of the spring 112 the brush supporting frame will now be elevated so that the brushes 77 are now out of contact with the metal tracks 88.

When the switch arm 173 contacts with the contact element 174₄ a circuit will be extended from the negative line side to the wire 348 (Fig. 1) as previously stated, and this is also connected as shown in Fig. 1 to a punch switch controlling magnet 353, the latter being connected to the positive line side by normally closed relay contacts 354a.

Referring to Fig. 3, it will be evident that upon the energization of the relay magnet 82 contacts 82a will be opened thereby opening the circuit to the clutch control magnet 31 (Fig. 1) so that upon the deenergization of the clutch control magnet 31 the clutch pawl 26 (Fig. 6) will be disengaged from the related extension 22 at the termination of a complete rotation of the main driving gear 23.

Furthermore, since contacts 48 (Fig. 1) are now closed it is desirable in the machine operation now being described to prevent the energization of the card feed clutch magnet 40 (Fig. 1) and this prevention occurs because at this time relay contacts 82c (Fig. 3) are open to open the circuit 50 to the card feed clutch magnet 40 through relay contacts 82c and cam controlled contacts C—17 (see Fig. 3).

Upon the closure of relay contacts 82d (Fig. 2) a circuit will be extended from the positive line side 14 through normally closed contacts 347a, contacts 82d, relay contacts 354b to a wire 355 which leads as shown in Fig. 4 to a wire 356 connecting one side of each of a series of punch operating magnets 357. The accumulator 251 is also provided with a read-out device similar to that which has been described in detail for accumulator 250 except for the units order which is similar to the other orders. The series of stationary contact elements 358 for each digit of the read-out device is interconnected by a related metal strap or wire connection 359 and said straps have wire connections 360 to one blade of a series of manually controlled and normally closed relay contacts 361a. The other blade to each of said contacts 361a is connected to the related punch operating magnet 357. The movable contact elements, which take positions according to the digits entered in the denominational orders of the accumulator 251 are designated by reference numeral 362 and each of said movable contact elements 362 is connected to a related one of contact points 363 of a rotary punch magnet selecting switch shown in detail in Fig. 23. The movable switch arm which normally contacts with a contact point 363 connected to the movable contact element 362 of the highest denominational order is designated by the reference numeral 364a. The circuit through the selected punch magnet from the rotary switch just described is completed by a wire connection 365 which leads from the switch arm 364a to a wire 352 which is now connected to the negative line side through contact element 174₄, switch arm 173 and contacts 384 now closed.

The rotary switch is shown in Fig. 4 in position for determining which punch operating magnet 357 will be energized in accordance with the differential setting of the movable contact element 362 for the highest denominational order. If there has been no entry in this order the circuit will be completed upon closure of contacts 82d (Fig. 2) to the punch operating magnet 357₀ adapted to punch the zero index point position of the selected card column. However, if the movable contact element 362 related to the highest denominational order has been moved two steps from the position shown in Fig. 4 so as to contact with the contact element 358a the punch operating magnet 357₂ will be energized and, as will be explained, this will cause punching of the card at the "2" index point position.

Figure 10:
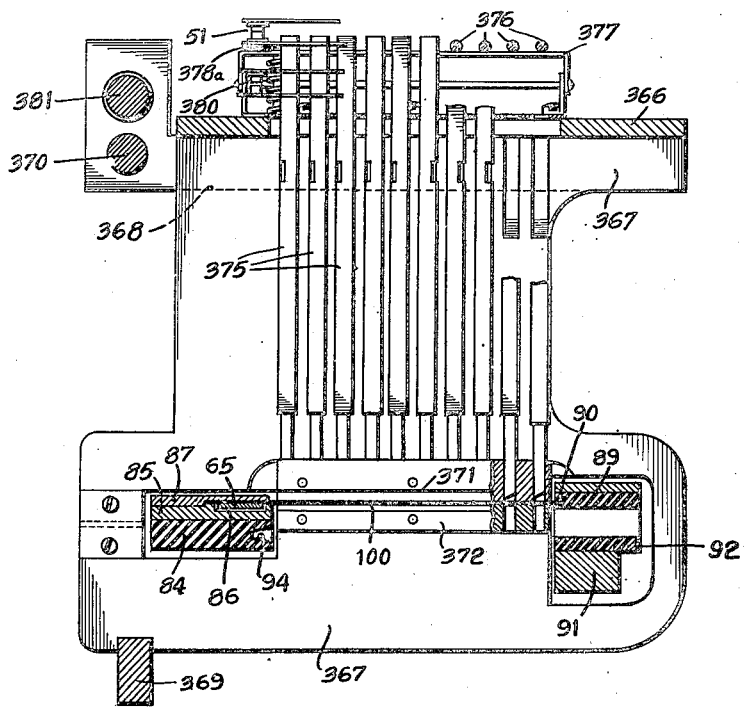
Fig. 10 is a sectional view of the card punching mechanism.

The punching mechanism is best disclosed in Figs. 5, 10, 17 and 31. As best disclosed in Figs. 10 and 31 the punching mechanism consists, in part, of a horizontal plate 366 which is adapted to support the series of punch operating magnets 357 and the plate 366 is adapted to carry a vertically mounted plate 367. The plates 366 and 367, as best shown in Fig. 31, are connected together at right angles by means of a transverse bar 368 which is fastened to each of the plates 366 and 367 by any suitable fastening means. The plate 367, as best shown in Fig. 10, is adapted to be guided in the lateral movement of the punching mechanism by means of a stationary bar 369 and the framework of the punching mechanism is further guided by causing the bar 368 to slide upon a stationary rod 370.

As best shown in Figs. 10 and 31, the vertical plate 367 carries a punch guiding block or card stripper 371 and a punch die 372 both of these elements having a separation through which the card to be punched passes. The movable core 373 of each punch operating magnet 357 has a bell crank operating connection 374 to the related punch 375 whereby the selected punch is adapted to be moved downwardly and perforate the card at the selected point position. Each punch as best shown in Fig. 31 is provided with in pin 376 adapted to rock a pivotally mounted bail 377 against the action of a spring 378 so that said spring after the deenergization of the selected punch operating magnet will force the operated punch 75 to normal position and out of cooperation with the card. The bail 377 carries a plate 378a of insulating material and said plate as it moves downwardly is adapted to permit contacts 51 to open and cause the closure of contacts 380. The opening of contacts 51 is effected by permitting its lower blade to move away from the upper blade and the closure of contacts 380 is effected by causing the plate 378a to depress the upper blade of the contacts 380 to close the latter. The function of these contacts will hereinafter be pointed out in connection with Fig. 2 where they are also shown.

In order to cause a lateral positioning of the punching mechanism the block 366, as best shown in Fig. 5 and Fig. 10, is adapted to be threaded so as to receive a worm screw 381 and the latter is provided with a crank handle 382 at its extremity. By manually turning the crank handle 382 the punching mechanism may be shifted laterally so as to correlate the series of punches 375 with the index points of the first column of the selected columns which constitutes the highest denominational order to be punched.

The punching mechanism is, however, held stationary during the punching operation but the card is fed in a step-by-step manner after each column is punched.

When the bail 377 is depressed contacts 380 will be closed thereby effecting a circuit connection from the negative line side 13 (Fig. 4) through contacts 52 which are now closed because the brushes are elevated, to contacts 380, thence by a wire 383 to the punch control relay magnet 354, one side of the relay magnet being connected to the positive line side 14. When the relay magnet 354 is closed a stick circuit will be provided for said relay magnet from the wire 383 to relay contacts 354a which are now closed due to the previous energization of relay magnet 354, relay contacts 347b which are normally closed, and contacts 384 now closed, one blade of the contacts 384 being connected to the negative line side 13. When the relay magnet 354 is energized relay contacts 354b (Fig. 2) will be opened thereby opening the circuit to the selected punch operating magnet 357 whereupon the punch that has been operated will be returned to normal position by the action of the spring 378 (Fig. 31).

Since the first column has been punched, it is necessary now to space the card the distance of one card column and this is effected by means of a spacing magnet 385 (Fig. 2), the circuit for said magnet being from the positive line side 14 through normally closed contacts 347a, relay contacts 82d now closed since relay magnet 82 is energized, relay contacts 354c closed since relay magnet 354 is still energized, the spacing control magnet 385 which is connected to the negative line side 13 through the contacts 51 and the contacts 52. The latter are closed because the brush carrying frame is now elevated. Since the bail 377 is now in its upward position (Fig. 31), the contacts 51 will be closed so that the circuit to the spacing control magnet 385 will only be made when the punch operated is withdrawn from the card.

The means for spacing the card to be punched column by column is best shown in Figs. 9 and 11 where it will be seen that the spacing control magnet 385 when energized draws within its movable core 386 thereby rocking a bell crank 387 connected thereto. The bell crank is pivoted by a screw 388 on an arm 389 which is pivoted to the framework at 390. The initial movement of the core 386 will rock the bell crank so that an integral lug 391 will engage with one of the teeth 392 of the ratchet disk 63. Further movement of the core will cause the rocking of the arm 389 and the movement of the lug 391 to the right thereby turning the ratchet disk 63 sufficiently so that the feeding tape 65 will feed the card the distance of one column. It is further pointed out that the in 62 has previously been moved out of coaction with the shoulder 60 due to the initial card feeding operation thereby permitting the independent step by step movement of the disk 63.

When the magnet 385 is energized the contacts 384 will be opened thereby opening the circuit to the relay 354 (Fig. 2).

When relay magnet 354 is deenergized relay contacts 354c will open causing the opening of the circuit to the spacing magnet 385 permitting the lug 391 to be shifted to normal preparatory to the next card spacing operation. Relay contacts 354b now close, thus causing the closure of the circuit to the next selected punch magnet 357 concurrent with the shifting of the switch blades 364a and 364b now to be described.

The deenergization of relay magnet 354 will cause the opening of the relay contacts 354a (Fig. 1) thereby opening the circuit to the punch switch magnet 353 to cause the selection of the next punch operating magnet under control of the read-out device (Fig. 4) of accumulator 251.

The details of the rotary switch for successively selecting the punch operating magnets are shown in Figs. 22 and 23 and comprises a well known form of rotary switch utilized to a large extent in telephone work. The armature 393 of the magnet 353 when attracted rocks an arm 394 integral therewith to the right as viewed in Fig. 23 thereby causing a spring blade 395 to be moved so that its operating end will move upwardly and to engage a successive tooth of a ratchet wheel 396 movable with the switch arms 364a and 364b. Upon the deenergization of the magnet 353, which occurs after the card spacing operations has been effected, a spring 397 connected to the armature 393 and previously tensioned will cause the movement of the arm 394 and the blade 395 to the left turning the switch arms 364a and 364b simultaneously in a clockwise direction so that the switch arm 364a now leaves the first switch point 363 and the switch arm 364b makes contact with the switch point correlated with the read-out device for the billions denominational order thereby selecting the punch operating magnet 357 under control of the read out device of accumulator 251 for the billions denominational order.

In the manner just explained the results standing on the accumulator 251 will be read out order by order and the card columns punched successively so that there will be punched upon the card the result standing on accumulator 251.

The punching machine is also provided with a cycle limiting device thereby terminating punching operations when the desired number of digits has been punched. This mechanism will now be explained in detail.

The cycle limiting device is shown diagrammatically in Fig. 3 and corresponds to the section 398 (Fig. 22) of the rotary switch and the actual mechanical construction is precisely the same as that disclosed in Fig. 23. Since in the example assumed the final result involves seven digits to terminate punching operations after the digit of the lowest order has been punched, a plug 399 (Fig. 3) is inserted in one of a series of sockets 400 and into that socket which in numerical order is one greater than the number of digits which are to be punched. Upon the seventh step of movement of the switch arm 401 (movable with the switch arms 364a and 364b, Fig. 4), contact point 402s will be engaged thereby completing a circuit extending from the negative line side 13, switch arm 401, contact point 402s, socket 400s, plug 399 and thence by a wire 403 to the punch limit relay magnet 347 (Fig. 1) one side of the latter being connected as shown in Fig. 1 to the positive line side 14. When the relay magnet 347 is energized, it will open its relay contacts 347a (Fig. 2) thereby opening the circuit 355 leading to the series of the punch operating magnets 357 and also causing by the opening of contacts 347a the relay magnet 82 (Fig. 2) to be deenergized.

The energization of the relay magnet 347 will also cause its relay contacts 347b (Fig. 2) to be opened thereby opening the circuit to the relay magnet 354 and causing the latter to be deenergized. Furthermore, relay contacts 347c (Fig. 1) will also be closed thereby completing the circuit to the card feed clutch magnet 40 which extends from the positive line side 14 through contacts 16a, stop key contacts 17, the clutch controlled contacts 48 now closed, relay contacts 347c now closed, the card feed clutch control magnet 40, contacts 82C (Fig. 3) now closed because relay magnet 82 is deenergized, and the wire 50 which leads as shown in Fig. 2 to the contacts 51 which are now closed and the contacts 52 which are also closed thus completing the circuit to the negative line side 13. The card feed clutch will now be engaged so as to cause the feeding of the card which has just been punched out of the machine and into a supply hopper 403 (Figs. 5 and 37). Coincidentally therewith a successive card will be fed out of the supply hopper 44 and into card analyzing position so that calculating operations carried out in the manner just described will take place for the next card. In the event that there is no card in the hopper 44 when the punched card is ejected, contacts 46 (Fig. 1) will be open thus preventing the energization of the accumulator operating clutch control magnet 31 when the contacts F—2 close. The machine will thereupon be automatically stopped in its operation.

It is also necessary to return the rotary switch shown in Fig. 23 to its normal position and this is effected by transmitting a series of electrical impulses to the magnet 353 whereupon the switch arms for the punch selecting device shown in Fig. 4 and the punch limiting device shown in Fig. 3 will be returned to normal position.

To effect this operation a third section 404 (Fig. 22) of the rotary switch is employed and is similar in construction to the sections previously described. In the event that the switch arm 401 (Fig. 3) and the switch arms 364a and 364b (Fig. 4) have been moved from normal, a switch arm 405a (Fig. 3) movable therewith will engage with one of a series of electrically interconnected contact points 406. In Figs. 3 and 23 reference numeral 407 designates normally closed contacts. During the operation of the shaft 79 which it will be remembered operates during the feeding of the card a cam carried thereby will cause the closure of contacts F—3 thereby extending a circuit from the negative line side through the cam controlled contacts F—3, through the normally closed contacts 407, the switch arm 405a to one of the contact points 406 and thence by a wire 408 to the wire 348 which leads, as shown in Fig. 1, to the punch operating switch magnet 353, the other side of said magnet being connected to the positive line side through relay contacts 354a which are now closed because relay magnet 354 has previously been deenergized. Therefore, an impulse will be transmitted to the magnet 353 which, as shown in Fig. 23, will thereupon rock its armature 393 and by means of a button 409 carried by the arm 394 contacts 407 will be opened resulting in the deenergization of the magnet 353. This in the manner previously explained will cause all the switch arms of the rotary switch to be moved one step in a clockwise direction. This operation will be repeated until the pair of switch arms 405a and 405b are in such position that none of the contacts 406 will be contacted at which time the circuit to the operating magnet 353 will be opened.

Furthermore, when the card feed clutch control magnet 40 (Fig. 1) was energized by the circuit connections previously outlined a magnet 410 in parallel connection therewith will be energized and as shown in Fig. 21 will rock its armature 411, the armature being provided with the integral retrograde preventing element 264. The latter will be moved out of cooperation with the ratchet wheel 263 permitting a spring 412 to be active to return the switch arm 173 to the normal position shown in Fig. 21.

*Resetting of accumulators*

The accumulators with their related read-out devices are zeroized when the last computation has been finished and after the card has been punched.

To this end the shaft 54 (Fig. 6) has a bevel gear connection 421 to a shaft 422 and by means of a similar bevel gear connection 423 the accumulator reset shaft 424 is driven. The reset shaft 424 is shown in Fig. 24 and is common to both accumulators and corresponds to the reset shaft designated by numeral 379 in Patent No. 1,600,414 to C. D. Lake, dated September 21, 1926. By means similar to that disclosed in this patent the accumulators are simultaneously set to zero, or selectively by the usual manually positioned reset clutch, is so desired.

*Calculating operations of various combinations*

The present machine is adapted to perform calculating operations either of one type or the combination of the two already described and are carried out in the manner now to be described.

*Example 1.*—(Multiplication alone.)

Equation: $A \times B = X$ where A and B have each four digits.

Keys: The keys depressed are $X_1$ and $T_1$.

Plugging: Shown in Fig. 41.

The total keys 413 (Figs. 17 and 26) are designated $T_1$ and $T_2$ and are used, respectively, when one or two computations are to be made. The key $T_1$ is adapted to close contacts 414 (Fig. 4) while key $T_2$ closes contacts 415 and both close the circuit to the wire 348. After multiplication has been completed the movement of switch arm 173 to contact with contact element $174_2$ will through contacts 414 effect card punching operations in the same manner as that previously described in connection with the movement of switch arm 173 to contact with contact element $174_4$. Contacts 415 will also cause punching operations when two computations have been effected. The product will be punched on the tabulating card from which the factors were derived.

*Example 2.*—Cross adding calculation alone. Result positive since no subtractive item occurs.

Equations: $A+B=X$
$A+B+C=X$
$A+B+C+D=X$
$A+B+C+D+E=X$
$A+B+C+D+E+F=X$
$A+B+C+D+E+F+G=X$
$A+B+C+D+E+F+G+H=X$ Key depressed: When no subtractive item occurs, key ±1, key $T_1$.

Plugging: Shown in Fig. 42 for the last equation. Note, only accumulator No. 2 is utilized.

*Example 3.*—(Cross algebraic calculation alone with one or more subtractive items.)

Equation: $A+B-C+D-E+F-G+H=\pm X$

Key depressed: Key ±1, key $NB_2$, key $T_2$.

Plugging: Shown in Fig. 43. Note, both accumulators are utilized.

Key $T_2$ is depressed to cause the punching of the result and the result will be punched automatically, as previously described. Key $T_2$ must be depressed as in one vertical column (Fig. 17) only one NB or T key may be depressed as one depressed will automatically release the other previously depressed.

*Example No. 4.*—(Cross algebraic calculation of one or more amounts when result is positive and the result multiplied by a multiplier amount on the card.)

Equation: $(A+B-C+D-E+F-G+H)I=X$

Key depressed: Key ±1, key $X_2$, key $T_2$.

Plugging: Shown in Fig. 44.

Note: In this type of calculation the multiplicand is not received from the card but from the read-out device of accumulator 250. The multiplicand sockets have a plug connection 510 to the sockets 342 of the read-out device instead of being received by the plugs 137 (Fig. 3) related to the card columns. When a particular contact 217 (Fig. 1) is closed the circuit will lead from the positive line side 14, normally closed relay contacts $361_c$, relay contacts $183_b$, now closed, the closed contacts 217 involved in a particular digit representing line 189, thence by a wire 341 to the particular digit contact 337 engaged by the differentially moved contact element 336 and plug socket 342. The circuit then extends by a wire in the plug connection 510 (Fig. 44) to the correlated socket 139 (Fig. 1), wire 147, contact elements 144—145, wire 227, socket 228, cable 229 to a socket 343 of accumulator 251 (Fig. 4), leading through an associated relay contact $501_a$ to a correlated accumulator control magnet 332, thence by wire 232 to the negative line side. Hence the readout device of accumulator 250 may be utilized to represent a multiplicand instead of deriving it from a card field.

*Example No. 5.*—(Multiplication of two factors on a card with a series of amounts effected by cross calculation added to the product.)

Equation: $(A \times B)+C+D+E=F$.

Keys depressed: Key $X_1$, key ±2, key $T_2$.

Plugging connections: Shown in Fig. 45. Note use of a series of plug sockets 503 for accumulator #2. See also Fig. 4.

*Example No. 6.*—(Multiplication of two factors on a card with a series of amounts effected by cross calculation added or subtracted from the product with result either positive or negative.)

Equation: $(A \times B)+C+D-E=F$.

Keys depressed: With subtractive item, key $X_1$, key ±2, key $N_2$.

Plugging connections: Shown in Fig. 17. Note, accumulators #2 and #1 are utilized. See punched result on card shown in Fig. 25.

*Dividing mechanism*

While the multiplying mechanism and the cross calculation device will take care of, by far, most commercial requirements the usefulness of the machine will be enhanced by the provision of a dividing mechanism. As will be explained later in connection with examples this mechanism may be used alone or in combination with the multiplying mechanism or the cross calculation device.

The quotient result of division is always entered in accumulator 251 and if division is the first calculation to be performed then other amounts may be subsequently entered therein but if other amounts derived as a result of cross calculation or multiplication have been entered in accumulator 251 the quotient amount may be subsequently entered therein.

Figure 35:
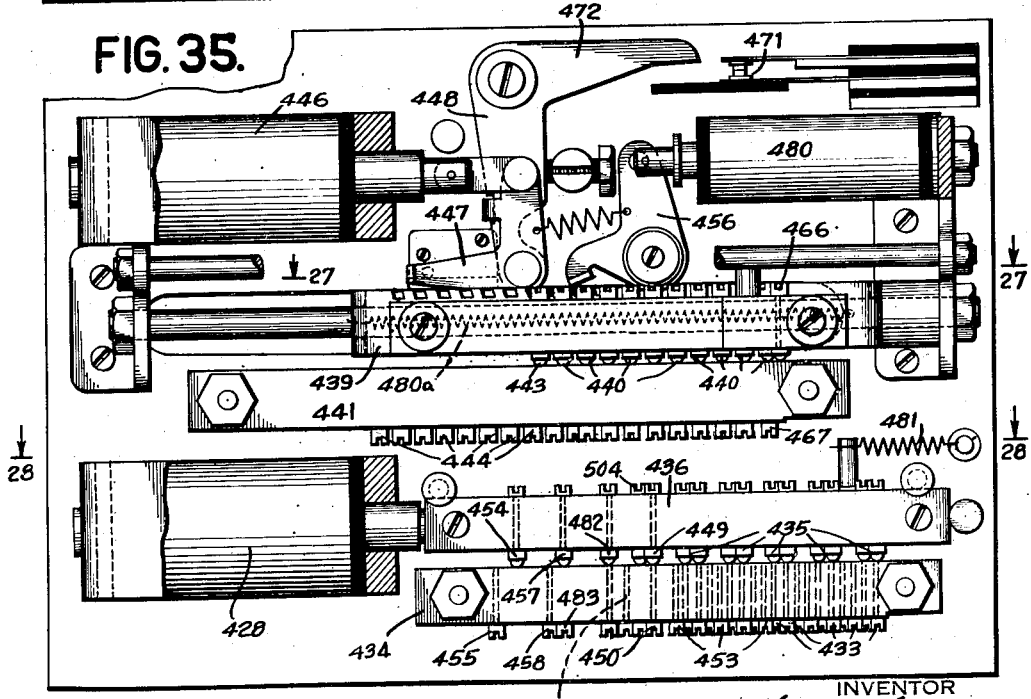
Fig. 35 is a view in side elevation of the denominational shift mechanism for controlling the division calculating operations.

The details of the electrical devices of the dividing mechanism are shown in Fig. 2 while Figs. 27, 28 and 35 show the details of the column shift devices.

Reference numeral 426 in Figs. 4, 17 and 26 designates three division controlling keys one of which is depressed and locked in depressed condition prior to machine operations to close its related contacts 427. The particular key 426 depressed will depend upon when division is to be performed in a series of computations. The closure of one of the contacts 427 when the switch arm 173 (Fig. 4) engages the contact point 174 electrically connected to the particular contacts 427 closed will extend the negative side of the line to a magnet 428 (Fig. 2) by a wire 429. The other side of said magnet is connected by a wire 430 to cam controlled contacts C—12 one blade thereof being connected to the positive line side.

The dividend, which is assumed to be the number -758- and perforated in columns 21—23 has the related metal tracks 88 (Fig. 4) associated with the columns in which the dividend is perforated connected by a series of plug connecting wires 431 to desired sockets of a series of dividend receiving sockets 432 (see Figs. 2 and 47). Said sockets are connected to a series of ten stationary contact elements 433 (Fig. 28) carried by a bar 434 (Fig. 35). Normally contacting with the elements 433 is a series of ten movable contact elements 435 (Figs. 2 and 28) carried by a movable bar 436 (Fig. 28). The movable contact elements 435 have wire connections 437 to a series of contact points 438 carried by a stationary bar 441 (Fig. 35).

A series of ten contact elements 440 carried by a bar 439 (Fig. 35) movable step by step as dividing operations ensue are normally out of cooperation with the ten contact elements 438 but upon a half step of movement of the bar 439 the desired electrical contact will be made to initiate dividend entry operations. The ten contact elements 440 have individual wire connections in a cable 442 (Fig. 2) to ten of the accumulator control magnets 231 starting from the units to the next to the highest denominational order of the accumulator 250. The connection for the eleventh or highest denominational order will be explained later and this order corresponds to the accumulator control magnet 231u at the extreme right in Fig. 2.

The connections in the cable 442 are so made that when the plug connections 431 are made the dividend entry will be made in the denominational orders of the accumulator beginning at the next to the highest order. The accumulator control magnet of the highest order or 231u has a wire connection to the movable contact element 443 (Fig. 2) normally out of contact with the first contact element at the right of a series of eight stationary contact elements 444 (see Fig. 27).

Understanding that one set of contacts 427 have been closed by the depression of a division controlling key 426 those which are effective will extend the circuit from the negative line side by wire 429, by a wire 445 to a magnet 446 (see Fig. 35) which in the manner explained in connection with multiplying operations will rock a pawl 447 and an arm 448 on which the pawl is pivoted so that upon a shift of the pawl 447 to the left the bar 439 will be moved a half step to the left engaging the contact elements 440 and 438.

The magnet 446 is connected to the positive line side through normally closed contacts constituting as shown in Fig. 28 a movable contact element 449 carried by the bar 436 and a stationary contact element 450 and cam controlled contacts C—13 which are closed early in the cycle to cause the initial half shift of the bar 439.

During the initial part of the first machine cycle and during the first accumulator operating cycle the additive section 303 of the emitter will function so as to cause the transmission of electrical impulses to the accumulator control magnets 231 connected for operation at differential times in accordance with the dividend representation so that the dividend will be entered in the ten orders of the accumulator 250 to give the following representation:

07580000000

After the dividend entry the divisor is subtracted one or more times by the entry of the tens complement until an overdraft is reached which will terminate divisor subtracting operations for one quotient digit and cause the re-entry of the divisor as a positive number in the accumulator 250.

The divisor is assumed to be the number -25- and as shown in Figs. 4 and 2 the metal tracks 88 of the columns perforated to represent the divisor have plug connections 451 to a series of divisor sockets 452 (see Fig. 17). The latter have connections to a series of stationary contact elements 453 (Figs. 28 and 35) so that by moving the bar 436 the movable contact elements 435 can make contact with the contact elements 453.

The plug connections 451 are so made that the digit of the highest denominational order of the divisor, or "2" in the example assumed will be subtracted by the entry of the tens complement from the digit of the highest denominational order of the dividend number (758) or from "7" in the example assumed. There is a fewer number of divisor sockets 452 provided than dividend sockets 432 as the divisor is usually smaller in number of denominational orders.

It will be seen from Fig. 2 that when cam controlled contacts C—12 close after the dividend entry the circuit will be completed from the positive line side 14 through said contacts and by the wire 430 to the magnet 428 and thence as previously described to the negative line side 13 energizing the same and causing the shift of the bar 436. Thereupon the bar 436 carrying the contact element 454 (Fig. 28) will cause the latter to make contact with a stationary contact element 455 and since these are shunted across the cam controlled contacts C—12 as shown in Fig. 2 magnet 438 will be held energized. As a result of the movement of bar 436 the contact elements 449 and 450 will be separated thus preventing the reenergization of the magnet 446 until relay contacts 459d are closed as will be later explained. The bar 439 will, however, be held in its shifted position by a retrograde preventing pawl 456 (see Fig. 35).

As shown in Figs. 4 and 28 upon the movement of the bar 436 to the left the movable contact element 457 will engage with the stationary contact element 458 thereby extending the circuit from the previously closed contacts 427 through relay contacts 459a now closed, contact elements 457 and 458, wire 296 to the relay magnet 290, the latter being connected to the positive line side 14 through the relay contacts 298c, now closed. Hence relay magnet 290 will now be energized to cause the closure of relay contacts 290b and the selection of the negative section 304 of the emitter. In the manner previously explained for complement entries in cross calculation the digit "2" of the highest order of the divisor will be subtracted by the entry of the nines complement or "7." For the units order or digit "5" the tens complement must be subtracted and this is performed by means now to be explained.

The series of brushes for the units divisor column are designated 77u (Fig. 4) and each is adapted to be connected to a movable blade 460 of relay, the magnet being designated by numeral 461. The blade 460 normally contacts with the related contact 462 and these normally connect the brushes 77u to the bars 127 pertaining to the same digits so that by the additive section 303 of the emitter the units digit of the divisor may be entered additively, for purposes later to be explained. When the relay magnet 461 is energized the blades 460 will be positioned to engage with contacts 462a but now the "0" index point brush of the units denominational order will be connected with the bar 127₁₀ and this will cause the entry of "10" if the units denominational order of the divisor should be "0."

The other brushes will be correlated with the bars 127 one unit lower in value to thus cause by the connection of the bars 127 to the negative section 304 of the emitter the entry of the tens complement of the digit.

The relay magnet 461 is adapted, so to speak, to change the interconnection between the brushes 77u and the metal bars 127 so that when magnet 461 is deenergized the brush unit will function like the brush unit shown in Fig. 16 and when energized function like the specially constructed brush unit shown in Fig. 36.

Since the magnet 461 (Fig. 2) is in parallel connection with the relay magnet 290 it is obviously energized at the same time and when the negative section 304 of the emitter is selected.

It will be recalled that the highest denominational order of the accumulator 250 receives no entry during the dividend entry operation. It does however, receive a "9" entry during a complement entry operation by the following described means.

The wire 323 (Fig. 2) leading from the digit line 189₀ of the negative section 304 of the emitter leads by a wire connection 463 to the series contact points 444 one of which is engaged by the movable contact element 443. From the description given in describing the cross calculation device it will be recalled that when the wire 323 is connected to an accumulator magnet it will cause the entry of a "9." Since the movable contact element 443 is connected to the accumulator magnet 234₁₁ its coaction with the first contact element 444 will cause the entry of a "9" in the highest denominational order of the accumulator.

The operation described can be represented as follows:

```
     07580000000 (Dividend)
     97500000000 (10's complement of divisor
                  25)
     ───────────
Remainder__ 05080000000 Quotient digit -1-
```

It is of course desirable to give a representation of the quotient and this is effected by the following arrangement: From the digit line 189₁ which receives an electrical impulse from the negative section 304 of the emitter at a time in the accumulator cycle for the entry of a "1" by the energization of an accumulator magnet there is a wire connection 464 (Fig. 2) to relay contacts 290g which are closed when subtraction by the complemental method is being performed and also to a contact 504 which engages a contact point 505 as the bar 436 is now shifted. From said contacts 505 there is a wire connection 465 to a contact element 466 carried by the movable bar 439 adapted to contact with the first one of a series of contacts 467 carried by the stationary bar 441 upon the initial half-step shift of the former (see also Fig. 27).

The contacts 467 have wire connections to a series of quotient sockets 468 (see also Fig. 17) which are adapted to be plug connected to any set of the sets of accumulator receiving sockets of accumulator 251 such as 502, 503 or 343. As many orders will be plugged as corresponds to the desired number of digits in the quotient as shown in Fig. 47. In the present case two orders will be plugged as the quotient involves only two digits. Hence the tens accumulator control magnet 332 of accumulator 251 will be energized to cause the entry of a unit. An entry of a unit will be made for each subtraction operation and including the operation when an overdraft is reached.

The succeeding subtracting operations including the one with an overdraft are expressed as follows:

```
05080000000
975
─────────
02580000000  Quotient -2-
975
─────────
00080000000  Quotient -3-
975
─────────
97580000000  Quotient -4-
```

When an overdraft is reached the contact element 336ₜᴮ is in contact with the contact element 337₉ (Fig. 2) since for the highest denominational order a nine is entered. A circuit will then be made from the positive line side 14 through the said contacts 337₉ and 336ₜᴮ to the wire 417 and thence to a relay magnet 459. From said magnet the circuit leads through cam controlled contacts C—14 and a wire 469 to the wire 445 which is connected to the negative line side by circuit connections previously described. A stick circuit for the relay magnet 459 is provided by the closure of relay contacts 459b, which connect the positive line side to relay magnet 459. From magnet 459 there is a wire connection 470 to normally closed contacts 471 and from said contacts 471 to the closed relay contacts 459c to the negative line side by wires 469 and 445.

Since the magnet 446 is now deenergized the contacts 471 (see Fig. 35) will now be closed. As will appear later by the energization of magnet 446 an extension 472 of the arm 448 will subsequently cause the opening of contacts 471.

Relay contacts 459a (Fig. 4) are opened by the energization of relay magnet 459 thereby disconnecting the negative line side from the relay magnets 290 and 461, thereby by the closure of relay contacts 290a (Fig. 2) selecting the additive section of the emitter to cause the addition of the divisor to the amount standing on the accumulator. During this additive cycle contacts 290f (Fig. 2) will be closed and an electrical impulse will be sent by means of the digit line 189₉ by wire 473, contacts 290r, contacts 504, 505 to the wire 465 and thence to the units order accumulator magnet 332 of accumuator 251 (see Fig. 2). Hence a "9" will be entered in the units order of accumulator 251. This operation can be described as follows:

```
97580000000 False quotient    4
      25                      9
      ─────                   ─
00080000000 True quotient digit -3- as the
              "1" will not be carried
```

To prevent the carrying of one order to another as would occur above the entire transfer mechanism for the quotient receiving accumulator 251 is rendered inoperative by the following described means.

The transfer mechanism, as previously stated, is well known in the art and reference numeral 473 designates in Fig. 38 one of the transfer arms which is released for operation by its spring 474 when a lower order wheel passes through "0." Its subsequent operation by the bail 273 would cause a transfer operation. For accumulator 251 there is provided a magnet 475 which is energized when magnet 428 is energized, since as shown in Fig. 2 it is in parallel therewith.

When magnet 475 is energized it will rock an armature 476 and an attached plate 477 which is bent so that its extremity will pass in front of all the lugs 478 of all the transfer arms 473 thereby preventing their release. Hence no transfer will occur and the first order of the accumulator 251 will exhibit the true quotient digit or "3."

At the beginning of the next accumulator cycle, in the example assumed, cam controlled contacts C—13 will close thereby extending a circuit from the positive line side, through relay contacts 459d now closed to the magnet 446 thereby energizing the same and causing the bar 439 to be moved a distance of a complete step. Thereupon contacts 471 will be opened to cause the deenergization of relay magnet 459. Since its relay contacts 459a (Fig. 4) now close magnets 290 and 461 will be energized again causing the selection of the negative section 304 of the emitter. This calculating operation can be expressed as follows:

```
          00080000000
          9975
          ───────────
          99830000000 Quotient digit "1"
                        in tens order.
```

It will be seen that since both the contact element 443 and the contact element 440 at the extreme left (Fig. 2) now engage with two of the contact elements 444 the two highest denominational orders of accumulator 250 will each receive a "9" as shown above. Due to the position of bar 439 the feeler 466 will now select the units order of the quotient accumulator for a unit entry.

As an overdraft is immediately reached the dividend accumulator will be restored to a positive condition by an addition operation expressed as follows:

```
          99830000000 Quotient digit    "1"
          0025                           9
          ───────────                    ─
Remainder: 00080000000 For quotient digit -0-
```

Accumulator 250 will exhibit the remainder -0008- and the quotient -30- will be exhibited in accumulator 251.

After the last quotient digit has been derived the machine goes through another cycle of operation and since the accumulator is now in a positive condition the subtraction operations will be repeated as before. That is, the bar 439 is given a shift of a unit and the last remainder will have added thereto the tens complement of the divisor and while this may affect the remainder this is of no importance since it is not utilized. There will be, however, no entries to the accumulator 251 since the contact element 466 (Fig. 2) now engages the third contact point 467, from the right in Fig. 2. The unit impulse sent to the wire 465 from the negative section 304 of the emitter by the circuit previously described will be extended by a cycle limit plug connection 479 (Fig. 2) to cam controlled contacts C—15 which are connected to the wire 252. This will cause by circuit connections previously described the energization of a magnet 480 (Figs. 1 and 4) which will rock the retrograde preventing pawl 456 (see Fig. 35) thereby permitting a spring 480a (Fig. 35) to return bar 439 to normal position. The magnet 260 in parallel connection with magnet 480 causes the switch arm 173 to move from contact 174₁ to 174₂ as has been previously described thus breaking the stick circuit holding magnet 428 energized.

The punching and other operations that take place when an impulse is sent to wire 252 have previously been described in connection with the description of the multiplying and cross calculating mechanism.

As best shown in Figs. 2 and 35 the bar 436 carries a contact 482 which is brought out of contact with a contact 483 on the stationary bar 434 when magnet 428 is energized. These safety contacts merely open the circuit from wire 323 to the plugs 324 preventing the possibility of improperly transmitting impulses to certain accumulator control magnets 231 when effecting division operations, since these magnets might have been connected to control the entry of nines for cross calculating operations.

*Examples of some calculating operations involving division*

There will now be explained, by way of examples, some of the calculating operations involving division that can be performed by the present machine:

*Example No. 6.*—Division alone.
Equation:

$$\frac{A}{B}=X$$

Keys depressed: Key +1, and key T₁.
Plugging connections: Shown in Fig. 46.

*Example No. 7.*—Division and cross calculation with the quotient result entering as an item in cross calculation.
Equation:

$$\frac{A}{B}+C+D-E+F-G+H-I+J=X$$

or a lesser number of items of cross calculation.
Keys depressed: Key +1, key ±2 and key T₂.
Plugging connections: Shown in Fig. 47. Note, the special plug connection 505 for entering a "9" in the highest denominational order of accumulator #2 in subtraction.

*Example No. 8.*—Division and multiplication with the quotient added to the product of multiplication.
Equation:

$$\frac{A}{B}+C\times D=X$$

Keys depressed: Key +1, key X₂, key T₂.
Plugging connections: Shown in Fig. 48.

*Example No. 9.*—Cross calculation, then division to cause the result of the former to be added only to the quotient.
Equation:

$$A+B+C+D+E+F+G+H+\frac{I}{J}=X$$

Keys depressed: Key ±1, key +2, key T2.
Plugging connections: Shown in Fig. 49.

*Example No. 10.*—All calculating operations such as subtraction, addition multiplication, division effected automatically and result entered in one accumulator.
Equation:

$$\frac{A}{B}+C\times D+(E-F+G)=X$$

Keys depressed: Key +1, key X2, key ±3.
Plugging connections: Shown in Fig. 50. Note the special plug connections 506 from the two "9" plug sockets 324 to certain plug sockets 280 of the row involving the subtractive item. By the plug connection 278 "9" are entered in the two highest denominational orders of accumulator #2 in subtraction.

Checking device

After a calculation or a series of different calculations have been performed and the result is punched on a card, to determine the accuracy in punching the result the card is again passed through the machine and the calculation is repeated but with the checking device in operation the re-calculated result in accumulator 251 is compared with the result of the first calculation and previously punched on the card.

As verification is obtained in all columns the card will be fed step by step as the comparing operation continues but upon the determination of a non-identity between a digit representation of a card column with the digital result in the correlated denominational order of the accumulator card feeding will be terminated.

Reference numeral 361 in Fig. 4 designates the magnet of a relay which is adapted to open the series of contacts 361a (Fig. 4), open the relay contact 361c (Fig. 1) and close a series of contacts 361b (Fig. 4) thereby connecting in the readout device of accumulator 251 the series of contact points 358 of a particular digit to a related digit line 189 by a wire connection 486. The relay contacts 361c are opened to prevent the establishment of false circuits by the emitters or multiplier control drum 214. The checking switch lever 484 (Fig. 37) which comprises a three pole switch is also adapted to close contacts 487 and 488 (Fig. 4) and 489 (Fig. 2) when shifted to operated position.

As shown in Fig. 4 if the 26th column was the first or highest order column punched to represent the result, with the set of punches 375 shifted out of the way, a brush unit of the type shown in Fig. 16 will be set in place and the plug 490 of the track 88 of the correlated column will be entered into a socket 491 (see Fig. 17). The socket 491 has a wire connection 492 which is connected as shown in Fig. 2 to one side of the punch control relay 354.

It will be recalled that as previously stated when the punching mechanism is selected for operation in the manner previously described the magnet 82 (Fig. 2) is energized when cam contacts C—4 (Fig. 2) close thus causing relay magnet 361 to be energized since it is in parallel therewith as contacts 489 are closed. Also when switch arm 173 contacts with a selected point 174 (Fig. 2) as previously stated, magnet 349 (Fig. 16) is energized to permit the brush units to be elevated so that the brush unit correlated with the card column punched is also elevated above the related track 88. The relay magnets 82 and 361 are energized simultaneously but the relay contacts 82d are timed to close preferably, after the relay contacts 361a are opened and relay contacts 361b closed.

When relay contacts 82d close due to the energization of relay magnet 82 by the closure of cam controlled contacts C—4, a circuit will be made from the positive line side 14, relay contacts 347a normally closed, relay contacts 82d now closed, relay contacts 354b normally closed, wire 355, to the contacts 488 (Fig. 4) now closed, to a magnet 493 and thence by wire 352 to the negative line side by the selected contact 174 and switch arm 173 through contacts 384 now closed.

The energization of magnet 493 will, as shown in Figs. 5, 9, and 16, draw its core downwardly so that by a link 494 connected between the core and an arm 495 (Figs. 5 and 9) the shaft 106 will be rocked since the arm 495 is connected to said shaft. Hence the brushes will be depressed.

If the first column was punched to represent the digit "2" the movable contact element 362 at the extreme left (Fig. 4) would be engaged with the contact point 358₂ and the circuit would be made as follows: From the negative line side by switch arm 173, and the selected contact point 174, wire 352, wire 365, the switch arm 364a, switch point 363, movable contact element 362, contact point 358₂, and thence to the related digit line 189 through the closed contacts 361a and related wire 486. Since the column is assumed to be perforated at the "2" position the digit line 189₂ will be electrically connected to the metal track 88 selected for checking through the brush 77 at the "2" index point position. The circuit now extends from the plug 490 and socket 491 by wire 492 to the punch control relay 354 to the positive line side 14, causing it, upon an identity, to be energized. The energization of the latter will cause relay contacts 354c to be closed (Fig. 2) and cause the space control magnet 385 to be energized to feed as previously described the card one step ready for the next comparison. At the same time relay contacts 354b open to cause magnet 493 to be deenergized and thus the brushes are raised to permit the free feeding of the card.

Thereupon the next column is selected for comparison purposes with the next order of the accumulator 251 due to the stepping of the switch levers 364a and 364b one step. The operation is similar to those described for punching except that the magnet 493 which depresses the brushes is energized at the times that the selected punch operating magnet 357 would be.

If the circuit is not completed due to failure in identity of the digit expressed on the card and the order of the accumulator compared therewith the space control magnet 385 will not be energized and the comparison operations will stop. By depression of a key 496 (Fig. 4) to close contacts 497 the circuit from the relay magnet 354 to the negative line side 13 will be completed by the contacts 497 and the previously closed contacts 487. This will initiate the operation of the checking device but this manual operation will be an indication of the failure of an absolute comparison and an indication of either an improper punching or calculation.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a calculating machine, means for analyzing a card at rest comprising a plurality of sets of analyzing means, one set for each card field and each set comprising a plurality of columns of analyzing elements, an accumulator, cross totalizing means comprising means for causing said analyzing elements of said sets to control and direct in succession under control of one set after another the entry of values represented by said fields into said accumulator, means settable by the operator for predetermining the number of sets of analyzing means effective for cross totalizing operations, supplemental analyzing means for analyzing said card comprising a plurality of columns of analyzing elements for analyzing a card field representing a factor of multiplication, multiplying devices associated with said supplemental analyzing means and said accumulator for effecting the multiplication of said factor and the other factor represented by said accumulator, a product receiving accumulator controlled thereby in which the product is formed, and means for initiating and effecting the operation of said multiplying means upon completion of cross totalizing operations for predetermined card fields.

2. In a calculating machine for performing cross-totalizing operations, means for analyzing a plurality of fields of value representing designations on a single card, an accumulator, means for effecting under control of said analyzing means cross-totalizing operations from said fields of the card by entering the values in said accumulator, means for causing values from predetermined fields of said card to be entered in said accumulator subtractively to derive a balance which may be either a true number or a complement, a supplemental accumulator, transfer means for transferring the balance from the first named accumulator to said supplemental accumulator as a true number, transfer means for transferring the balance from the first named accumulator to said supplemental accumulator as a tens complement, means under control of the first named accumulator for selecting the transfer means effective for a transfer operation, means for predetermining the number of fields effective for cross-totalizing operations, and means controlled by said last named means for initiating the balance transfer operation under control of the selected transferring means.

3. In a calculating machine, an accumulator, means for analyzing designations arranged in a plurality of card fields on a card representing a plurality of values, means for effecting the successive entry in said accumulator of values derived by said analyzing means from said fields of the card, means associated with said accumulator for representing the total therein, a supplemental accumulator, means for analyzing said card for designations representing a factor in a multiplying calculation, devices coordinated for automatic operation for multiplying a multiplier factor and multiplicand factor and for entering a product in said last named accumulator and including means for rendering said last named analyzing means effective as a source of one factor in the multiplying calculation and for rendering said total representing means effective as a source of the other factor in the same multiplying calculation, and means for initiating and effecting the operation of said last named devices upon completion of cross-totalizing operations for said card fields.

4. In a calculating machine capable of selectively effecting cross-totalizing calculations, multiplying or dividing calculations, in combination, an accumulator, actuating means therefor adapted for control from several sources, means for analyzing to be calculated data represented on a card, devices coordinated for automatic operation for multiplying a multiplier and multiplicand, and for entering the product in the accumulator through said actuating means and including means for rendering the analyzing means effective as a source of the factors in the multiplication, devices coordinated for automatic operation for dividing a dividend by a divisor and for entering the quotient in the accumulator through said actuating means and including means for rendering the analyzing means effective as a source of the amounts used in the division, cross-totalizing devices for causing said actuating means to effect the entry in said accumulator of one or more items derived from the card by the analyzing means correlated with one or more fields of the card, a plurality of control elements each for initiating the operation of the devices for one of said calculations, a plurality of preset selecting devices for selecting by a pre-setting thereof any control element to be effective in any one of a succession of operations, and means cooperating with said selecting devices for rendering the selected control elements effective and in the sequence predetermined by the pre-setting of the selecting devices.

5. In a calculating machine capable of selectively effecting cross-totalizing calculations, multiplying or dividing calculations, in combination, an accumulator, actuating means therefor adapted for control from several sources, means for analyzing to be calculated data represented on a card, devices coordinated for automatic operation for multiplying a multiplier and multiplicand, and for entering the product in the accumulator through said actuating means and including means for rendering the analyzing means effective as a source of the factors in the multiplication, dividing devices coordinated for automatic operation for dividing a divident by a divisor and for entering the quotient in the accumulator through said actuating means and including means for rendering the analyzing means effective as a source of the amounts used in the division, cross-totalizing devices for causing said actuating means to effect the entry in said accumulator of one or more items derived from the card by the analyzing means correlated with one or more fields of the card, a plurality of normally ineffective control elements each for initiating the operation of the devices for one of said calculations, a plurality of selecting devices manually preset prior to an operation of the machine for selecting by a pre-setting thereof any control element to be effective in any one of a succession of operations, and means cooperating with said selecting devices and operable as the calculating operations of the machine are successively effected by said devices for rendering the selected control elements successively effective and in the sequence determined by the manual pre-setting of the selecting devices.

6. In a calculating machine capable of selectively effecting cross-totalizing calculations, multiplying or dividing calculations, in combination, an accumulator, actuating means therefor adapted for control from several sources, means for analyzing to be calculated data represented on a card and including means for rendering the analyzing means effective as a source of data for said calculations, devices coordinated for automatic operation for multiplying a multiplier and multiplicand, and for entering the product in the accumulator through said actuating means, devices coordinated for automatic operation for dividing a dividend by a divisor and for entering the quotient in the accumulator through said actuating means, cross-totalizing devices for causing said actuating means to effect the entry in said accumulator of one or more items derived from the card by the analyzing means correlated with one or more fields of the card, a plurality of control elements each for initiating the operation of the devices for one of said calculations, a plurality of pre-set selecting devices for selecting by a pre-setting thereof any control element to be effective in any one of a succession of operations, and means cooperating with said selecting devices for rendering the selected control elements effective and in the sequence determined by the pre-setting of the selecting devices.

7. In a calculating machine capable of effecting cross-totalizing calculations and/or multiplying calculations, in combination, an accumulator, actuating means therefor adapted for control from several sources, means for analyzing to be calculated data represented on a card, devices coordinated for automatic operation for multiplying a multiplier and multiplicand, and for entering the product in the accumulator through said actuating means and including means for rendering the analyzing means effective as a source of the factors in the multiplication, cross-totalizing devices for causing said actuating means to effect the entry in said accumulator of one or more items derived from the card by the analyzing means correlated with one or more fields of the card, a plurality of control elements for initiating respectively the operation of said multiplying devices and said cross-totalizing devices, a plurality of pre-set selecting devices for selecting by a pre-setting thereof any control element, and means cooperating with said selecting devices for rendering the selected control element or elements effective and in a sequence determined by the presetting of said selecting devices when both elements are selected for operation.

8. In a calculating machine capable of selectively effecting cross-totalizing calculations, multiplying or dividing calculations, in combination, an accumulator, actuating means therefor adapted for control from several sources, means for analyzing to be calculated data represented on a card, devices coordinated for automatic operation for multiplying a multiplier and multiplicand, and for entering the product in the accumulator through said actuating means and including means for rendering the analyzing means effective as a source of the factors in the multiplication, devices coordinated for automatic operation for dividing a dividend by a divisor and for entering the quotient in the accumulator through said actuating means and including means for rendering the analyzing means effective as a source of the amounts used in the division, cross-totalizing devices for causing said actuating means to effect the entry in said accumulator of one or more items derived from the card by the analyzing means correlated with one or more fields of the card, a plurality of normally ineffective control elements each for initiating the operation of the devices for one of said calculations, a plurality of rows of preset keys, means controlled by the keys of each row for selecting any control element to be effective in one of a succession of calculating operations, and means cooperating in succession with said rows of keys for rendering the selected control elements effective under control of the keys preset and in a sequence depending upon the particular key preset in each row.

9. In a calculating machine capable of effecting computations of two different types in a predetermined sequence, in combination, an accumulator, actuating means therefor adapted for control from several sources, data analyzing means, means for retaining said analyzing means in continued analyzing contact with said card for a series of computing operations, devices for effecting a computation of one type of data comprising two factors derived from the card and determined from the analysis by the correlated analyzing means and for causing said actuating means to enter the result of the computation in said accumulator, devices for effecting a computation of another type of data comprising two factors derived from the same card and determined from the analysis by the correlated analyzing means and for causing said actuating means to enter the result of the computation in said accumulator, a plurality of control elements each for initiating the operation of its devices, a plurality of preset selecting devices for selecting by a pre-setting thereof any control element to be effective in one or the other of a succession of computing operations, and means cooperating with said selecting devices for rendering the selected control elements effective and in the sequence predetermined by the pre-setting of the selecting devices.

10. In a calculating machine capable of effecting cross-totalizing calculations and dividing calculations, in combination, an accumulator, actuating means therefor adapted for control from several sources, means for analyzing to be calculated data represented on a card, devices coordinated for automatic operation for dividing a dividend by a divisor and for entering the quotient in the accumulator through said actuating means and including means for rendering the analyzing means effective as a source of the amounts used in the division, cross-totalizing devices for causing said actuating means to effect the entry in said accumulator of one or more items derived from the card by the analyzing means correlated with one or more fields of the card, a plurality of control elements each for initiating the operation of its devices, a plurality of preset selecting devices for selecting by a presetting thereof any control element, and means cooperating with said selecting devices for rendering selected control elements successively effective in a sequence determined by the pre-setting of said selecting devices.

11. In a calculating machine capable of effecting cross-totalizing calculations with either multiplying or dividing calculations, in combination, an accumulator, actuating means therefor adapted for control from several sources, means for analyzing to be calculated data represented on a card, devices coordinated for automatic operation for multiplying a multiplier and multiplicand, and for entering the product in the accumulator through said actuating means and including means for rendering the analyzing means effective as a source of the factors in the multiplication, devices coordinated for automatic operation for dividing a dividend by a divisor and for entering the quotient in the accumulator through said actuating means and including means for rendering the analyzing means effective as a source of the amounts used in the division, cross-totalizing devices for causing said actuating means to effect the entry in said accumulator of one or more items derived from the card by the analyzing means correlated with one or more fields of the card, a plurality of settable selecting devices and elements controlled thereby for initiating the operation of the corresponding multiplying or dividing devices, means to initiate the operation of said cross-totalizing devices, and means cooperating with said selecting devices for rendering effective in accordance with the setting of the selecting devices the desired control element upon the completion of the cross-totalizing operation to thereby effect the operation of either the multiplying or dividing devices in an uninterrupted sequence with the operation of the cross-totalizing devices.

12. In a calculating machine capable of effecting cross-totalizing calculations and dividing calculations, in combination, an accumulator, means for analyzing to be calculated data represented on a card, devices coordinated for automatic operation for dividing a dividend by a divisor and for entering the quotient in the accumulator through said actuating means and including means for rendering the analyzing means effective as a source of the amounts used in the division, cross-totalizing devices comprising means for successively effecting the entry in said accumulator of values derived directly from the card by the analyzing means correlated with one or more fields of the card, a plurality of normally ineffective control elements each for initiating the operation of the devices for one of said calculations, means for rendering effective a control element related to one of said devices for initiating the operation of the corresponding devices, and means rendered operative by the completed operation of said last named devices for automatically rendering said other element effective to cause the automatic operation of the remaining devices.

13. In a calculating machine for effecting multiplying calculations and cross-totalizing calculations, the combination with an accumulator, of actuating means therefor adapted for control from several sources, means for analyzing representations of multiplier and multiplicand data on a card and for analyzing a plurality of fields of data representations on the same card, means for retaining said analyzing means in continued analyzing contact with said card during multiplying and cross-totalizing calculations, devices coordinated for automatic operation for multiplying a multiplier and multiplicand, and for entering the product in the accumulator through said actuating means and including means for rendering the analyzing means effective as a source of the factors in the multiplication, cross-totalizing devices comprising means for directing the entry of values derived from the card by said analyzing means to said actuating means to cause the latter to enter said values in said accumulator, separate normally ineffective control elements each when rendered effective for initiating the operation of the devices for one of said calculations, means for rendering one of said elements effective to cause the operation of the corresponding devices, and means operable by the operation of the last-named devices for causing the other element to be rendered effective to cause the other devices to be set in operation.

14. In a calculating machine for effecting multiplying calculations and dividing calculations, the combination with an accumulator, of common actuating means therefor adapted for control from several sources, means for analyzing multiplier and multiplicand data on a card, devices coordinated for automatic operation for multiplying a multiplier and multiplicand, and for entering the product in the accumulator through said actuating means and including means for rendering the analyzing means effective as a source of the factors in the multiplication, supplemental means for analyzing representations of divisor and dividend values on the same card, devices coordinated for automatic operation for dividing a dividend by a divisor and for entering the quotient in the accumulator through said actuating means and including means for rendering the supplemental analyzing means effective as a source of the amounts used in the division, separate normally ineffective control elements each when rendered effective for initiating the operation of the devices for one of said calculations, means for rendering one of said elements effective to cause the operation of the corresponding devices, and means operable by the completed operation of the last-named devices for causing the other element to be rendered effective to cause the other devices to be set in operation.

15. In a calculating machine with means for analyzing the representations of a plurality of values on a single card, means for retaining said analyzing means in continued analyzing contact with said card during cross-totalizing and dividing calculations, an accumulator, actuating means therefor adapted for control from several sources, cross-totalizing devices comprising means for successively effecting the entry of values derived directly from the card and for causing said actuating means to enter said values in the accumulator, devices coordinated for automatic operation for dividing a dividend by a divisor and for entering the quotient in the accumulator through said actuating means and including means for rendering the analyzing means effective as a source of the amounts used in the division, a plurality of normally ineffective control elements each for initiating the operation of the devices for one of said calculations, means for rendering effective a control element related to one of said devices for initiating the operation of the corresponding devices, and means rendered operative by the completed operation of said last named devices for automatically rendering said other element effective to cause the automatic operation of the corresponding devices.

GUSTAV TAUSCHEK.